(12) United States Patent  
Shimizu et al.

(10) Patent No.: US 8,327,267 B2  
(45) Date of Patent: Dec. 4, 2012

(54) IMAGE DATA PROCESSING APPARATUS, IMAGE DATA PROCESSING METHOD, PROGRAM, AND RECORDING MEDIUM

(75) Inventors: Fumio Shimizu, Kanagawa (JP); Hirotsugu Sato, Tokyo (JP)

(73) Assignee: Sony Corporation, Tokyo (JP)

( * ) Notice: Subject to any disclaimer, the term of this patent is extended or adjusted under 35 U.S.C. 154(b) by 1481 days.

(21) Appl. No.: 11/119,890

(22) Filed: May 3, 2005

(65) Prior Publication Data

US 2005/0257152 A1 Nov. 17, 2005

(30) Foreign Application Priority Data

May 13, 2004 (JP) ................................. 2004-143001  
May 13, 2004 (JP) ................................. 2004-144192  
Mar. 25, 2005 (JP) ................................. 2005-087722

(51) Int. Cl.  
*G06F 3/00* (2006.01)

(52) U.S. Cl. ......... 715/719; 715/720; 715/723; 715/726

(58) Field of Classification Search .......... 715/717–723, 715/730, 726  
See application file for complete search history.

(56) References Cited

U.S. PATENT DOCUMENTS

| | | | |
|---|---|---|---|
| 6,469,711 B2* | 10/2002 | Foreman et al. | 715/723 |
| 6,559,761 B1* | 5/2003 | Miller et al. | 340/435 |
| 6,628,889 B2* | 9/2003 | Inoue | 386/52 |
| 6,664,966 B1* | 12/2003 | Ibrahim et al. | 345/474 |
| 6,947,867 B2* | 9/2005 | Kling et al. | 702/150 |
| 7,073,127 B2* | 7/2006 | Zhao et al. | 715/719 |
| 7,073,193 B2* | 7/2006 | Marsh | 725/114 |
| 2001/0028787 A1* | 10/2001 | Nomura et al. | 386/69 |
| 2003/0122861 A1* | 7/2003 | Jun et al. | 345/720 |
| 2003/0137546 A1* | 7/2003 | Suh | 345/838 |
| 2003/0193578 A1* | 10/2003 | Parulski et al. | 348/220.1 |
| 2004/0021684 A1* | 2/2004 | Millner | 345/719 |
| 2004/0240005 A1* | 12/2004 | Kim | 358/537 |
| 2005/0047681 A1* | 3/2005 | Hori et al. | 382/305 |

* cited by examiner

*Primary Examiner* — Sara England  
(74) *Attorney, Agent, or Firm* — Oblon, Spivak, McClelland, Maier & Neustadt, L.L.P.

(57) ABSTRACT

Disclosed herein is an image data processing method for processing image data forming a video material includes, an obtaining step of obtaining image data at a plurality of points in time forming the video material, from the video material, and a generating step of generating image data for display to display the image data at the plurality of points in time obtained in the obtaining step in a grouped state in a display area corresponding to the video material within a story board display area in which a plurality of materials are arranged.

15 Claims, 43 Drawing Sheets

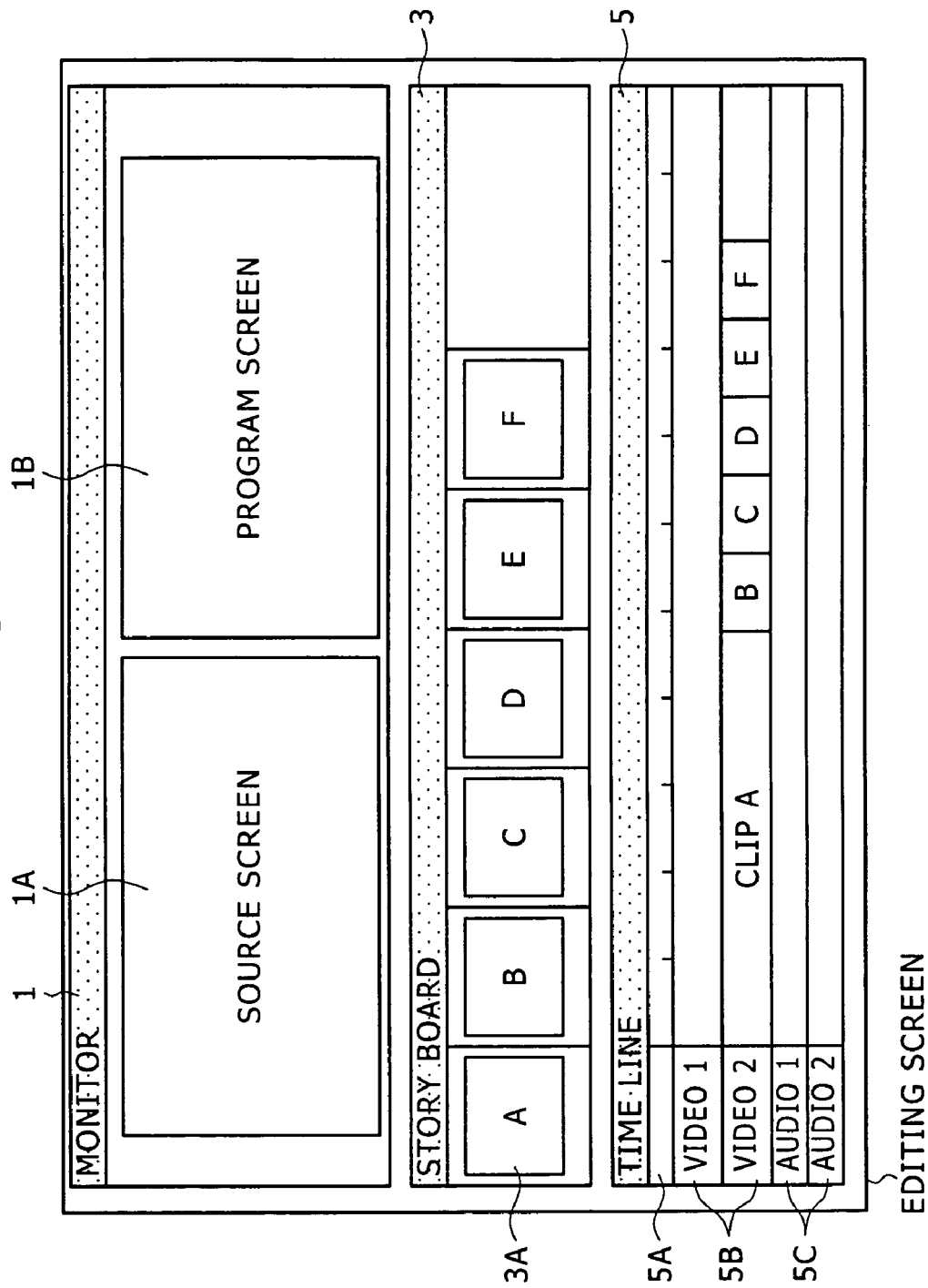

FIG.2A

| FILE NAME |
|---|

FIG.2B

| IN POINT FRAME | FILE NAME |
|---|---|

FIG.2C

| IN POINT FRAME | FILE NAME | OUT POINT FRAME |
|---|---|---|

FRAME OF SAME TIME CODE

FIG. 21

| STORY BOARD | CLIP A | CLIP B | CLIP C | CLIP D | CLIP E | CLIP F |
|---|---|---|---|---|---|---|
| | A1 | B1 | C1 | D1 | E1 | F1 |
| | A2 | B2 | C2 | D2 | E2 | F2 |
| | A3 | B3 | C3 | D3 | E3 | F3 |

11 — STORY BOARD; 13B

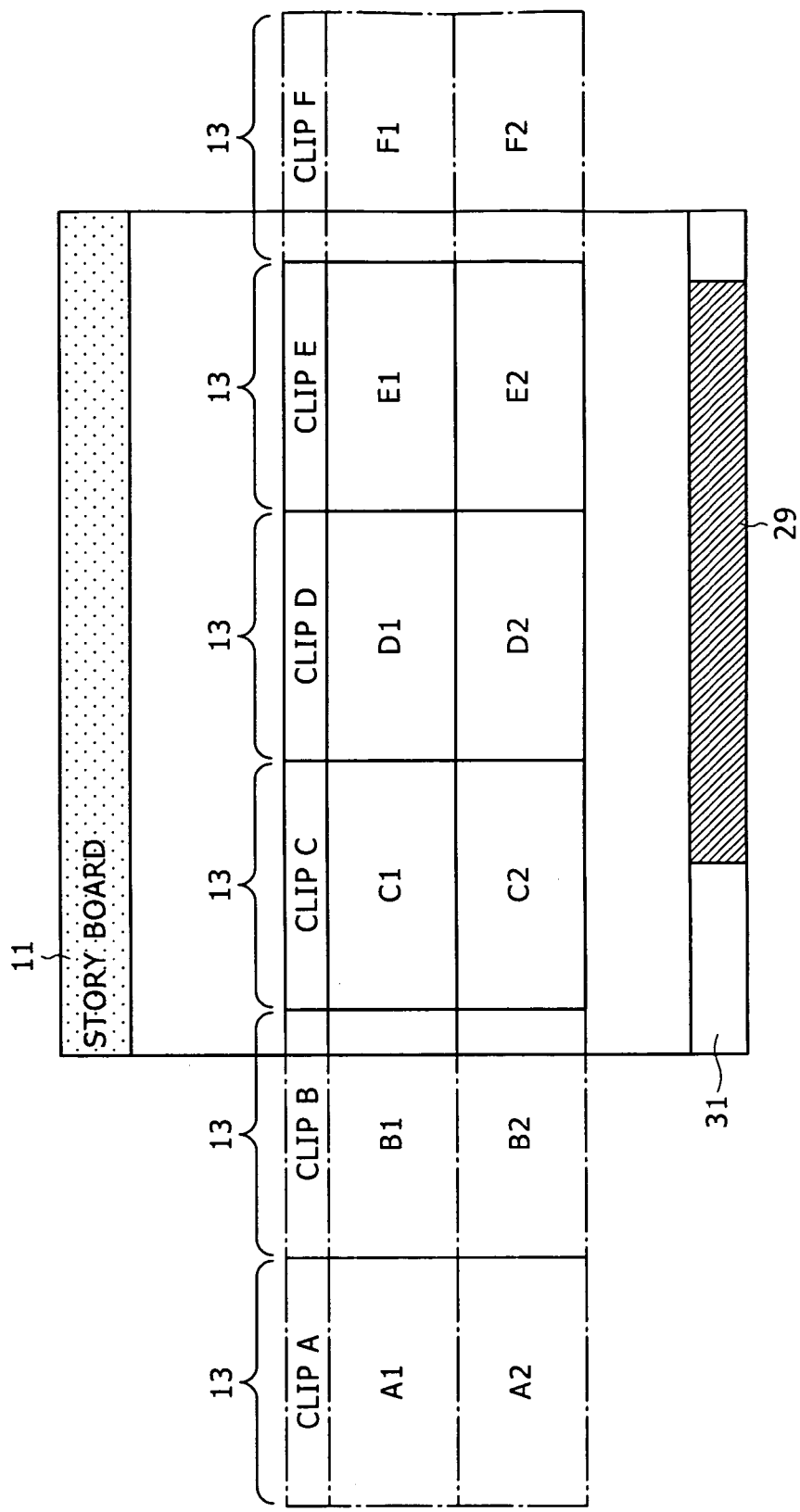

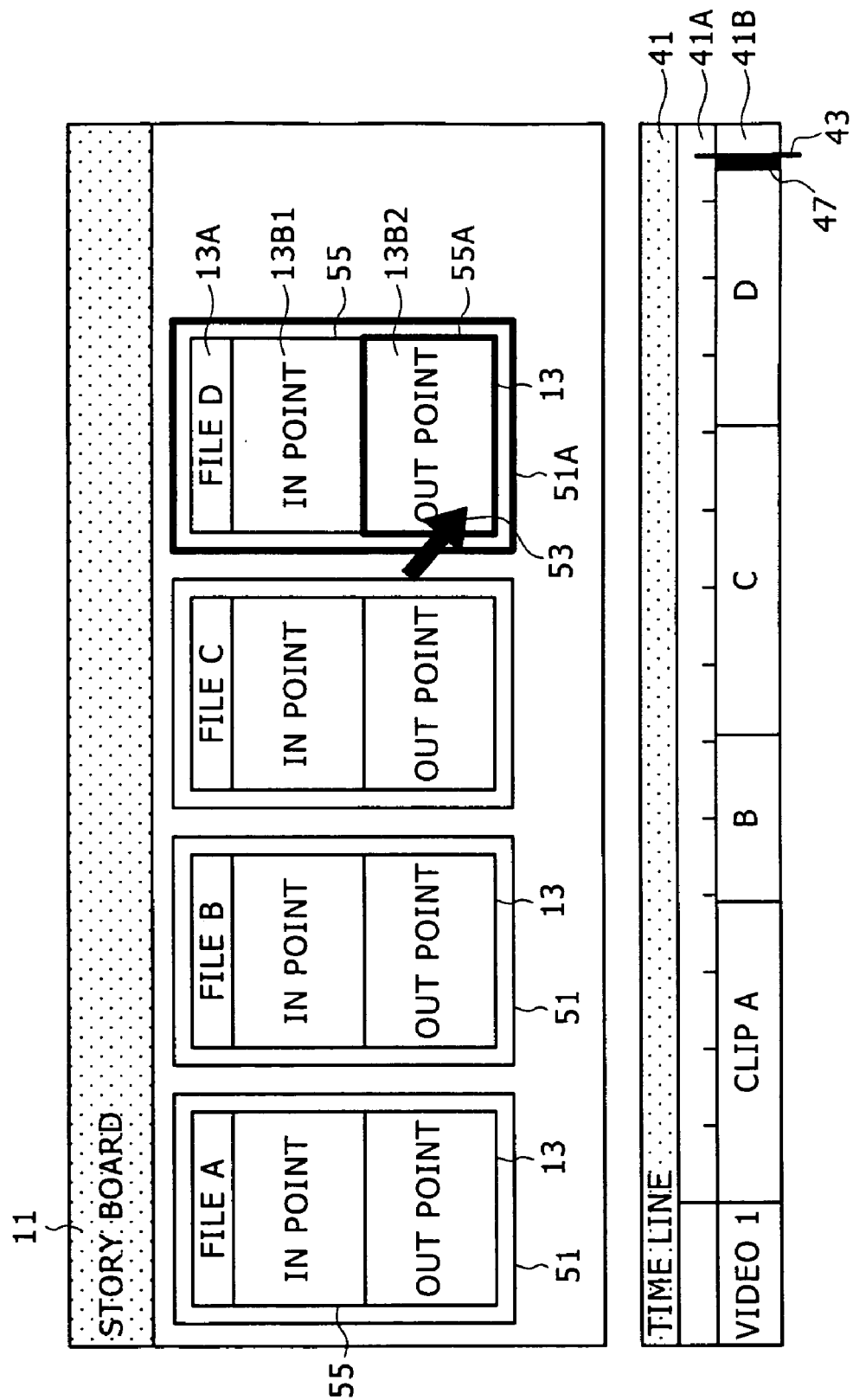

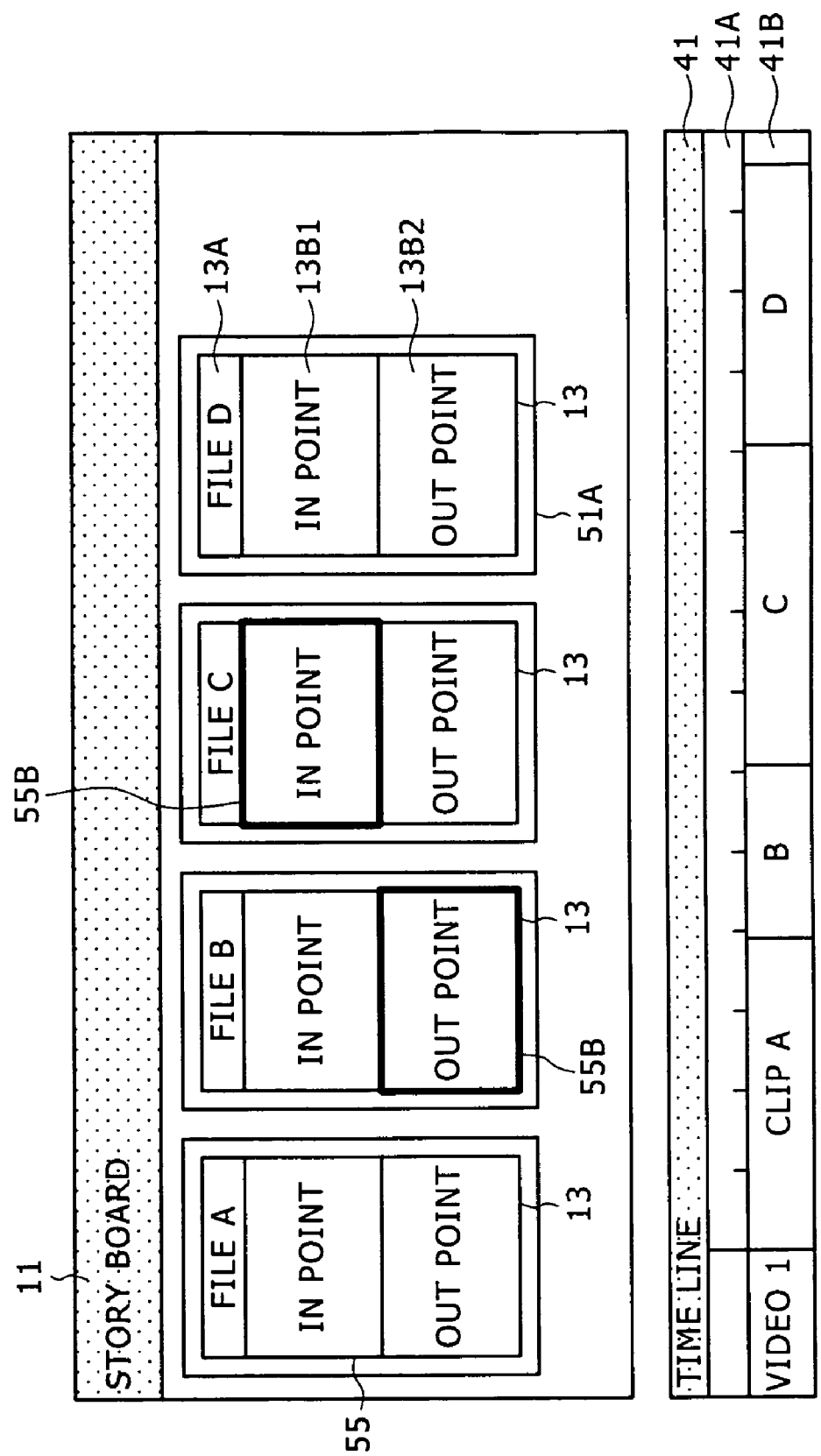

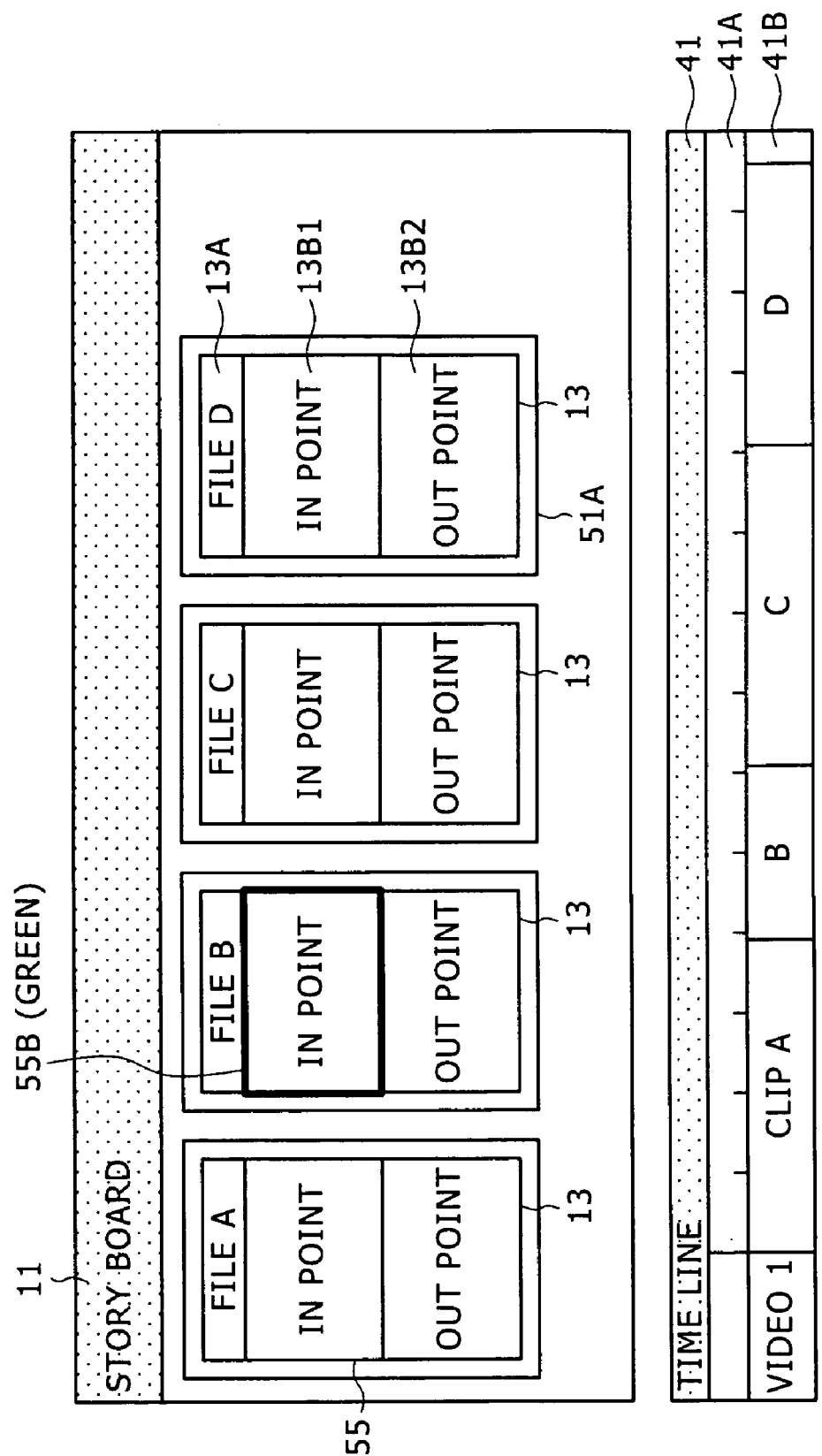

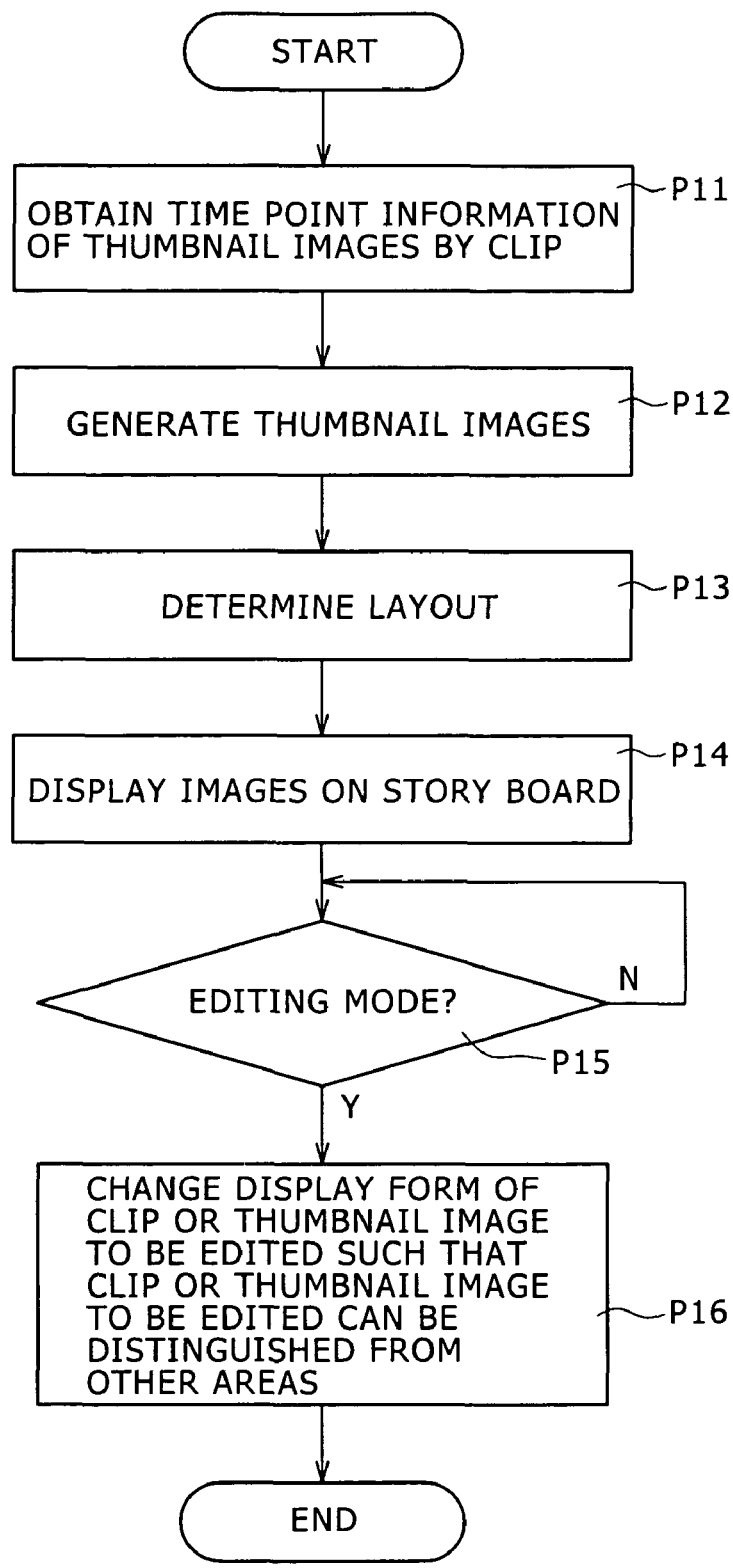

IMAGE DATA PROCESSING APPARATUS, IMAGE DATA PROCESSING METHOD, PROGRAM, AND RECORDING MEDIUM

BACKGROUND OF THE INVENTION

One invention relates to a method of display of a story board window as one user interface used in an editing apparatus (image display method). Another invention relates to an image processing apparatus for implementing the display method.

Another invention relates to a program for implementing the display method. Another invention relates to a recording medium storing the program.

FIG. 1 shows an example of a screen of a graphical user interface (hereinafter referred to as a "GUI") for video editing. A few window screens are provided on the editing screen. For example, a monitor window 1, a story board window 3, and a time line window 5 are provided on the editing screen.

The monitor window 1 is a display area used for capturing of video material (clip), a preview, editing operation, checking of an edit result, and the like. The monitor window 1 has a source screen 1A and a program screen 1B.

The source screen 1A is used for capturing of a clip, a preview, and the like. On the other hand, the program screen 1B is used for an operation of editing a clip or a program (for example an arrangement of a plurality of clips in order of reproduction), checking of an edit result, and the like.

Incidentally, it is possible to display only one of the source screen and the program screen on the basis of a selection of a user.

The story board 3 is a display area used to create a story of a program. This display area is used to display a representative frame 3A of each clip (generally an in point frame of the clip).

The user can create a story of a program by an operation of selecting a frame corresponding to each clip and an operation of determining arrangement order. It is to be noted that one representative frame corresponds to each clip.

The time line window 5 is a display area used for operation of editing the program. Also, the time line window 5 is used to check a transition effect on each clip and a synthesis of tracks in the entire program.

The time line window 5 has a time line 5A, video tracks 5B, and audio tracks 5C.

The time line window 5 represents the passage of time from a left to a right of the screen. Therefore, clips arranged in each track are reproduced in order from the left.

Incidentally, methods for arranging clips in the time line window 5 include a method of separately disposing a clip in the monitor window 1 by a drag-and-drop operation, and a method of arranging the clips en bloc from the story board window 3.

The time line 5A is displayed on a selected scale in the time line window 5. Therefore each clip is displayed in a length proportional to the scale on each track. That is, a large-sized clip is displayed in a relatively long length, and a small-sized clip is displayed in a relatively short length.

FIGS. 2A, 2B, and 2C show an example of a display form of each track prepared in the time line window 5.

For example, when a display form of FIG. 2A is selected, only a file name is displayed in each clip.

For example, when a display form of FIG. 2B is selected, a representative frame (generally a start frame) and a file name are displayed in each clip.

For example, when a display form of FIG. 2C is selected, an in point frame, an out point frame, and a file name are displayed in each clip.

[Patent Document 1]
Japanese Patent Laid-open No. Hei 11-146338
[Patent Document 2]
Japanese Patent Laid-open No. Hei 11-284957

SUMMARY OF THE INVENTION

As described above, only representative frames are arranged in order of reproduction in the story board window 3. Therefore the story board window 3 is a usable user interface for grasping an outline of a story. However, only one representative frame is displayed for one clip in the story board window 3. Hence, when a plurality of scenes are included within one clip, there can be a difference between a story grasped from representative frames and actual reproduced contents. The video track 5B provides the display form in which a plurality of representative frames can be displayed for one clip, as described above. However, display size of the representative frames depends on the scale of the time line 5A and clip length. Hence, in a case of a small scale or a short clip length, a display area becomes very small, and it becomes significantly difficult to check contents.

The inventors, directing attention to the above technical problems, propose the following technical method.

According to an embodiment of the present invention, there is provided an image data processing method for processing image data forming a video material, the image data processing method including: an obtaining step of obtaining image data at a plurality of points in time forming the video material, from the video material; and a generating step of generating image data for display to display the image data at the plurality of points in time obtained in the obtaining step in a grouped state in a display area corresponding to the video material within a story board display area in which a plurality of materials are arranged.

Incidentally, each thumbnail image is displayed in the same size irrespective of clip length.

By employing techniques according to the invention, it is possible to check a story of an entire program and a story within each clip simultaneously. Thereby the story of the entire program can be grasped more accurately.

BRIEF DESCRIPTION OF THE DRAWINGS

FIG. 1 is a diagram showing an example of a GUI screen for video editing;

FIGS. 2A, 2B, and 2C are diagrams representing methods for displaying a clip in a time line window;

FIG. 21 is a diagram showing an example of display when clips are displayed in reduced size;

FIG. 24 is a diagram showing a relation between clips displayed on a screen and clips not displayed on the screen;

FIG. 34 is a diagram showing an example of a screen after an object to be trimmed is changed;

FIG. 35 is a diagram showing an example of a screen when a transition effect is set;

FIG. 36 is a diagram showing an example of a screen when a fade-in is set;

FIG. 43 is a diagram representing an example of a process procedure on the functional configuration.

DETAILED DESCRIPTION OF THE PREFERRED EMBODIMENTS

Preferred embodiments of an image processing apparatus employing technical methods according to the present invention will hereinafter be described.

Incidentally, to parts that are not specifically shown or described in the present specification, well known or publicly known techniques in pertinent technical fields are applied.

The embodiments to be described hereinafter are each one embodiment of the present invention, and the present invention is not limited to these embodiments.

(A) First Example of GUI Screen (1) Example of Story Board Screen Facilitating Checking of Story Description will be made below of an example of a screen of a story board window that allows a story not only of an entire program but also within a clip to be easily checked.

The embodiments have in common an ability to display a plurality of thumbnail images for one clip.

(1-1) First Embodiment

Figure 3:
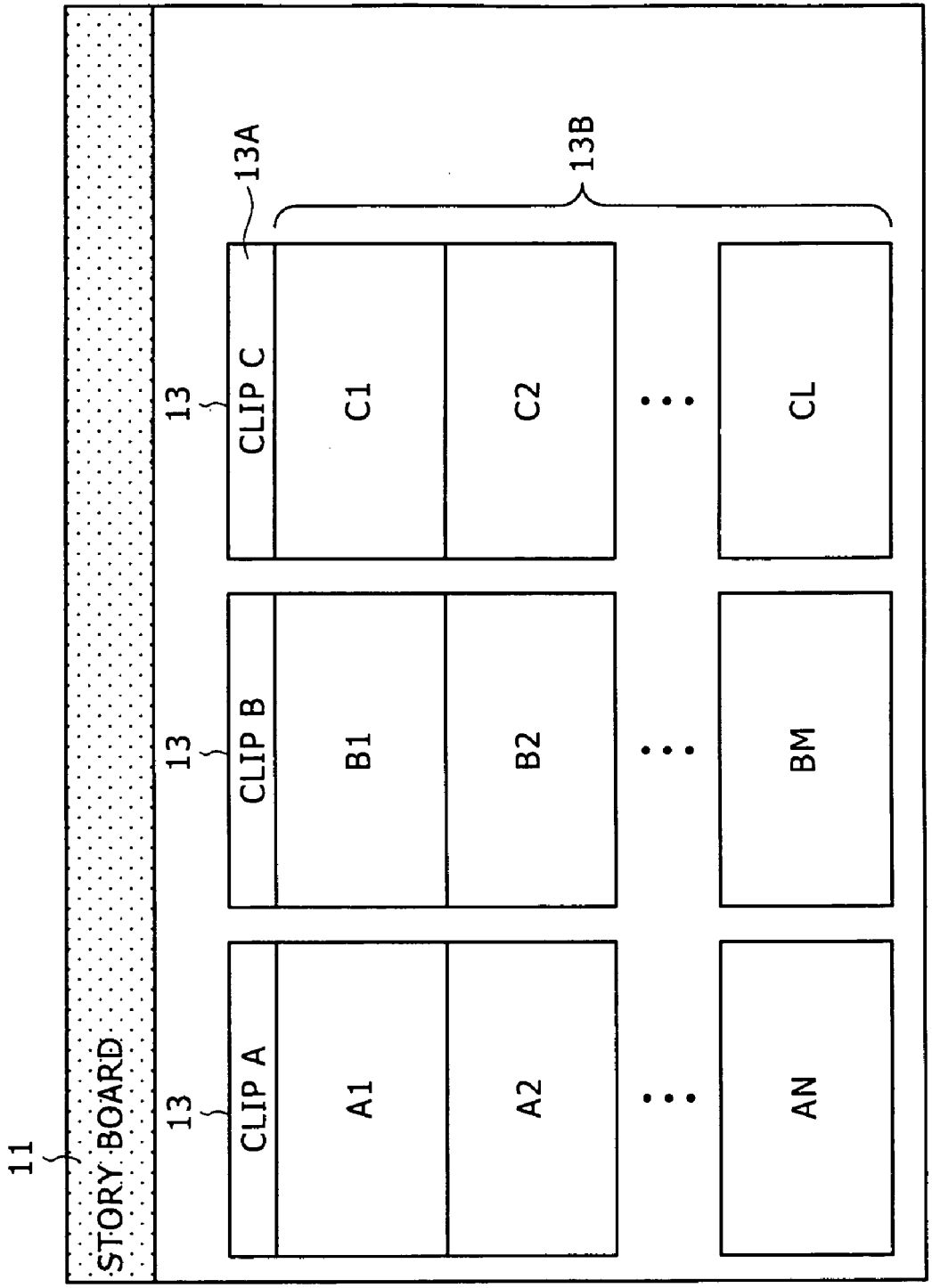
FIG. 3 is a diagram showing an example of display of a story board window.

FIG. 3 shows an example of display of a story board window 11. FIG. 3 shows an example of display in which display areas 13 corresponding to respective clips are arranged in order of reproduction in the story board window 11. Incidentally, a direction of reproduction is from a left to a right.

The three display areas 13 shown in FIG. 3 correspond to the clip A, the clip B, and the clip C, respectively. One display area 13 includes a title section (for example a file name) 13A and a thumbnail section 13B.

The thumbnail section 13B is an area for displaying thumbnail images at a plurality of points in time corresponding to each clip. Incidentally, a direction of reproduction is from a top to a bottom. For example, in the case of the thumbnail section 13B corresponding to the clip A, thumbnail images A2, A2 . . . AN are reproduced in that order.

The number of images displayed in the thumbnail section 13B can be given for each clip. In the case of FIG. 3, let the number of thumbnail images corresponding to the clip A be N (N is a natural number of 2 or more), the number of thumbnail images corresponding to the clip B be M (M is a natural number of 2 or more), and the number of thumbnail images corresponding to the clip C be L (L is a natural number of 2 or more). Of course, the numbers of thumbnail images of all the clips may be the same. That is, a relation of N=M=L may hold. For example, the numbers of thumbnail images may be uniformly set to two or three.

Each thumbnail image is displayed in the same size regardless of size of the corresponding clip. Therefore the thumbnail images of all the clips can be checked under the same conditions. That is, thumbnail images of a small-sized clip and a large-sized clip are of the same size.

This is one of the reasons that the story board window 11 is excellent in grasping contents of the clips. This story board window 11 makes it possible to easily grasp not only the contents of each clip but also the story of the entire program.

Incidentally, when thumbnail images are displayed on a video track 5B, a thumbnail image of a small-sized clip may be reduced too much, and thus visibility of the thumbnail image may be decreased significantly.

It is desirable to incorporate a function of preview reproduction of one of thumbnail images for a certain time before or after the thumbnail image when the thumbnail image is specified by a pointer or the like. The reproduced image is displayed on a program screen 1B. The incorporation of this function enables a user to jump immediately to an area desired to be checked and check the contents.

(1-2) Second Embodiment

As described above, thumbnail images at a plurality of points in time forming each clip are displayed as one set in a thumbnail section 13B corresponding to each clip. In this embodiment, suppose that thumbnail images at a plurality of points in time specified arbitrarily by the user are displayed.

Figure 4A:
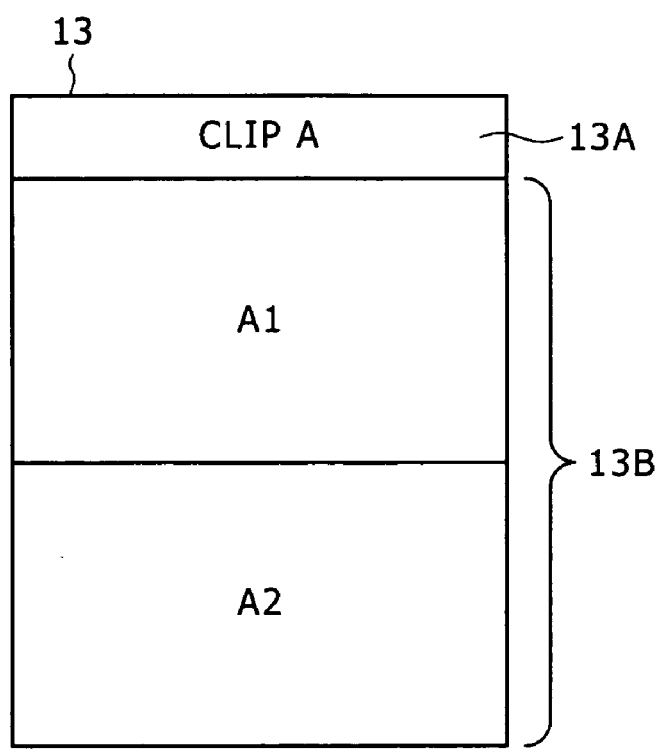
FIGS. 4A and 4B are diagrams showing an example of display when thumbnail images at two points in time specified arbitrarily are displayed.
Figure 4B:
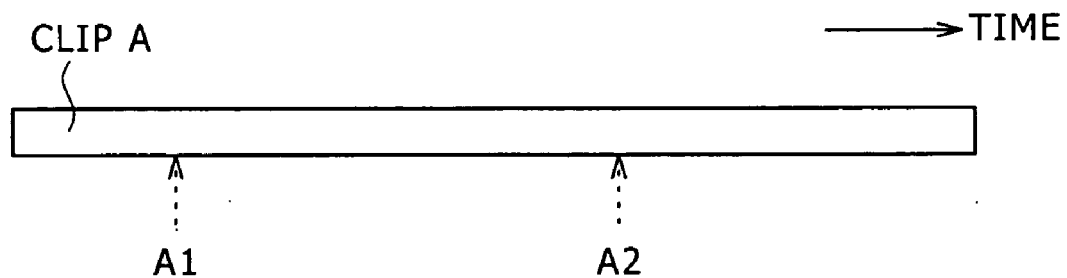

FIGS. 4A and 4B show an example of display in this case. FIGS. 4A and 4B show a case where the number of registered thumbnail images is two.

FIG. 4A shows an example of display of the thumbnail section 13B corresponding to the clip A. On the other hand, FIG. 4B shows positions (time point information) t1 and t2 within the clip to which thumbnail images A1 and A2 correspond.

For example, the positions in FIG. 4B represent frame positions at which an index mark recorded at a time of editing is set. Alternatively, for example, the positions in FIG. 4B represent frame positions at which an index mark recorded at a time of recording is set.

Such a thumbnail image appropriately represents a content and a subject of the clip. Hence, display of a plurality of thumbnail images at arbitrary points specified by the user allows contents of the clip to be grasped more accurately. Further, development of the story of the entire program can be predicted more accurately.

Incidentally, the specification of the thumbnail images A1 and A2 can be input by using a pointing device or another user interface. For example, the specification of the thumbnail images A1 and A2 can be input by using an operating button, a keyboard, a mouse, or a slider pen.

Figure 5A:
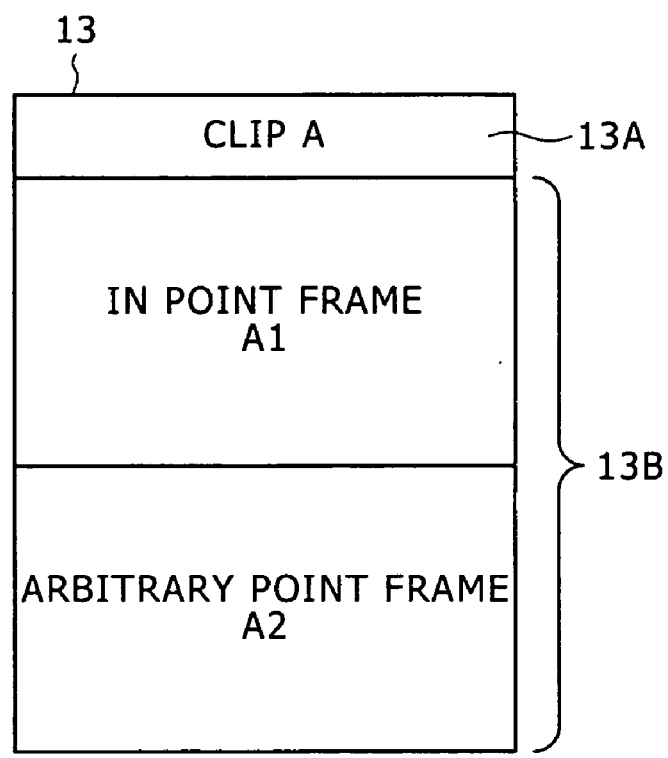
FIGS. 5A and 5B are diagrams showing an example of display in which a thumbnail image of an in point frame and a thumbnail image at one point in time specified arbitrarily are combined with each other.
Figure 5B:
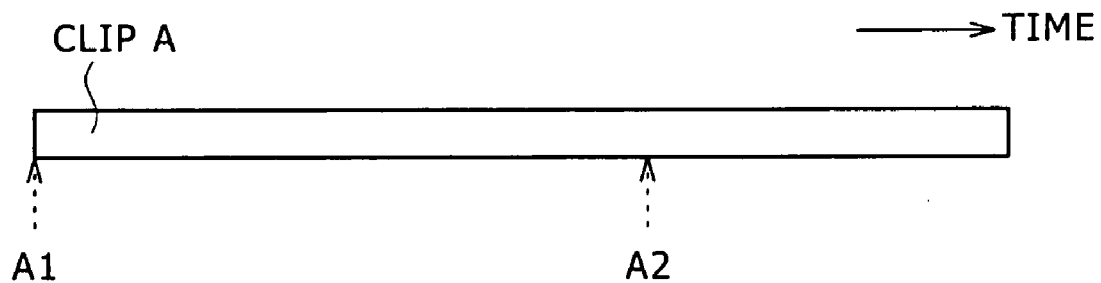

One of the two thumbnail images may be a thumbnail image at a fixed point in time. For example, as shown in FIGS. 5A and 5B, one of the two thumbnail images may be a thumbnail image corresponding to an in point frame. In addition, for example, one of the two thumbnail images may be an out point frame.

FIG. 5A shows an example of display of the thumbnail section 13B corresponding to the clip A. On the other hand, FIG. 5B shows positions (time point information) within the clip to which the thumbnail images A1 and A2 correspond.

Figure 6A:
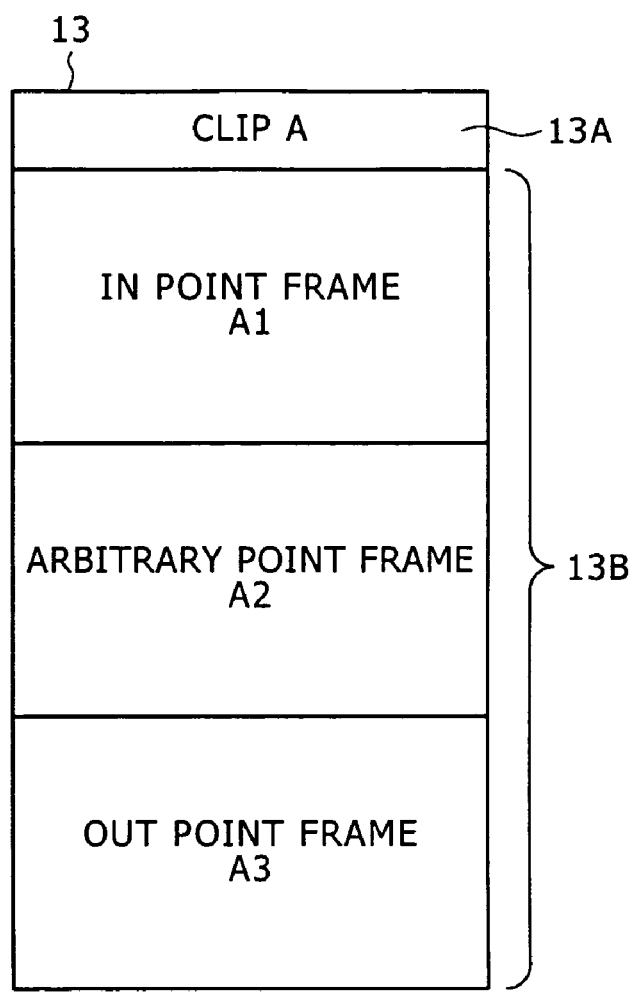
FIGS. 6A and 6B are diagrams showing an example of display in which thumbnail images of an in point frame and an out point frame and a thumbnail image at one point in time specified arbitrarily are combined with each other.
Figure 6B:
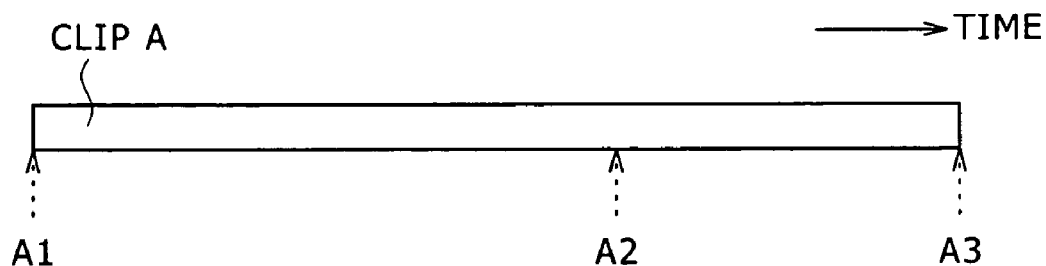

Further, an in point frame and an out point frame can be combined. FIGS. 6A and 6B show a display example in a case where three thumbnail images are displayed. FIG. 6A shows an example of display of the thumbnail section 13B corresponding to the clip A. On the other hand, FIG. 6B shows positions (time point information) within the clip to which the thumbnail images A1, A2, and A3 correspond.

When an in point frame and an out point frame are displayed in addition to an arbitrary thumbnail image selected by the user as in this example, connections to other clips can be easily grasped.

(1-3) Third Embodiment

In this embodiment, description will be made of a case where scene change points are automatically extracted as thumbnail images for display.

Figure 7A:
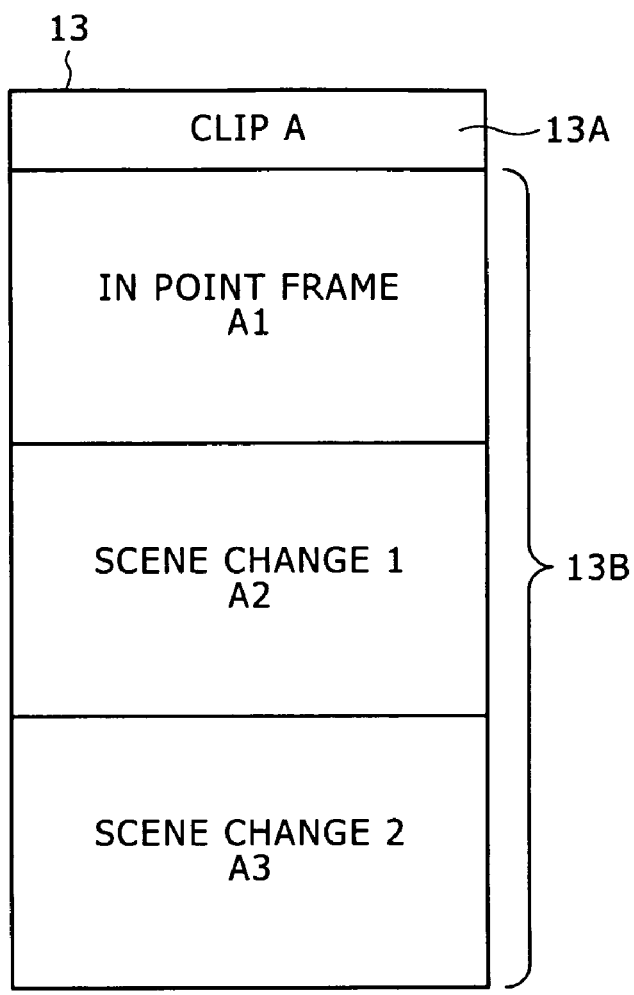
FIGS. 7A and 7B are diagrams showing an example of display in which a thumbnail image of an in point frame and thumbnail images of scene change parts are combined with each other.
Figure 7B:
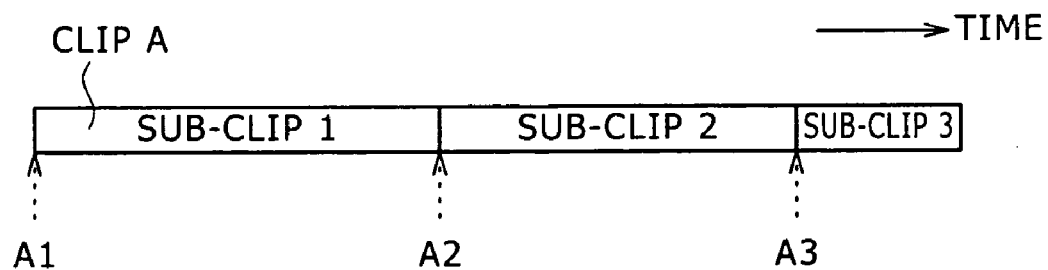

FIGS. 7A and 7B show an example of display in this case. FIGS. 7A and 7B show one clip formed by three sub-clips having no scene continuity therebetween. In image editing operations, short clips are often connected to each other to be handled as one clip. In this case, it is difficult to accurately grasp contents of the clip with a single thumbnail image.

FIG. 7A shows an example of display of the thumbnail section 13B corresponding to the clip A.

On the other hand, FIG. 7B shows positions (time point information) within the clip to which thumbnail images A1, A2, and A3 correspond. As shown in FIG. 7B, the thumbnail images A1, A2, and A3 correspond to in points of the respective sub-clips.

When such a display system is selected, all scene changes within the clip can be extracted. Incidentally, an in point of the first sub-clip coincides with an in point of the clip as a whole. Thus, in FIG. 7A, the first thumbnail image is shown at the in point, and the second thumbnail image and the subsequent thumbnail image are shown at a scene change point.

Incidentally, existing techniques are applied to automatic detection of scene changes. In a case of compression-coded data, for example, a technique is applicable in which when data size of a frame is larger than a specified value, it is determined that a scene is changed at that frame. In addition, a technique is applicable in which when brightness of all pixels vary by more than a specified value, it is determined that a scene is changed at the frame.

When all detected scene changes are displayed, the number of detected scene changes can be very large. In this case, it is desirable to display only a part of the detected scene changes. For example, the detected scene changes may be discretely reduced so as to be displayed at a ratio of one scene change to a plurality of scene changes.

(1-4) Fourth Embodiment

In this embodiment, description will be made of a case where thumbnail images are extracted for display at equal intervals from a start of a clip.

Figure 8A:
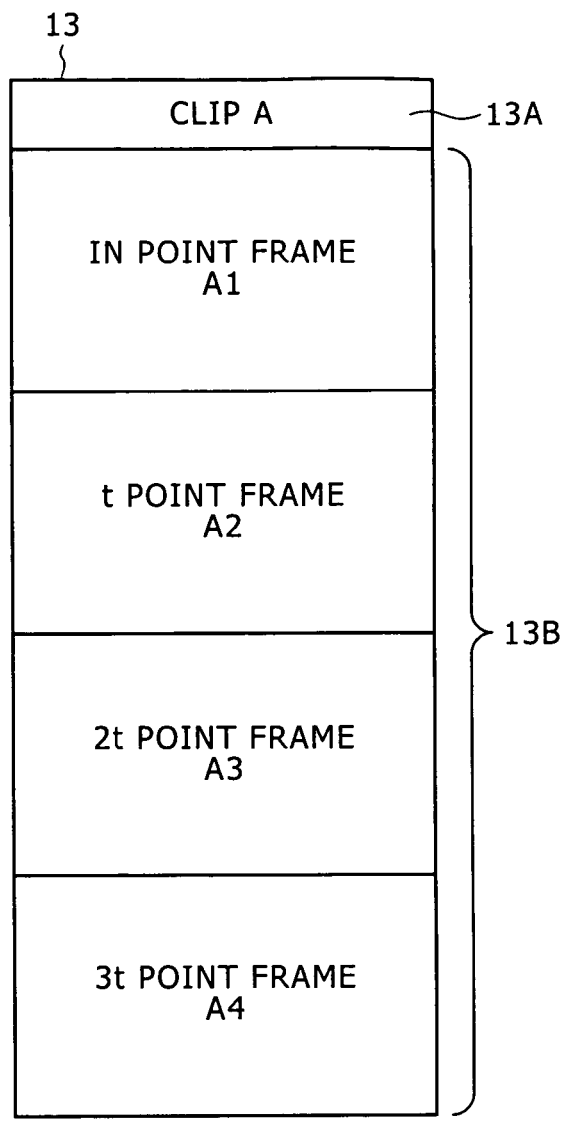
FIGS. 8A and 8B are diagrams showing an example of display in which thumbnail images extracted at equal intervals from a start of a clip are combined with each other.
Figure 8B:
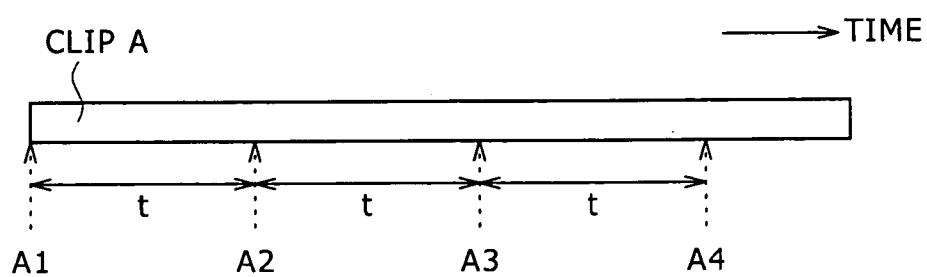

FIGS. 8A and 8B show an example of display in this case. FIGS. 8A and 8B show a case where four thumbnail images are extracted for display from one clip.

FIG. 8A shows an example of display of the thumbnail section 13B corresponding to the clip A. On the other hand, FIG. 8B shows positions (time point information) within the clip to which thumbnail images A1, A2, A3, and A4 correspond.

Also when such a display system is selected, contents within the clip can be extracted comprehensively. As a result, the contents of the clip can be grasped more accurately.

Incidentally, a time interval t used at the time of automatic extraction of a thumbnail image is set in advance. Of course, it is desirable that the user be able to set the time interval t freely.

When this display system is selected, it is desirable that thumbnail images be automatically updated in such a manner as to be interlocked with editing operation in a time line window 5.

Figure 9A:
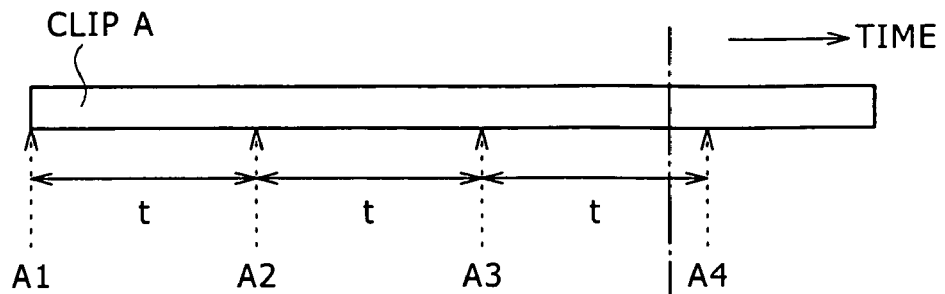
FIGS. 9A, 9B, 9C, and 9D are diagrams of assistance in explaining an effect of an operation of editing the time line window on the story board window.

FIGS. 9A, 9B, 9C, and 9D show examples of display when thumbnail images are automatically updated in such a manner as to be interlocked with editing operation in the time line window 5. Incidentally, a direction of reproduction of the clip is from a left to a right. FIG. 9A shows a state before editing operation in the time line window 5.

Figure 9B:
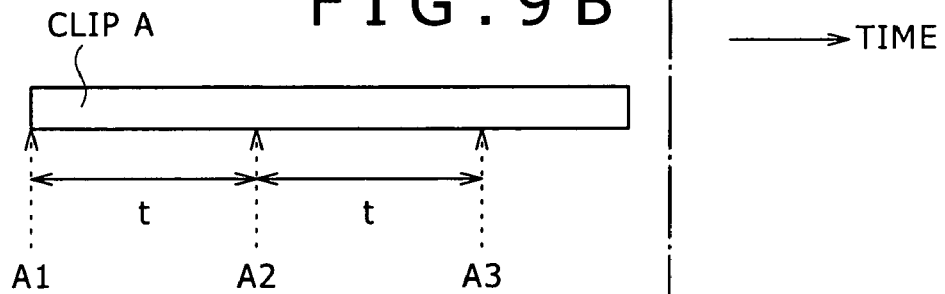
Figure 9C:
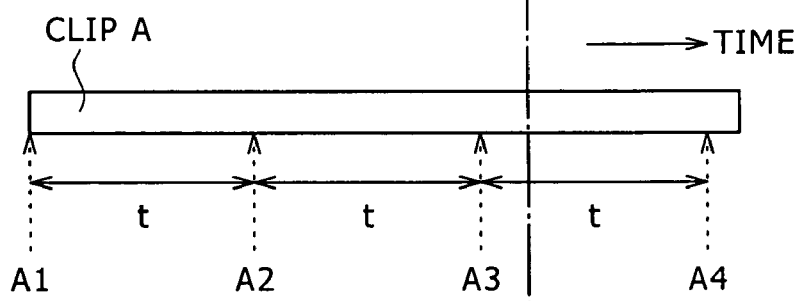
Figure 9D:
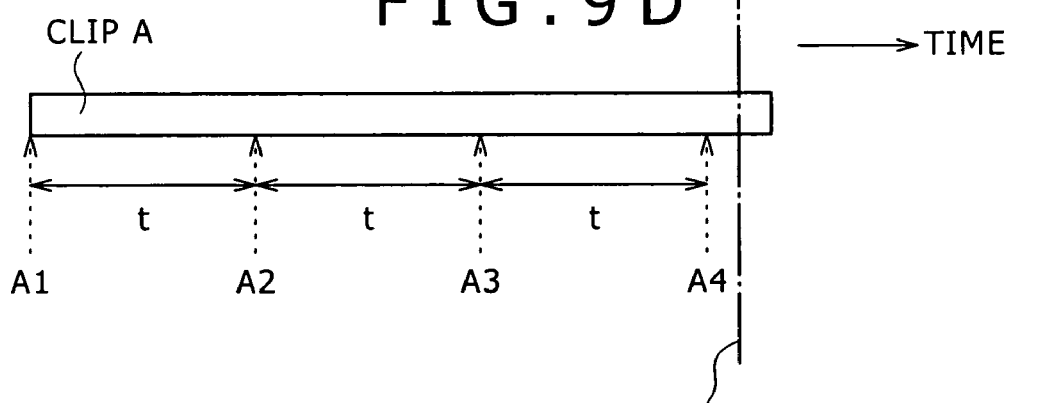

FIG. 9B shows a state in which the position of an out point is shifted to the front and thereby length of the clip as a whole is reduced. FIG. 9C shows a state in which the position of an in point is shifted to the rear and thereby length of the clip as a whole is reduced. FIG. 9D shows a state in which the positions of the in point and the out point are both shifted to the front and the length of the clip as a whole is reduced.

It is understood that by changing the in point frame of the clip, the positions of frames extracted at equal intervals from the start of the clip are also varied. It is also understood that by changing the length of the clip, the number of thumbnail images extracted is also varied.

Thus, a result of editing in the time line window 5 is reflected in display contents of the thumbnail section 13B, so that display contents within each clip can be grasped accurately.

It is of course desirable that this automatic updating function be switched to be performed or stopped by selection by the user.

(1-5) Fifth Embodiment

In this embodiment, description will be made of a case where thumbnail images at fixed points in time are displayed.

Figure 10A:
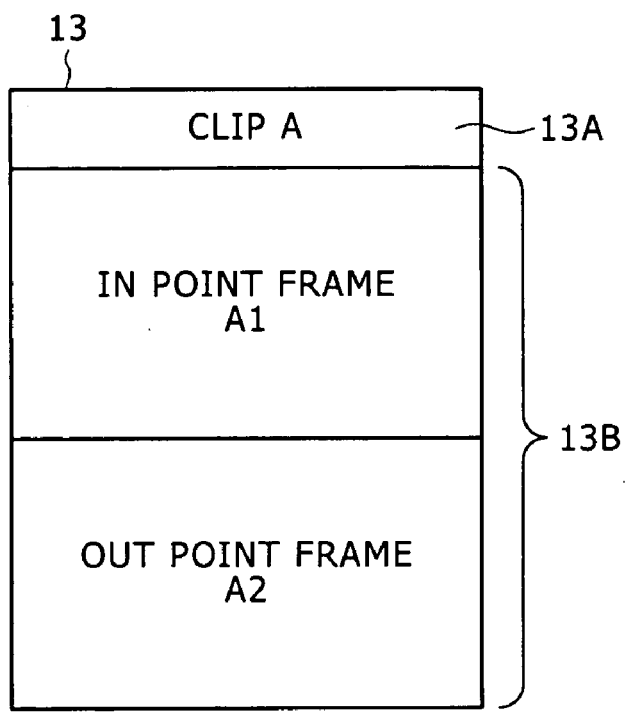
FIGS. 10A and 10B are diagrams showing an example of display in which a thumbnail image of an in point frame and a thumbnail image of an out point frame are combined with each other.
Figure 10B:
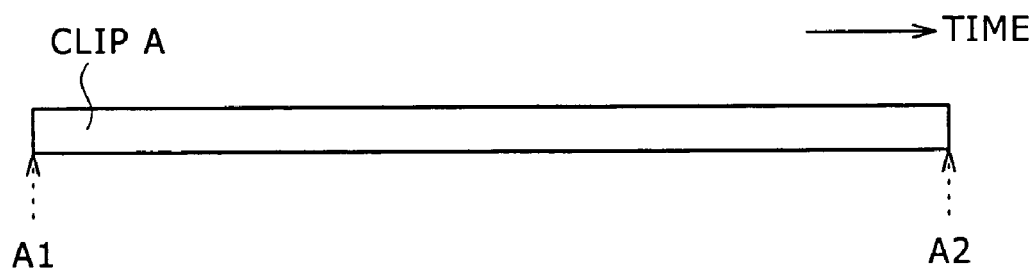

FIGS. 10A and 10B show an example of display in this case. FIGS. 10A and 10B show a case where two points in time of an in point frame and an out point frame are displayed.

FIG. 10A shows an example of display of the thumbnail section 13B corresponding to the clip A. On the other hand, FIG. 10B shows positions (time point information) within the clip to which thumbnail images A1 and A2 correspond.

When this display system is selected, it is possible to check not only the story of the entire program but also connections between clips simultaneously.

For example, when eyes are moved between the thumbnail image corresponding to the out point of the clip A and a thumbnail image corresponding to the in point of the clip B, a connection between the clips A and B can be checked. Incidentally, this display may be combined with the other display forms described above.

(1-6) Sixth Embodiment

In this embodiment, description will be made of a case where a boundary line is displayed with a line width corresponding to a time difference between two thumbnail images displayed in the thumbnail section 13B.

Figure 11A:
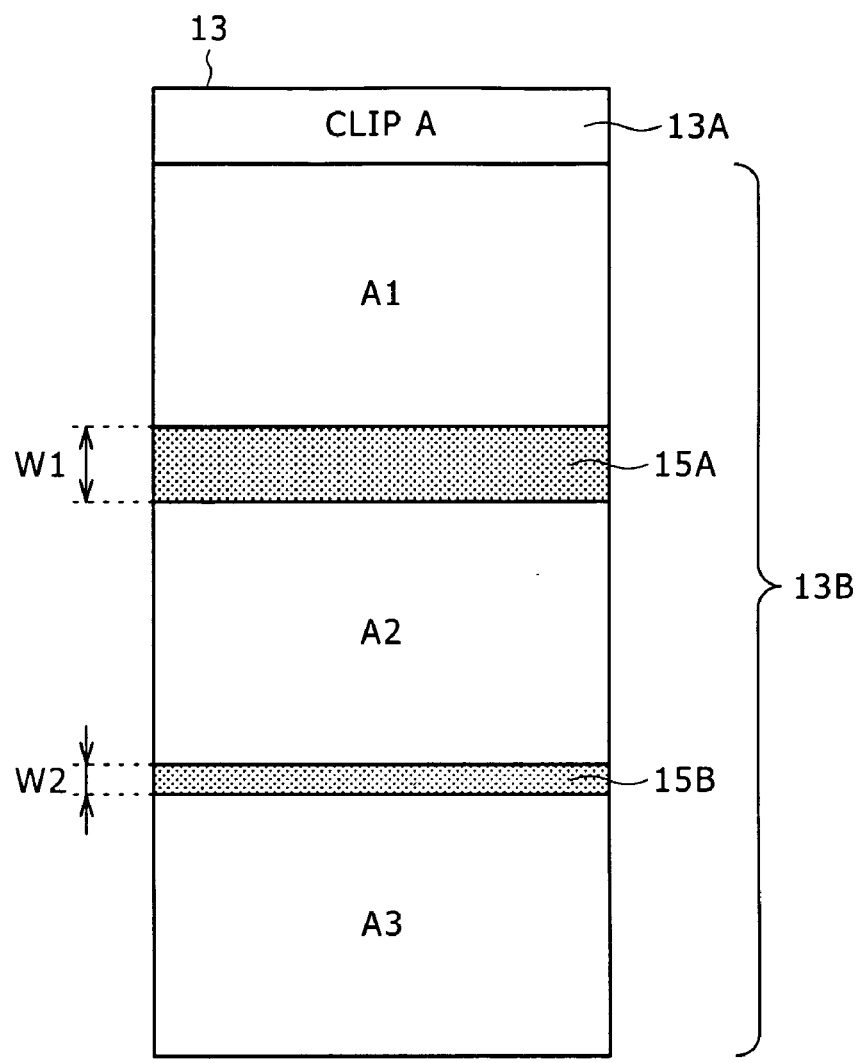
FIGS. 11A and 11B are diagrams showing an example of display when a time difference between thumbnail images is displayed as a line width of a boundary line.
Figure 11B:
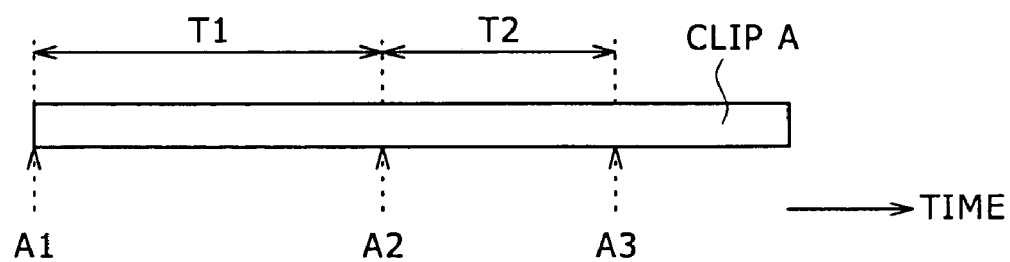

FIGS. 11A and 11B show an example of display in this case. In this embodiment, description will be made of a case where three thumbnail images arbitrarily specified by the user are displayed.

FIG. 11A shows an example of display of the thumbnail section 13B corresponding to the clip A. On the other hand, FIG. 11B shows positions (time point information) within the clip to which the thumbnail images A1, A2, and A3 correspond.

In FIG. 11A, a boundary line 15A having a line width W1 is displayed between the thumbnail images A1 and A2. Also, a boundary line 15B having a line width W2 is displayed between the thumbnail images A2 and A3.

The line width W1 corresponds to a time difference T1 between the thumbnail images A1 and A2. On the other hand, the line width W2 corresponds to a time difference T2 between the thumbnail images A2 and A3.

In this case, a correspondence relation between the line width W and the time difference T is basically a proportional relation. That is, basically, the greater the time difference T, the greater the line width W. This proportional relation is also desirable in estimating a time difference between thumbnail images from the display of the thumbnail section 13B.

However, when a simple proportional relation is applied, the line width may become very wide. This means a very wide area for displaying the line width.

Accordingly, the time difference T may be given as a variable for a logarithmic function, and the line width W may be defined as a logarithmic converted value. In this case, a resolution of an area for a small time difference T can be increased, and a resolution of an area for a large time difference T can be decreased.

Conversely, when a resolution of an area for a large time difference T needs to be increased, the time difference T may be given as a variable for an exponential function, and the line width W may be defined as an exponential converted value.

Of course, the function for associating the time difference T and the line width W with each other is not limited to these functions.

By employing such a display form, it is possible to check not only a story within the clip but also time differences between thumbnail images simultaneously. This display form can be combined with the other display forms described above.

By adjusting a line width according to a time difference T as in this embodiment, the time difference between thumbnail images can also be checked at the same time.

(1-7) Seventh Embodiment

In this embodiment, description will be made of a case where two thumbnail images displayed in the thumbnail section 13B are disposed so as to be separated from each other by a length corresponding to a time difference between the two thumbnail images. That is, description will be made of a case where a blank area corresponding to the time difference between the two thumbnail images displayed in the thumbnail section 13B is provided between the two thumbnail images.

Figure 12A:
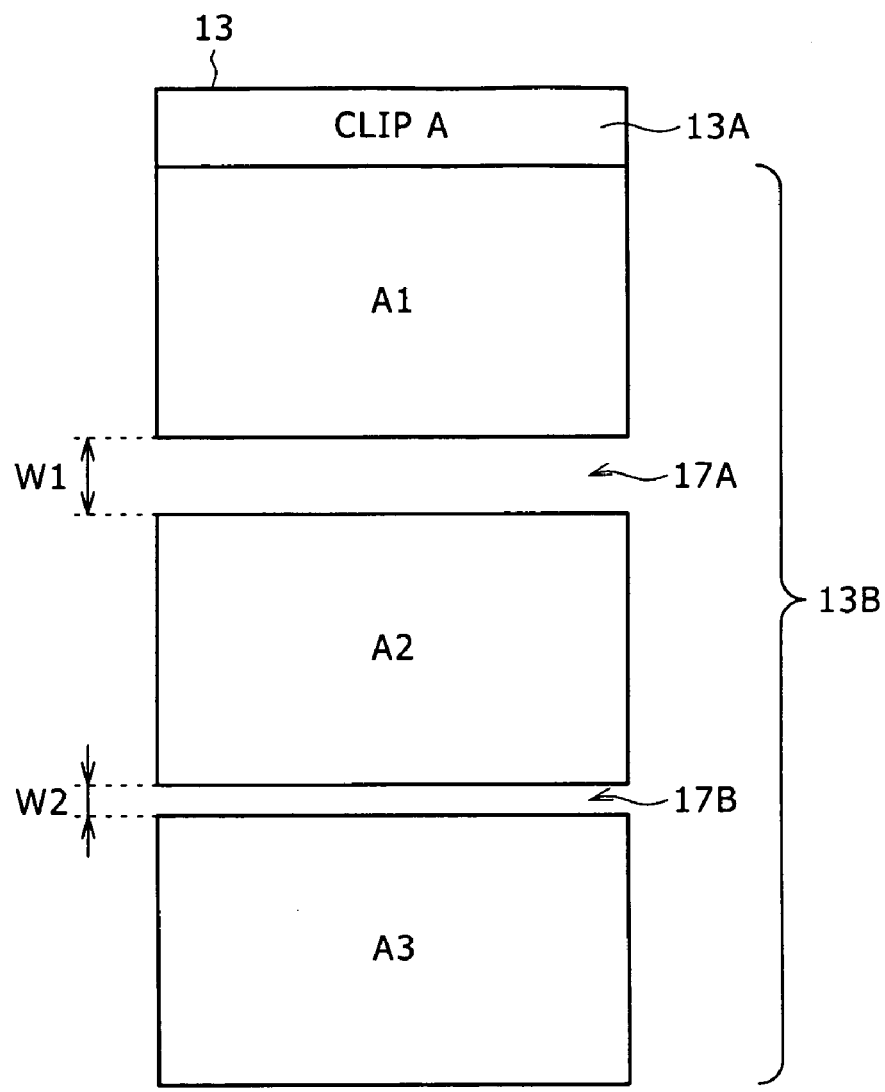
FIGS. 12A and 12B are diagrams showing an example of display when a time difference between thumbnail images is displayed as a width of a blank area.
Figure 12B:
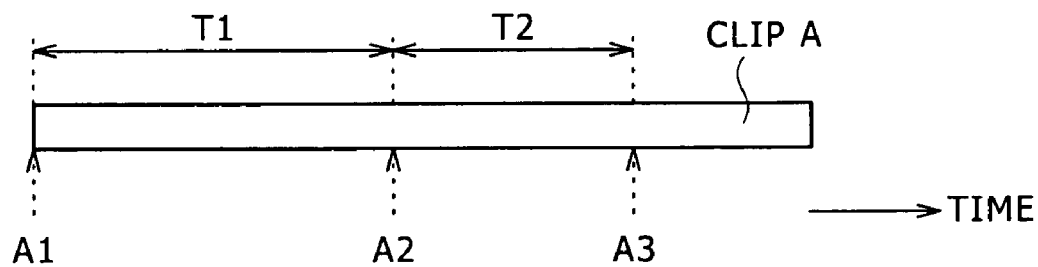

This seventh embodiment is the same as the sixth embodiment with the boundary lines removed. FIGS. 12A and 12B show an example of display in this case. Also in this embodiment, description will be made supposing that three thumbnail images arbitrarily specified by the user are displayed.

FIG. 12A shows an example of display of the thumbnail section 13B corresponding to the clip A. On the other hand, FIG. 12B shows positions (time point information) within the clip to which the thumbnail images A1, A2, and A3 correspond.

In FIG. 12A, a blank area 17A having a width W1 is provided between the thumbnail images A1 and A2. Also, a blank area 17B having a width W2 is provided between the thumbnail images A2 and A3.

The width W1 corresponds to a time difference T1 between the thumbnail images A1 and A2. On the other hand, the width W2 corresponds to a time difference T2 between the thumbnail images A2 and A3.

Also in this case, a correspondence relation between the width W and the time difference T is basically a proportional relation. That is, basically, the greater the time difference T, the greater the width W. This proportional relation is also desirable in estimating a time difference between thumbnail images from the display of the thumbnail section 13B.

However, when a simple proportional relation is applied, the blank area may become very wide. In this case, the blank area becomes very wide.

Accordingly, the time difference T may be given as a variable for a logarithmic function, and the blank area width W may be defined as a logarithmic converted value. In this case, a resolution of an area for a small time difference T can be increased, and a resolution of an area for a large time difference T can be decreased.

Conversely, when a resolution of an area for a large time difference T needs to be increased, the time difference T may be given as a variable for an exponential function, and the blank area width W may be defined as an exponential converted value.

Of course, the function for associating the time difference T and the blank area width W with each other is not limited to these functions.

By employing such a display form, it is possible to check not only a story within the clip but also time differences between thumbnail images simultaneously. This display form can be combined with the other display forms described above.

By adjusting a blank area width according to a time difference T as in this embodiment, the time difference between thumbnail images can also be checked at the same time.

(1-8) Eighth Embodiment

In this embodiment, description will be made of a case where a boundary line between two thumbnail images displayed in the thumbnail section 13B is provided with a color corresponding to a time difference between the two thumbnail images.

Figure 13A:
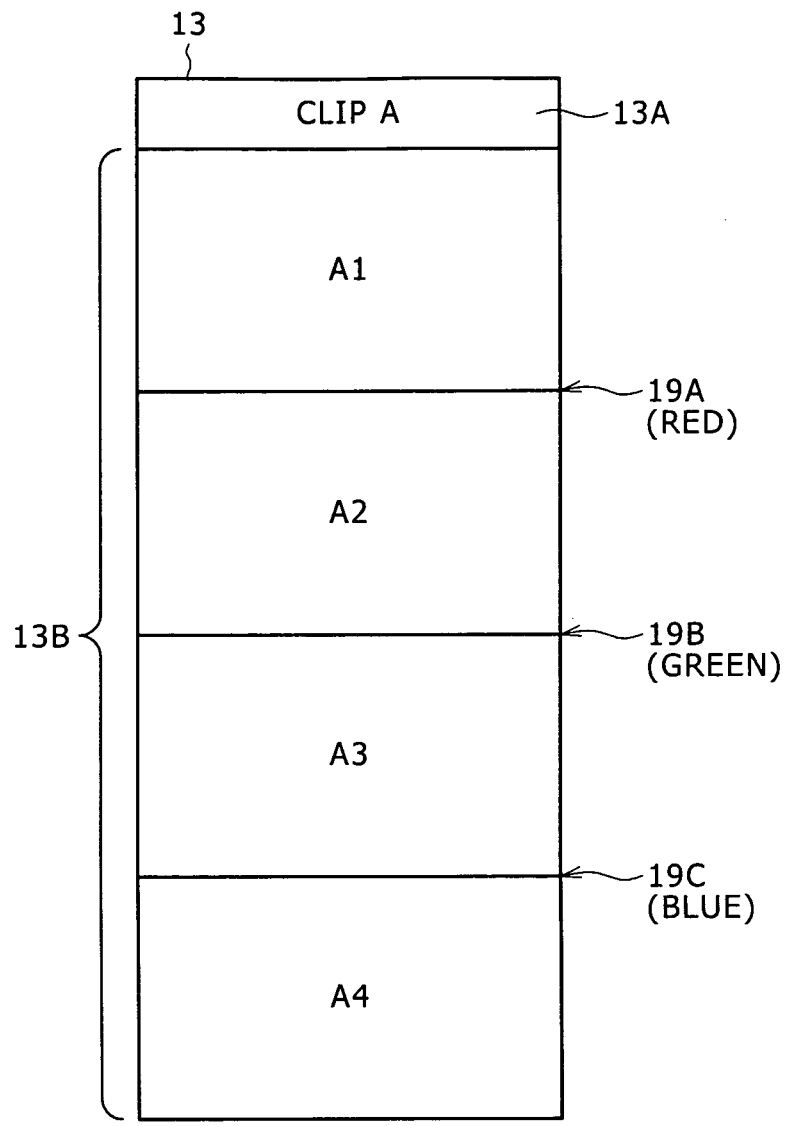
FIGS. 13A and 13B are diagrams showing an example of display when a time difference between thumbnail images is displayed as a color of a boundary line.
Figure 13B:
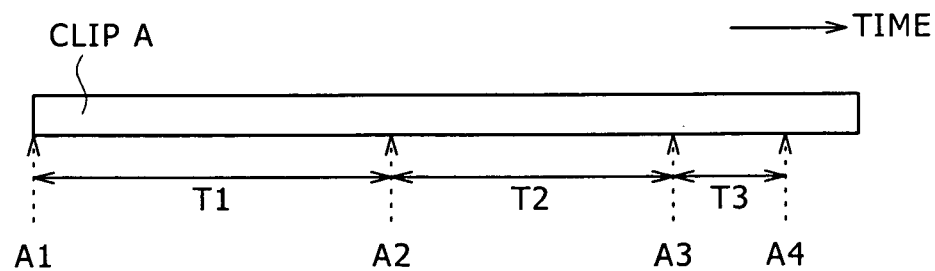

FIGS. 13A and 13B show an example of display in this case. This embodiment will be described supposing that four thumbnail images arbitrarily specified by the user are displayed.

FIG. 13A shows an example of display of the thumbnail section 13B corresponding to the clip A. On the other hand, FIG. 13B shows positions (time point information) within the clip to which thumbnail images A1, A2, A3, and A4 correspond.

In FIG. 13A, a red boundary line 19A is provided between the thumbnail images A1 and A2. A green boundary line 19B is provided between the thumbnail images A2 and A3. A blue boundary line 19C is provided between the thumbnail images A3 and A4.

The red boundary line 19A corresponds to a time difference T1 between the thumbnail images A1 and A2. On the other hand, the green boundary line 19B corresponds to a time difference T2 between the thumbnail images A2 and A3. The blue boundary line 19C corresponds to a time difference T3 between the thumbnail images A3 and A4.

In the case of this embodiment, a relation between the time differences is T1>T2>T3. In this case, correspondence relations between the colors of the boundary lines and the time differences T depend on settings in advance.

In this embodiment, the time difference is divided into a plurality of levels, and a specific color is associated with each division. Incidentally, it suffices to determine the division to which an actually measured value of the time difference T belongs by comparing the actually measured value of the time difference T with threshold values corresponding to respective divisions.

Incidentally, it is desirable that the number of divisions and colors associated with the respective divisions be able to be individually set by the user. This is because conforming to a way of use of the user is effective in increasing work efficiency.

When a time difference T between thumbnail images is represented by a display color of the boundary line as in this embodiment, spaces prepared in the sixth embodiment and the seventh embodiment can be allocated for display of the thumbnail images. That is, effective use of spaces can be realized.

In addition, display positions of thumbnail images can be aligned between clips, thus increasing visibility. ](1-9) Ninth Embodiment In this embodiment, description will be made of a case where the display form of the thumbnail section 13B can be selectively changed. That is, description will be made of a case where selective switching can be performed between the display form of each of the foregoing embodiments and the display form in which only one thumbnail image is displayed for one clip.

Figure 14A:
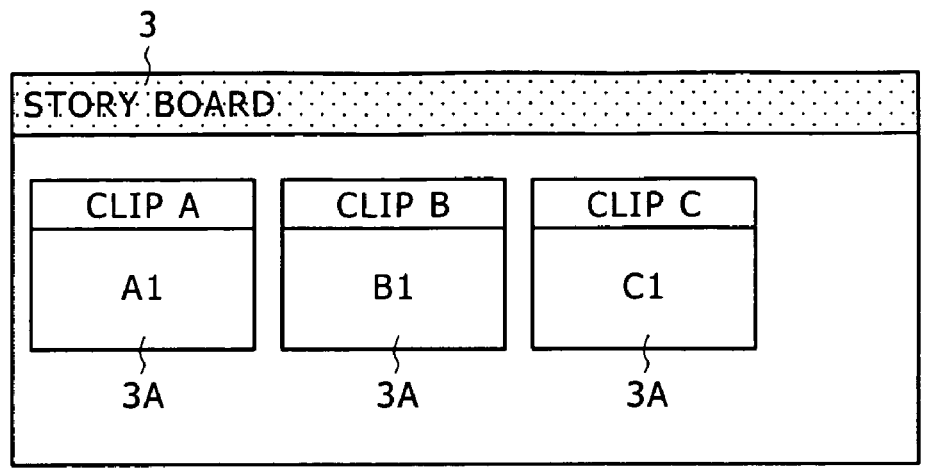
FIGS. 14A and 14B are diagrams of assistance in explaining display in which a display form is changed.
Figure 14B:
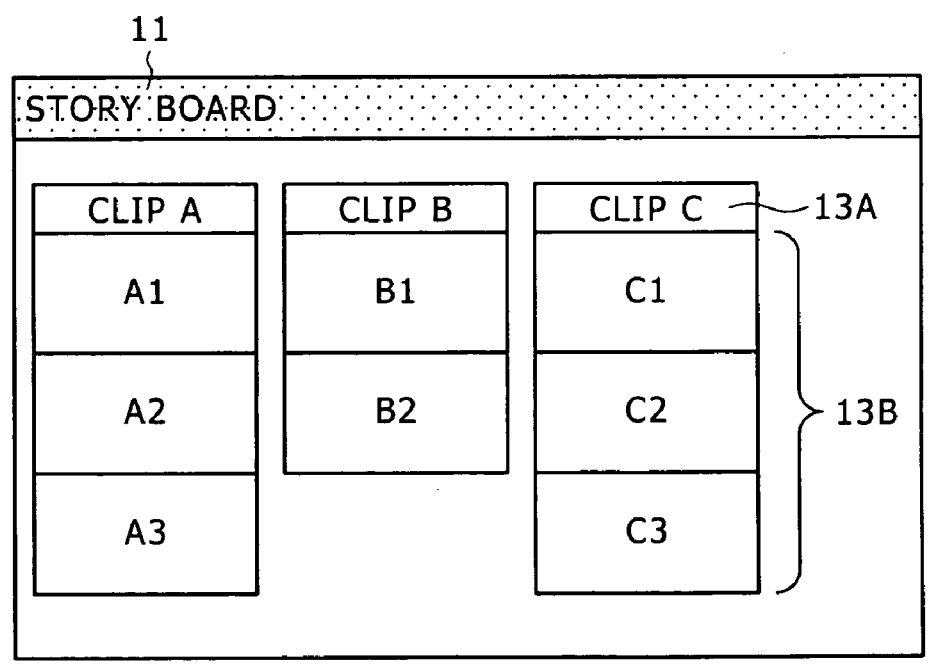

FIGS. 14A and 14B show an example of display in this case. FIG. 14A corresponds to the existing display form. That is, FIG. 14A corresponds to an example of display when only one thumbnail image is displayed for each clip. In this example, thumbnail images representing three clips A, B, and C, respectively, are displayed. Generally, a thumbnail image corresponding to an in point of each clip is used as a thumbnail image of this kind.

On the other hand, FIG. 14B shows an example of display when thumbnail images at a plurality of points in time are displayed for one clip.

Incidentally, suppose that an instruction to change the display form can be input by using an icon on the screen and a pointing device.

When a function of switching between two kinds of display forms is incorporated as in this embodiment, the user can change the display form as required.

For example, when the user desires to check contents of a clip, the user can select the display forms in the foregoing embodiments that allow detailed information of each clip to be checked.

For example, when the user desires to grasp an outline of the story of the entire program, the user can select the existing display form.

Thus, it is possible to improve usability for the user and increase work efficiency.

(1-10) Tenth Embodiment

In the foregoing ninth embodiment, simply switching is performed between the display forms. In the tenth embodiment, description will be made of a modification of the existing display form.

Figure 15A:
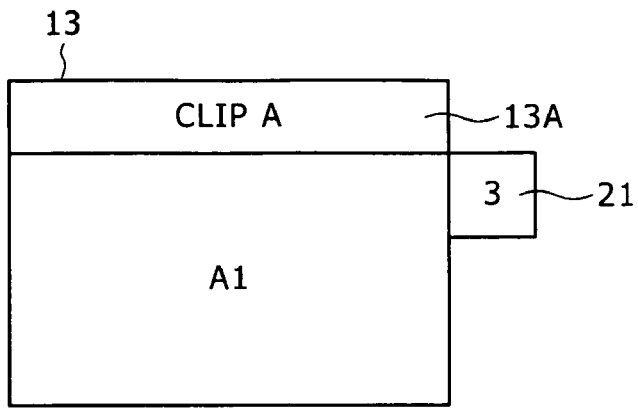
FIGS. 15A and 15B are diagrams showing an example of index display in which the number of thumbnail images to be displayed when detailed display of clip contents is selected is shown.
Figure 15B:
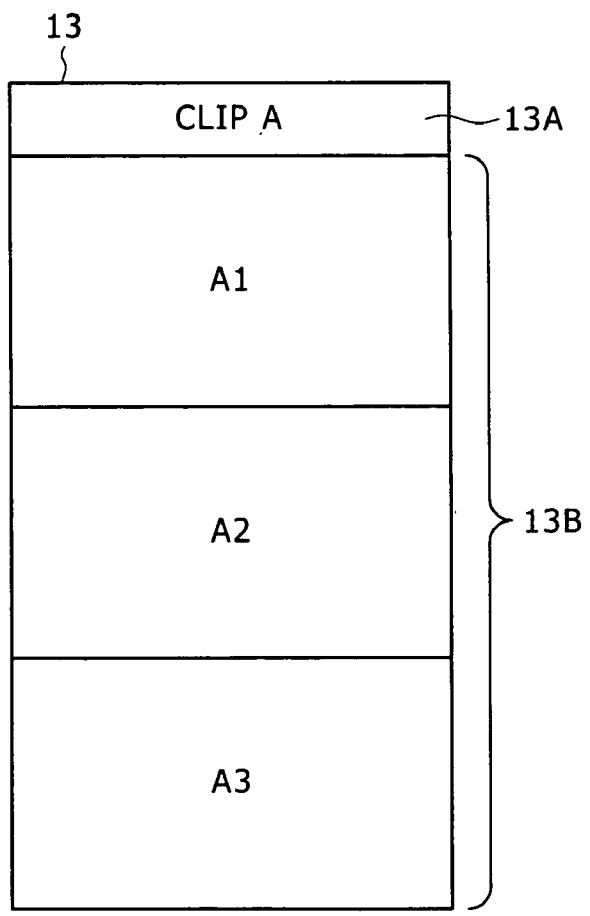

FIGS. 15A and 15B show an example of display in this case. FIG. 15A corresponds to the existing display form in which only one thumbnail image is displayed in the thumbnail section 13B. In this example, only a thumbnail image A1 representing a clip A is shown displayed.

However, in FIG. 15A, a display area for displaying information that is not present in the existing display form is provided. This display area is an index display 21 for displaying the number N of thumbnail images to be displayed in the thumbnail section 13B when the display form for showing detailed contents of the clip is to be selected (that is, when a plurality of thumbnail images are to be displayed).

In the case of FIG. 15A, the index display 21 displays "3" as the number of thumbnail images. Incidentally, FIG. 15B shows an example of display after the display form is changed. The value of the index display 21 and the number of thumbnail images coincide with each other.

Thus, when the display method represented in FIG. 15A is employed, the user can understand that a story board window 13 is ready for two kinds of display forms. That is, the user can understand that switching between the display forms is possible.

In addition, the user knows in advance the number of thumbnail images that can be checked after changing the display form. This predictability is effective in improving work efficiency of the user.

Incidentally, in this embodiment, a total number of thumbnail images to be displayed after the changing of the display form is displayed as the number N displayed in the index display 21. That is, the number of thumbnail images including the thumbnail image A1 displayed in FIG. 15A is displayed.

However, as the number N displayed in the index display 21, only the number of thumbnail images to be newly displayed after the changing of the display form may be displayed. That is, "2," which denotes thumbnail images A2 and A3, may be displayed.

When this display form is used, the number of thumbnail images obtained by a display form change can be predicted. Referring to this number, the user can determine whether to change the display form.

Incidentally, switching to the display form for showing the detailed contents of the clip may be performed by using another icon to be described later, for example. Also,.the screen switching may be performed by positioning a pointer in the index display 21.

(1-11) Eleventh Embodiment

Figure 16A:
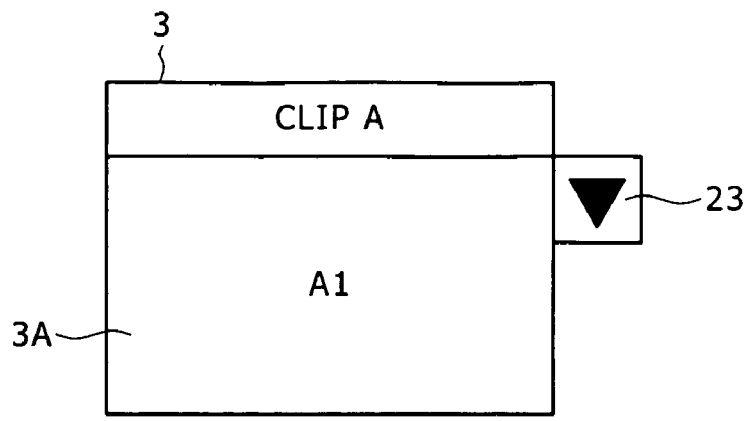
FIGS. 16A and 16B are diagrams showing an example of display of an operating button used to change a display form when only one thumbnail image is displayed.
Figure 16B:
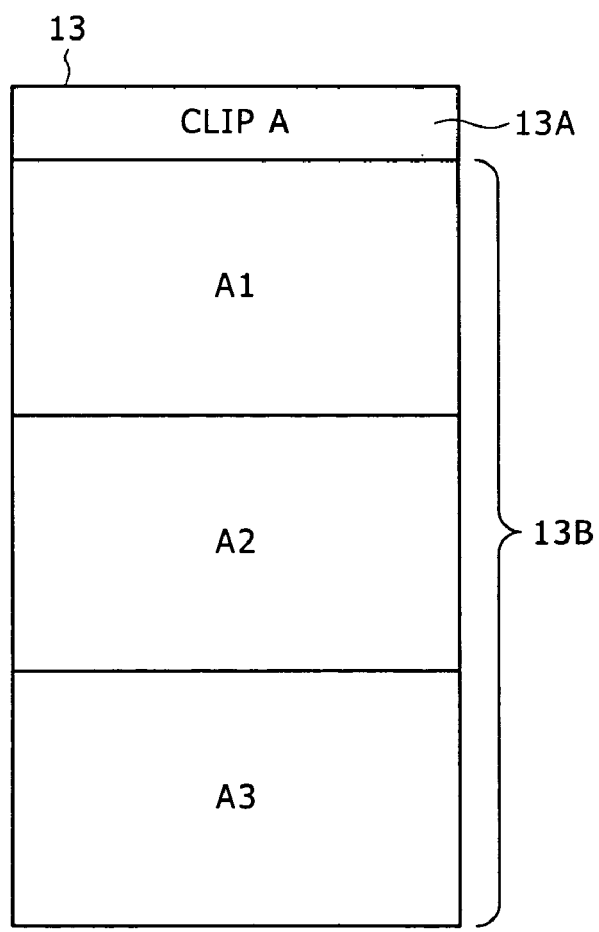

Also in this embodiment, description will be made of a modification of the existing display form. FIGS. 16A and 16B show an example of display in this case. FIG. 16A corresponds to the existing display form in which only one thumbnail image is displayed in a thumbnail section 3A. In this example, only a thumbnail image A1 representing a clip A is displayed.

However, in FIG. 16A, an operating button 23 that is not present in the existing display form is provided. This operating button 23 is an icon for giving an instruction to change to a display form for showing detailed contents of the clip.

In the case of FIG. 16A, a pull-down mark is displayed on the operating button 23. In this embodiment, the user can change to a display form of FIG. 16B by specifying the operating button 23 by a pointer or the like. Incidentally, in FIG. 16B, three thumbnail images A1, A2, and A3 are displayed.

Thus, when the display method represented in FIG. 16A is employed, the user can understand that a story board window 11 is ready for two kinds of display forms. That is, the user can understand that switching between the display forms is possible.

In addition, the operating button 23 is disposed so as to be adjacent to the thumbnail section 3A to be expanded. Thus, the user can efficiently continue operation without moving eyes of the user very much. That is, the user can proceed with the operation efficiently.

Incidentally, the display position of the operating button 23 and the display form of the button shown in FIG. 16A are one example, and the present invention is not limited thereto.

(1-12) Twelfth Embodiment

In this embodiment, description will be made of an example of display as a combination of the tenth embodiment and the eleventh embodiment.

Figure 17A:
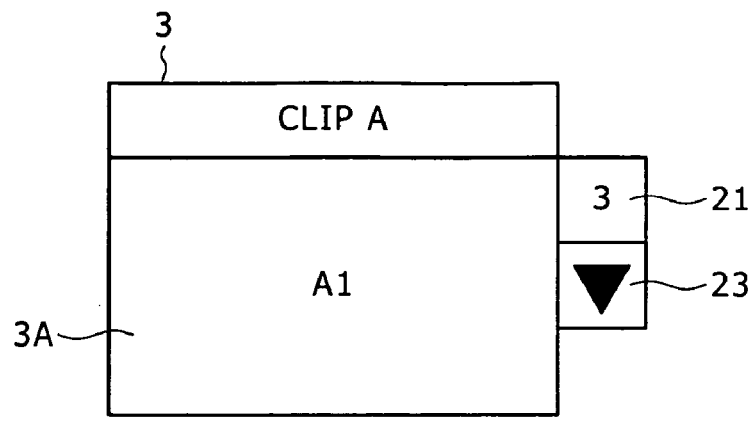
FIGS. 17A and 17B are diagrams showing an example of display in which index display and an operating button associated with an instruction to change a display form are combined with each other.
Figure 17B:
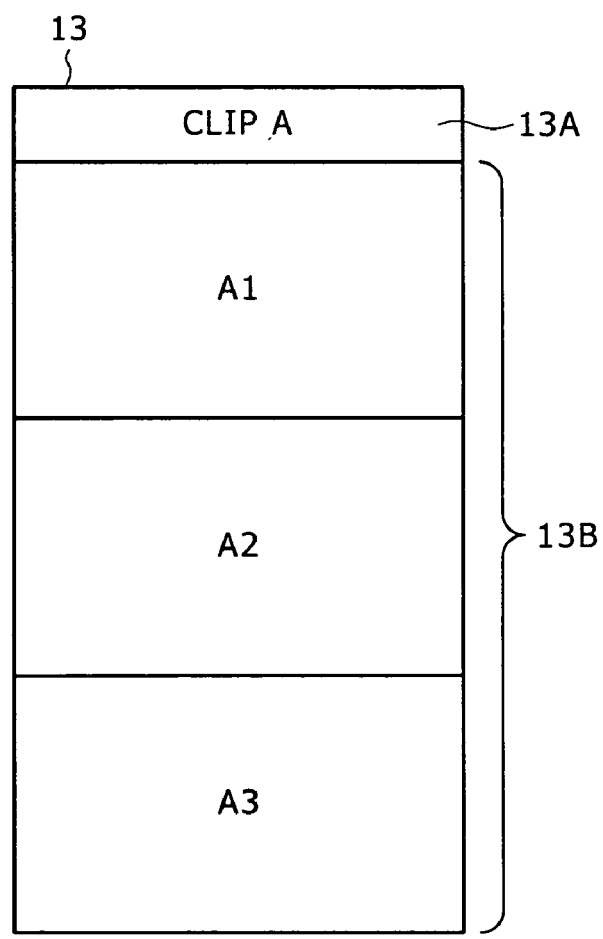

FIGS. 17A and 17B show an example of display in this case. FIG. 17A corresponds to the existing display form in which only one thumbnail image is displayed in a thumbnail section 3A.

In this example, an index display 21 and an operating button 23 are displayed in the thumbnail section 3A.

The index display 21 is the area described in the foregoing tenth embodiment for displaying the number N of thumbnail images to be displayed in the thumbnail section 13B when the display form for showing the detailed contents of the clip is to be selected.

On the other hand, the operating button 23 is the icon described in the foregoing eleventh embodiment for giving an instruction to change to the display form for showing the detailed contents of the clip.

This embodiment makes it possible to check the number of thumbnail images to be displayed after the changing of the display form and change the display form without moving eyes.

(1-13) Thirteenth Embodiment

While in the foregoing tenth to twelfth embodiments, description has been made of the modifications applied to the existing display form, description in the thirteenth embodiment will be made of a modification applied to the display form for showing the detailed contents of a clip.

Figure 18A:
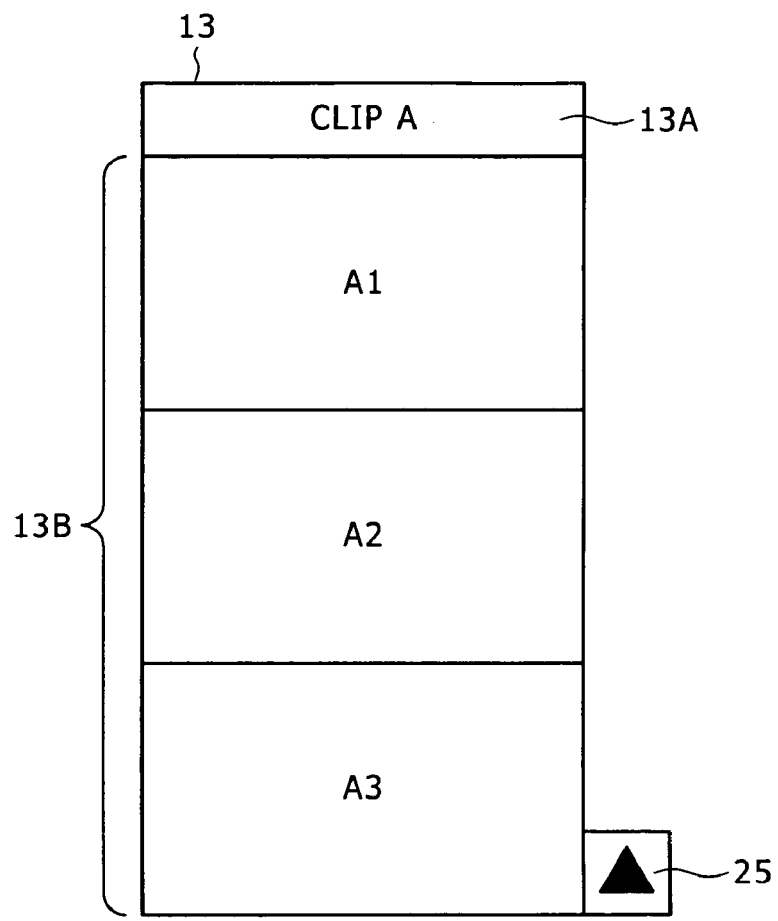
FIGS. 18A and 18B are diagrams showing an example of display of an operating button used to change a display form when a plurality of thumbnail images are displayed.
Figure 18B:
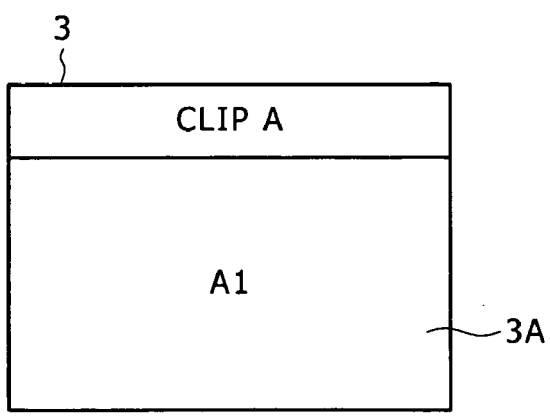

FIGS. 18A and 18B show an example of display in this case. FIG. 18A shows an example of display in the display form for showing the detailed contents of a clip. In this embodiment, three thumbnail images A1, A2, and A3 forming the clip A are displayed.

In FIG. 18A, however, an operating button 25 that does not exist in the other display forms described earlier is provided. This operating button 25 is an icon for giving an instruction to change the display form from a state in which the three thumbnail images corresponding to the clip are displayed to a state in which only one thumbnail image is displayed.

In the case of FIG. 18A, a pull-up mark is displayed on the operating button 25. In this embodiment, the user can change to a display form of FIG. 18B by specifying the operating button 25 by a pointer or the like. Incidentally, in FIG. 18B, only thumbnail image A1 is displayed.

Thus, when the display method represented in FIG. 18A is employed, the user can understand that a story board window 13 is ready for two kinds of display forms. That is, the user can understand that switching between the display forms is possible.

In addition, the operating button 25 is disposed so as to be adjacent to a thumbnail section 13B to be folded. Thus, the user can efficiently continue operation without moving eyes of the user very much. That is, the user can proceed with the operation efficiently.

Incidentally, the display position of the operating button 25 and the display form of the button shown in FIG. 18A are one example, and the present invention is not limited thereto.

(1-14) Fourteenth Embodiment

In this embodiment, description will be made of an example of display in a case where a new clip A' is created by combining a clip A with a clip B.

FIGS. 19A, 19B, 19C, 19D, 19E, and 19F show an example of display in this case. Incidentally, in FIGS. 19A, 19B, 19C, 19D, 19E, and 19F, a method of displaying a boundary line having a line width corresponding to a time difference between thumbnail images is employed.

Figure 19:
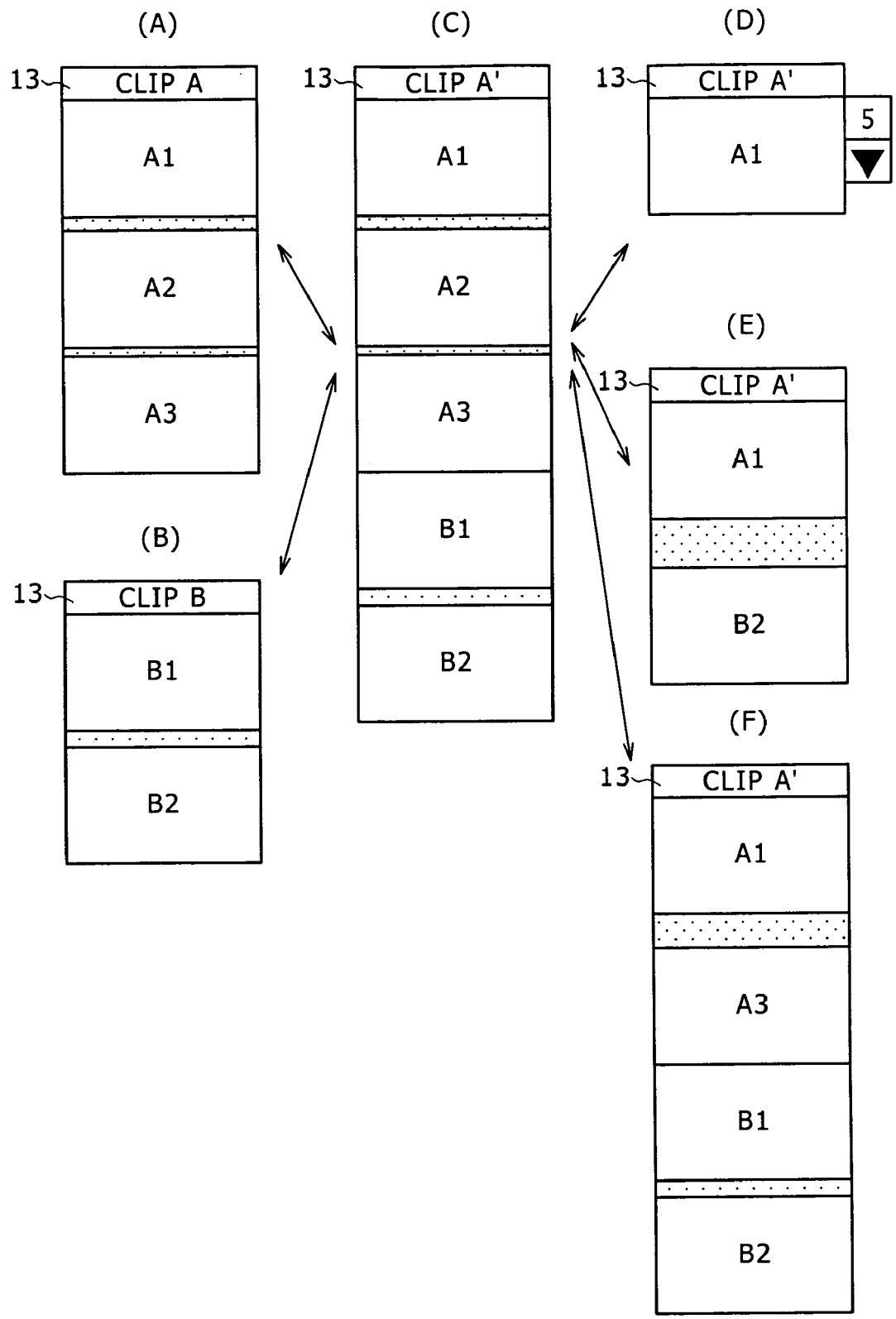
FIGS. 19A, 19B, 19C, 19D, 19E, and 19F are diagrams showing an example of display in which a new clip is created by combining two clips with each other.

An example of display of the clip A is shown in FIG. 19A. Suppose in this example that three thumbnail images A1, A2, and A3 are displayed. On the other hand, an example of display of the clip B is shown in FIG. 19B. Suppose in this example that two thumbnail images B1 and B2 are displayed.

In this case, an example of display when the clip B is combined at the rear of the clip A is shown in FIG. 19C.

FIG. 19C corresponds to a display method of retaining display forms before the combination as they are in the new clip A'. Since the display forms before and after the combination are the same, the display forms agree with an image of the combination of the clips. In addition, when the clip A' is divided into the clip A and the clip B again, since the display forms before and after the division are the same, the display forms agree with an image of the division of the clip.

However, with the display method of FIG. 19C, the number of thumbnail images displayed after the combination can be very large.

In this case, it suffices to employ the display method of the twelfth embodiment and thus employ a display method represented in FIG. 19D. In this display example, the number of thumbnail images and a pull-down mark are displayed.

Other methods for displaying the clip A' include display methods represented in FIG. 19E and FIG. 19F.

FIG. 19E corresponds to a display example in which a first thumbnail image and a last thumbnail image of the five thumbnail images forming the clip A' are displayed. Incidentally, a boundary line having a line width corresponding to a time difference between the thumbnail image A1 and the thumbnail image B2 is displayed between the thumbnail image A1 and the thumbnail image B2.

FIG. 19F corresponds to a display example in which a first thumbnail image and a last thumbnail image of each of the sub-clips A and B forming the clip A' are displayed. In this display example, the thumbnail images A1, A3, B1, and B2 are displayed. Also, a boundary line having a line width corresponding to a time difference between the thumbnail images is displayed between the thumbnail images.

By employing these display methods, effective editing operation using a story board window 11 is realized.

It is to be noted that the examples of display of the clip A' are not limited to those shown in FIGS. 19C to 19F. Also, when the clip A' is divided into two pieces at an arbitrary boundary position, the display form of the clip A' can be stored in the sub-clips after the division.

(1-15) Fifteenth Embodiment

Description will be made of another method of display of the story board window 11.

Figure 20:
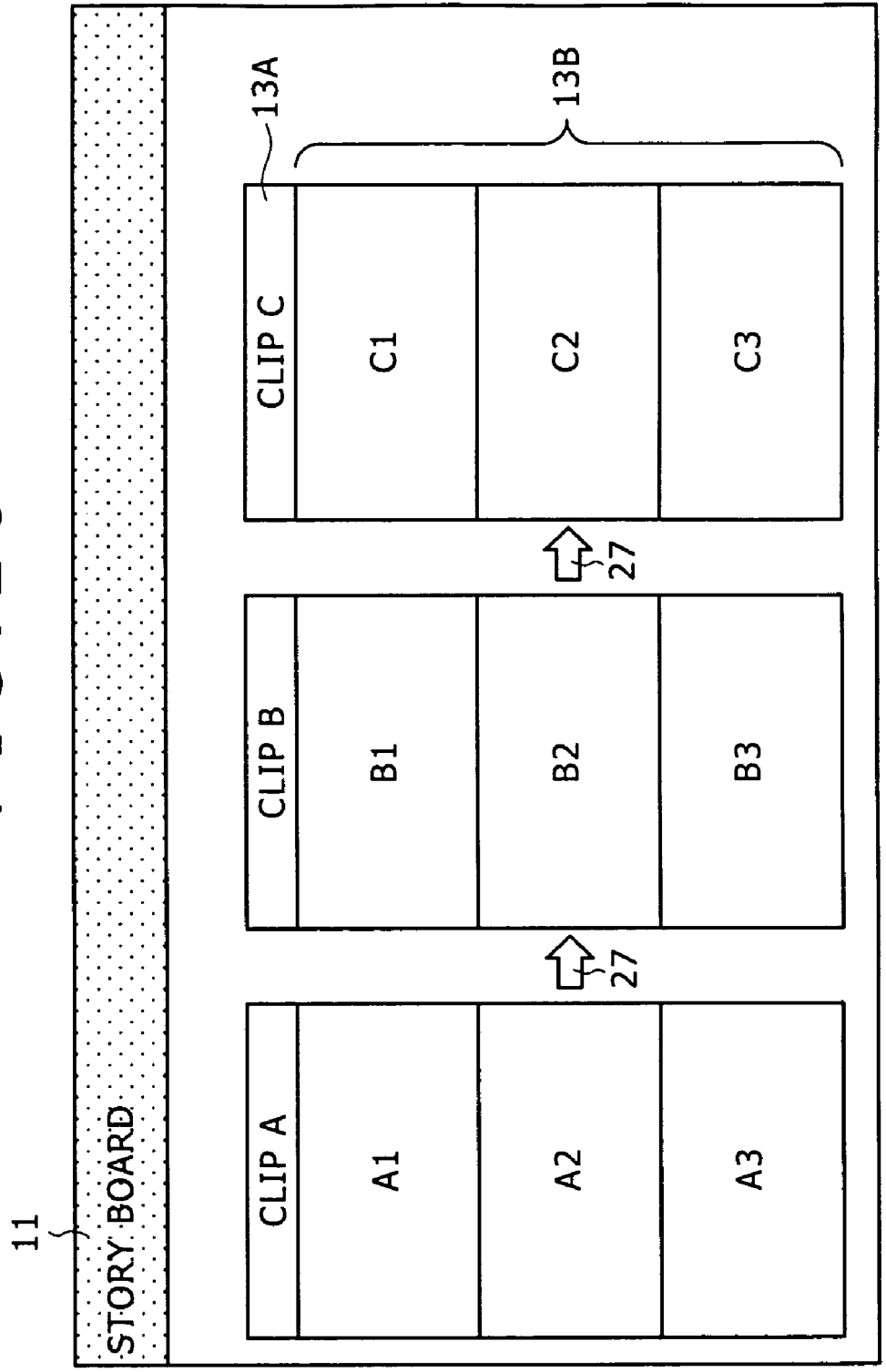
FIG. 20 is a diagram showing an example of display in which arrows indicating a direction of reproduction are additionally displayed.

FIG. 20 shows an example of display in this case. FIG. 20 shows an example in which an arrow 27 indicates a direction of reproduction between clips. The arrow 27 is disposed between displays corresponding to respective clips. By employing this display method, it is possible to provide a display form that is easy for any user to understand. That is, any user can be readily made to know a relation between arrangement of clips and the direction of reproduction.

(1-16) Sixteenth Embodiment

Description will be made of a further method of display of the story board window 11.

FIG. 21 shows an example of display in this case. FIG. 21 is suitable when the number of clips forming a program is large.

In the display method represented in FIG. 21, thumbnail images displayed in thumbnail sections 13B are reduced in display size.

The display size in FIG. 21 is smaller than the display size in FIG. 3. When there are a large number of clips forming a program, displaying frames in reduced display size allows in point frames and out point frames of all the clips to be checked at once.

Incidentally, it is desirable to allow selection of the display size from not only two display sizes but also three or more display sizes. As choices are increased, a more appropriate display size can be selected according to the number of clips.

(1-17) Seventeenth Embodiment

Description will be made of a further method of display of the story board window 11.

Figure 22:
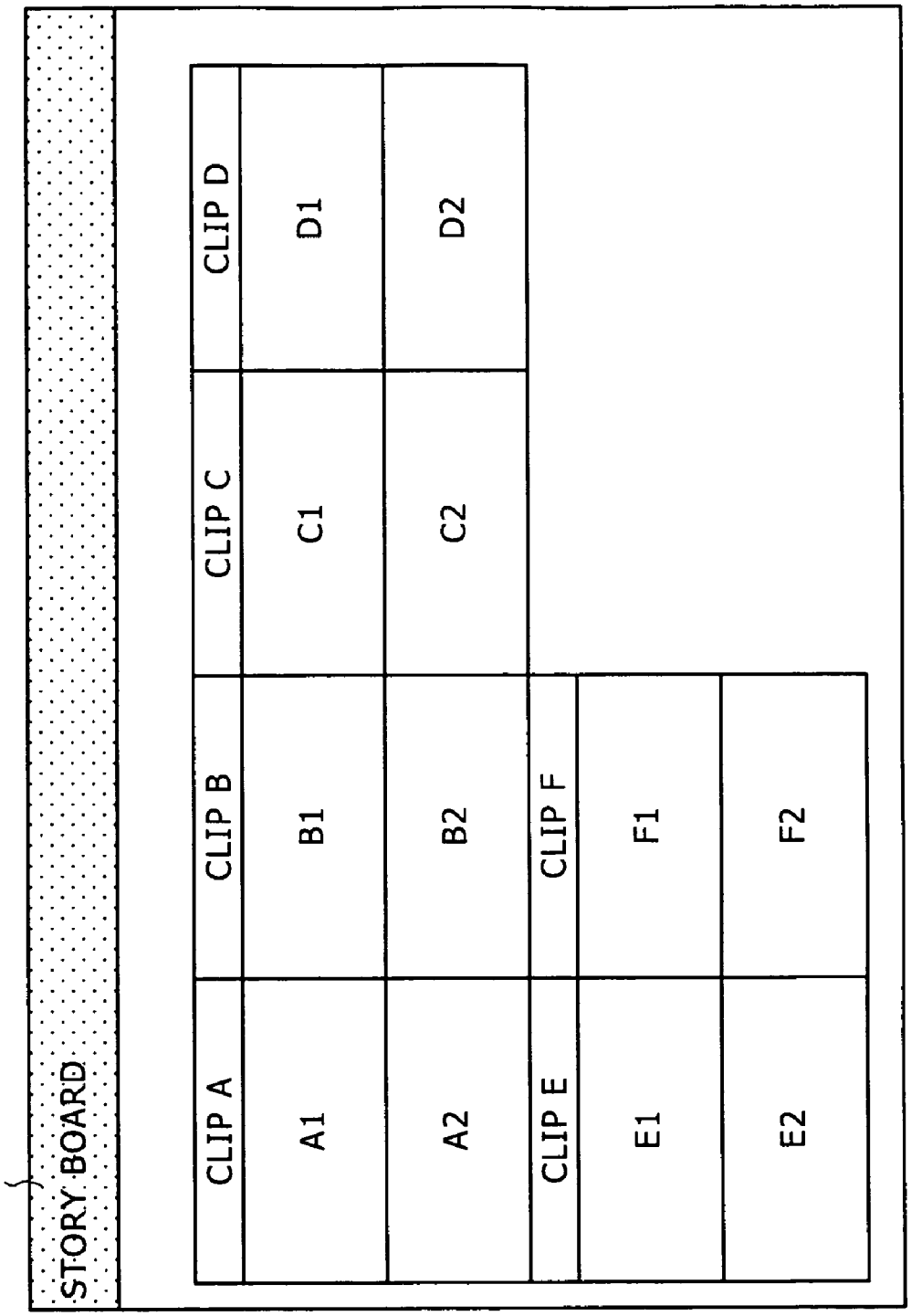
FIG. 22 is a diagram showing an example of display when clips are displayed in multiple rows.

FIG. 22 shows an example of display in this case. FIG. 22 shows an example of display that is also suitable when the number of clips forming a program is large.

In the display example shown in FIG. 22, clips are divided into fixed numbers of clips, and clips that cannot be disposed in one row are displayed in a next row.

Incidentally, FIG. 22 shows a case where clips are displayed in two rows. Of course, clips may be divided and displayed in three rows or more.

In the case of FIG. 22, a direction of reproduction between rows is from the upper row to the lower row. In this example, reproduction is performed from a left end in the first row to a right, and after reproduction in the first row is finished, reproduction is performed from a left end in the second row to a right.

The display example of FIG. 22 corresponds to such reproduction order. By employing such a display example, it is possible to check in point frames and out point frames of all the clips at once.

(1-18) Eighteenth Embodiment

Description will be made of a further method of display of the story board window 11.

Figure 23:
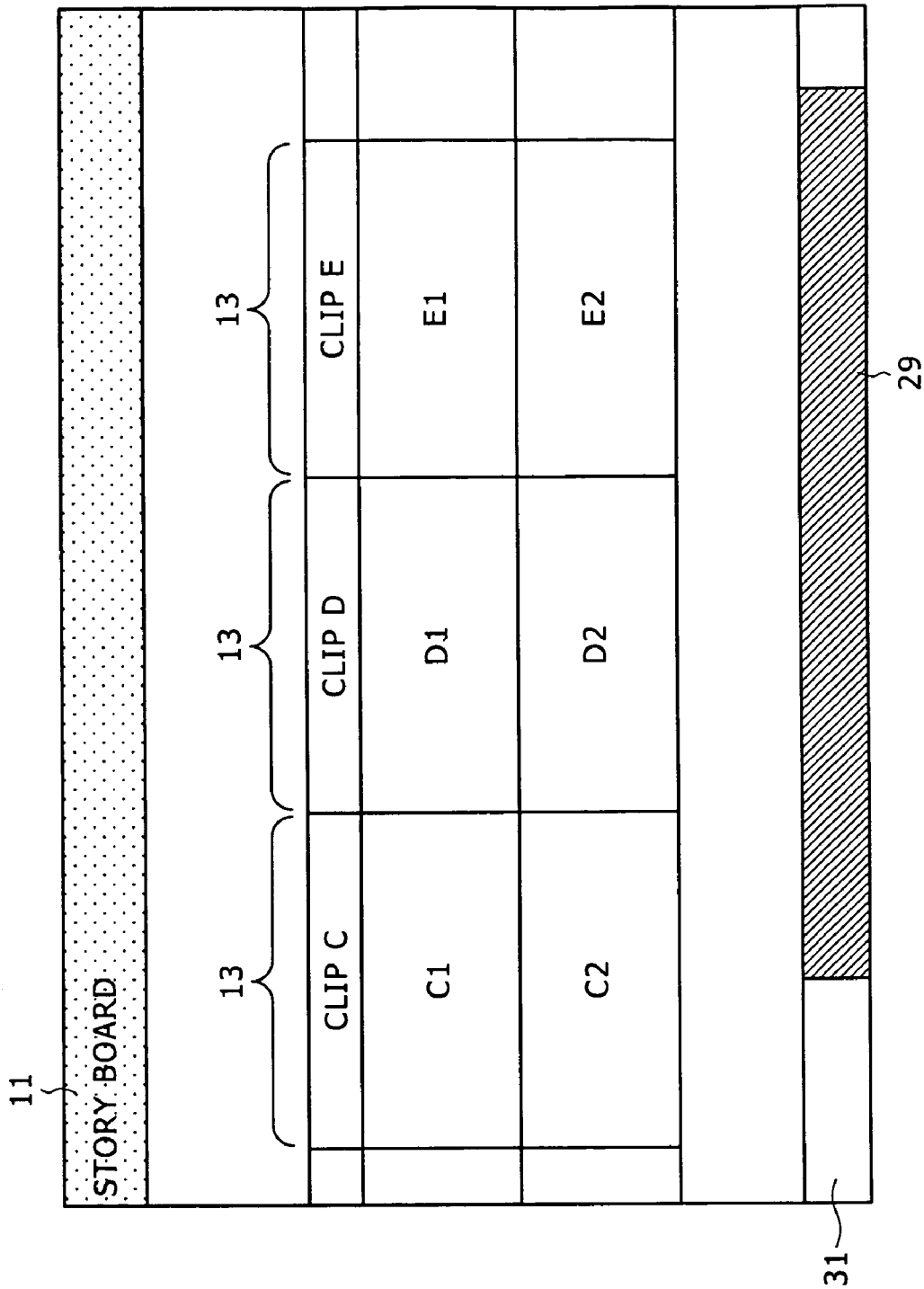
FIG. 23 is a diagram showing an example of display using a scroll bar.

FIG. 23 shows an example of display in this case. FIG. 23 shows an example of display that is also suitable when the number of clips forming a program is large.

In the display example shown in FIG. 23, a display system using a scroll bar 29 is employed. That is, only a number of clips displayable in the story board window 11 are displayed on the screen, and the other clips can be displayed on the screen by operating the scroll bar 29. Incidentally, in this display example, a scroll area 31 is disposed at a bottom of the screen.

FIG. 24 is a conceptual diagram of the display example. FIG. 24 shows a case where six clips form a program, while three clips are displayable in the story board window 11.

FIG. 24 shows a state in which the third to fifth clips from a start are displayed in the story board window 11, and the three other clips are not displayed.

Incidentally, when the first and second clips from the start are desired to be displayed within the story board window 11, it suffices for the user to drag the scroll bar 29 to a left. On the other hand, when the sixth clip from the start is desired to be displayed within the story board window 11, it suffices for the user to drag the scroll bar 29 to a right.

Incidentally, the user can determine the position within the program of the clips displayed in the story board window 11 from, the relative position of the scroll bar 29 in the scroll area 31.

When such a display method is employed, an increase in a rate of reduction of thumbnail images and a decrease in distinguishability of the thumbnail images can be avoided. In addition, since the scroll bar 29 is also displayed, a positional relation as viewed from the entire story can be readily determined.

(1-19) Nineteenth Embodiment

As another embodiment, a clip being selected or being reproduced may be displayed in a form distinguishable from other clips in each of the foregoing display examples.

For example, a clip being selected or being reproduced may be enclosed by a thick frame, an outer frame or a ground may be highlighted, or the display color of an outer frame or a ground may be changed. Of course, there are other display examples conceivable which can be created by those skilled in the art on the basis of the foregoing display examples.

(B) Second Example of GUI Screen

(1) Example of Story Board Screen Enabling Story Editing

Description will be made below of an example of an editing screen displayed when an editing operation is performed on a story board window capable of displaying a plurality of thumbnail images for one clip.

At present, the story board window 3 is basically used for a limited purpose of story construction. Therefore the story board window 3 is not very much used after the story construction. This is because the operation of the user after the story construction proceeds to an editing operation using the time line window 5.

However, the story board window 3 is an excellent user interface for grasping story development. It is therefore considered that the use of the story board window 3 also for clip editing operations further improves usability for the user.

Accordingly, the inventors propose an example of a screen for realizing an editing operation on the story board window 3 capable of displaying a plurality of thumbnail images for one clip.

For example, techniques having the following processes are proposed.

(a) A process of displaying an in point thumbnail image and an out point thumbnail image in a pair in a display area corresponding to each clip (b) A process of displaying a display area of a thumbnail image corresponding to an edit position in a form distinguishable from other display areas Also, for example, techniques having the following processes are proposed.

(a) A process of displaying an in point thumbnail image and an out point thumbnail image in a pair in a display area corresponding to each clip (b) A process of displaying a display area of a thumbnail image corresponding to an edit position in a display form corresponding to the nature of editing.

Incidentally, "editing" includes a process of editing one or a plurality of clips. In addition, "editing" does not necessarily need to be performed on an entire clip, and may be performed on a part of a clip. For example, editing may be performed on only a part around an in point or only a part around an out point.

By employing such process techniques, it is possible to simultaneously check the story of an entire program and contents of an edit position (for example an in point or an out point) in each clip.

In addition, an edit position and an edited content can be readily checked in the entire story.

As a result, efficiency of editing operation can be increased.

(1-1) First Example of Editing Screen

An example of a screen at a time of editing for clip rearrangement will be illustrated in the following as an example of an editing operation screen. Incidentally, clips can be rearranged in an existing story board window.

Figure 25A:
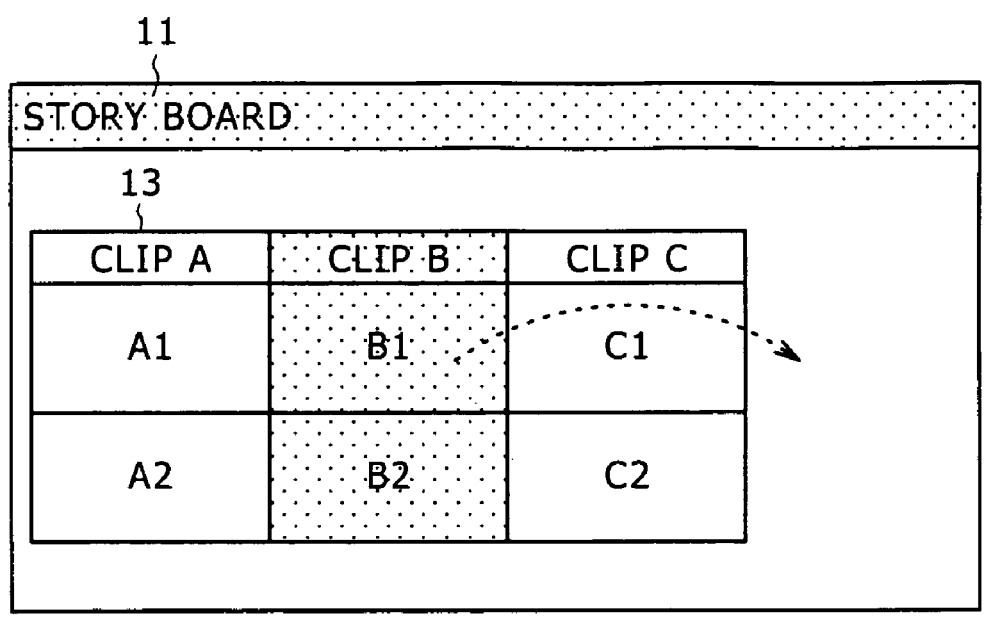
FIGS. 25A and 25B are diagrams showing an example of display when clips are rearranged.
Figure 25B:
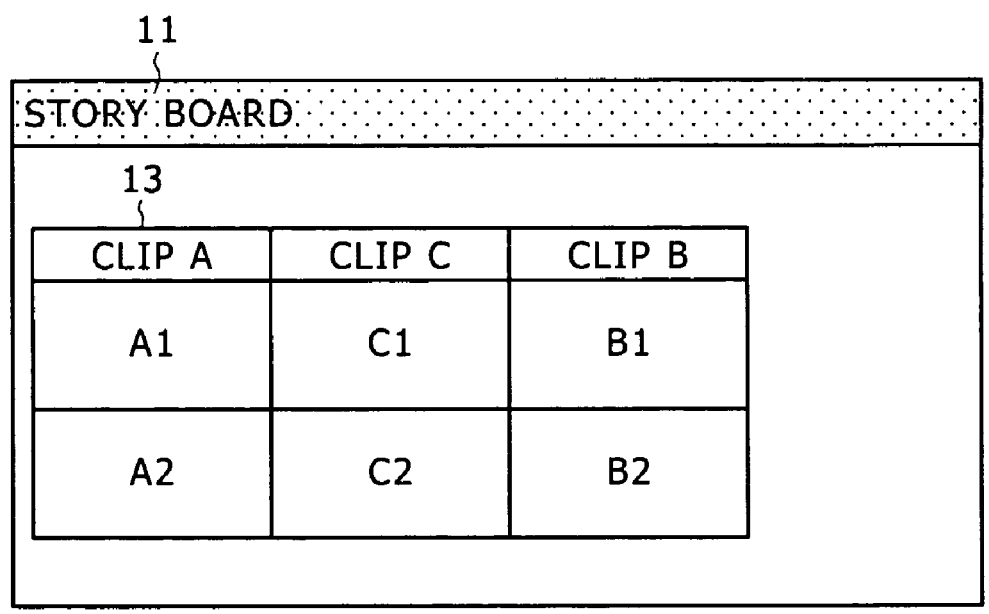

FIGS. 25A and 25B show an example of display when clips being displayed on a story board window 11 are rearranged. FIGS. 25A and 25B correspond to a case where a clip B is moved to the rear of a clip C. In this case, as shown in FIG. 25A, the user drags and drops the clip B selected by using a pointer to the rear of the clip C.

FIG. 25B shows an example of display after the clip B is moved. That is, the story of a program is changed from "the clip A→>the clip B→the clip C" to "the clip A→the clip C→the clip B." Of course, each clip is moved while the in point frame 13B and the out point frame 13C remain displayed in a pair.

Figure 26A:
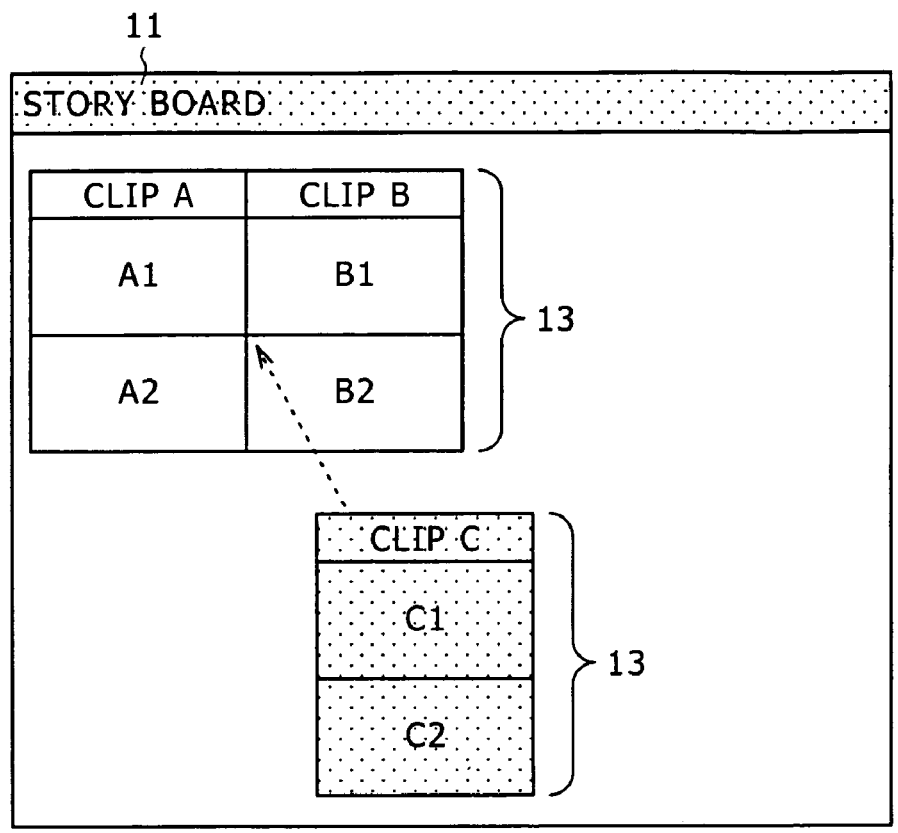
FIGS. 26A and 26B are diagrams showing an example of display when a clip is inserted.
Figure 26B:
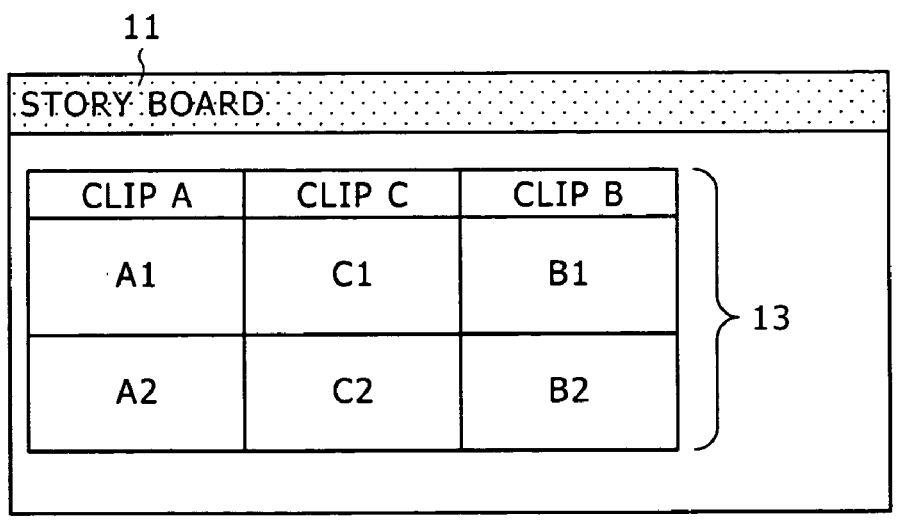

FIGS. 26A and 26B show an example of display when a new clip is inserted in a story board window 11. This display example corresponds to a case where a clip C is inserted between a clip A and a clip B. In this case, as shown in FIG. 26A, the user drags and drops the clip C selected by using a pointer to a position between the clip A and the clip B.

FIG. 26B shows an example of display after the clip C is inserted. That is, the story of a program is changed from "the clip A→the clip B" to "the clip A→the clip C→the clip B." Of course, each clip is inserted while the in point frame 13B and the out point frame 13C remain displayed in a pair.

Incidentally, deletion editing and copy editing can be performed on the story board window 11.

(1-2) Second Example of Editing Screen

Trimming editing will be described in the following as an example of editing operation.

Description in the following will be made of four examples of typical operations used in trimming editing. Two of the operation examples are operation examples when a transition is made from a non-trimming mode to a trimming mode. The other two are operation examples when an object to be trimmed is changed in the trimming mode.

Incidentally, in any of the operation examples, description will be,made supposing that an in point thumbnail image 13B1 and an out point thumbnail image 13B2 are displayed in correspondence with each clip in a story board window 11. Therefore an object to be trimmed can be one or both of an in point and an out point.

(a) First Operation Example

Description will first be made of an operation example when a transition is made from the non-trimming mode to the trimming mode. Description in this case will be made of a case where an in point of a clip C is specified as an object to be trimmed. Incidentally, suppose that a clip A is selected on an initial screen.

(a1) Initial Screen

Figure 27:
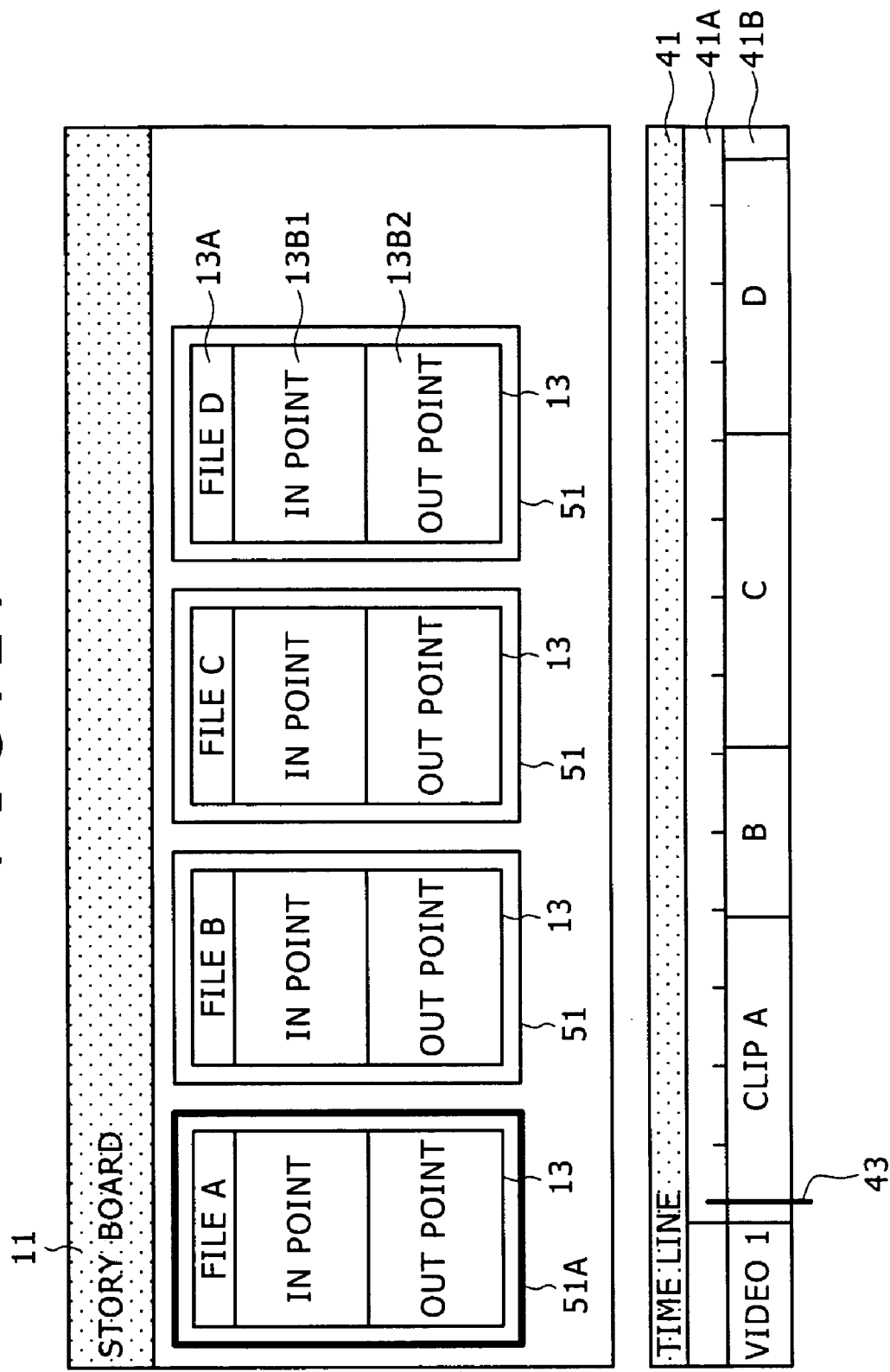
FIG. 27 is a diagram showing an example of an initial screen in editing operation.

FIG. 27 shows an example of an initial screen before the selection of the clip C. FIG. 27 shows an example of display of a story board window 11 and a time line window 41. However, the display of the time line window 41 is shown in a simplified manner. That is, only a time line 41A and a video track 41B are shown.

At this time, the story board window 11 shows a state of the clip A being selected by changing a display form of an outer frame 51 of a display area 13. In this embodiment, the state of the clip A being selected is shown by displaying a selection frame 51A on outer edges of the outer frame 51. Incidentally, yellow is used as a display color of the selection frame 51A.

Incidentally, the state of the clip being selected and an edit position are shown through a display position of a play line 43 on the video track 41B. In FIG. 27, the play line 43 is displayed near an in point of the clip A. Incidentally, red is used as a display color of the play line 43.

These displays allow the user to readily confirm that the clip A is in a selected state.

(a2) Clip Selection Screen

Figure 28:
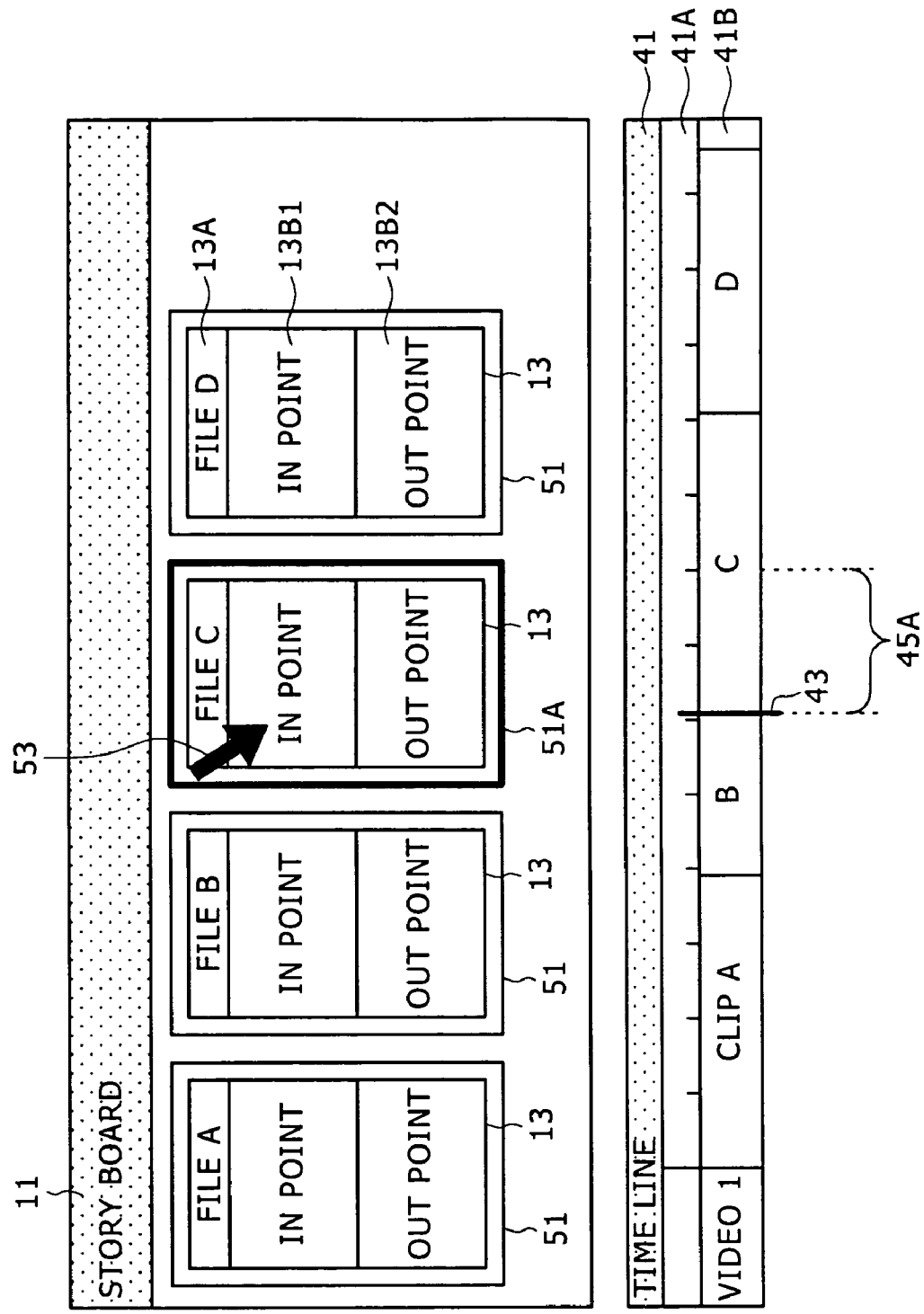
FIG. 28 is a diagram showing an example of a screen where an object clip is selected.

FIG. 28 shows an example of the screen after the selection of the clip C. There are several methods for selecting the clip C.

For example, there is a method of moving a pointer 53 on the monitor screen onto a display area 13 corresponding to the clip C, and confirming the moving operation.

In this case, an operating button, a keyboard, a mouse, or another pointing device is used to move the pointer 53. The moving operation is confirmed by an operation of pressing the operating button or an operation of clicking the mouse, for example.

At this time, it suffices for the pointer 53 to be situated somewhere on the display area 13 corresponding to the clip C. That is, the pointer 53 does not need to be situated on a thumbnail image 13B1 corresponding to the in point of the clip C, and may be situated on a thumbnail image 13B2 corresponding to an out point of the clip C.

Of course, the display position of the play line 43 displayed on the video track 41B is interlocked with the position specified by the pointer 53.

For example, when the thumbnail image 13B1 corresponding to the in point of the clip C is specified by the pointer 53, the play line 43 is moved to the in point of the clip C. On the other hand, when the thumbnail image 13B2 corresponding to the out point of the clip C is specified by the pointer 53, the play line 43 is moved to the out point of the clip C.

Thus, the play line 43 is automatically moved in such a manner as to be interlocked with the selection of a clip on the story board window 11.

For example, there is another method of changing a selected position by operating a jump button (a button on the monitor screen or a button on an operating panel) for the story board window 11.

This jump button is referred to as an "FS/BS button." The "FS button" corresponds to a rearward jump on a time base. The "BS button" corresponds to a frontward jump on the time base. In this example, the selected position is sequentially changed from the clip A to the clip B to the clip C by operating the "FS button."

There are three kinds of jump: a jump between in points, a jump between out points, and an alternating jump from an out point to an in point or from an out point to an in point.

Which jump to apply to the operation of the "FS/BS button" depends on a setting in advance.

Incidentally, in such a manner as to be interlocked with the movement of the selection frame 51A, the play line 43 on the video track 41B is moved to a corresponding position.

In addition, the selected position can be changed by operating a jump button (a button on the monitor screen or a button on the operating panel) for the time line window 41.

This jump button is referred to as a "Next/Previous button." The "Next button" corresponds to a rearward jump on a time base. The "Previous button" corresponds to a frontward jump on the time base.

In this example, the selected position is sequentially changed from the clip A to the clip B to the clip C by operating the "Next button."

There are six kinds of jump: a jump between in points, a jump between out points, an alternating jump from an out point to an in point or from an out point to an in point, a jump between effect start positions, a jump between effect end positions, and an alternating jump from an effect start position to an end position or from an effect end position to a start position. Which jump to apply to the operation of the "Next/Previous button" depends on a setting in advance.

Incidentally, the selection frame 51A on the story board window 11 is moved in such a manner as to be interlocked with the movement of the play line 43 on the time line window 41.

The selection frame 51A is moved automatically by signal processing of the image processing apparatus.

In addition, for example, the selected position can be changed by operating the play line 43 on the time line window 41. In this case, the play line 43 can be moved to an arbitrary position on the clip C.

In this case, the play line 43 is moved by using a mouse, a button (a button on the monitor screen or a button on the operating panel), or another pointing device. A selection is confirmed by an operation of clicking the mouse.

In this example, the selection frame 51A on the story board window 11 is moved in such a manner as to be interlocked with the movement of the play line 43 on the time line window 41.

(a3) Trimming Position Specifying Screen

Figure 29:
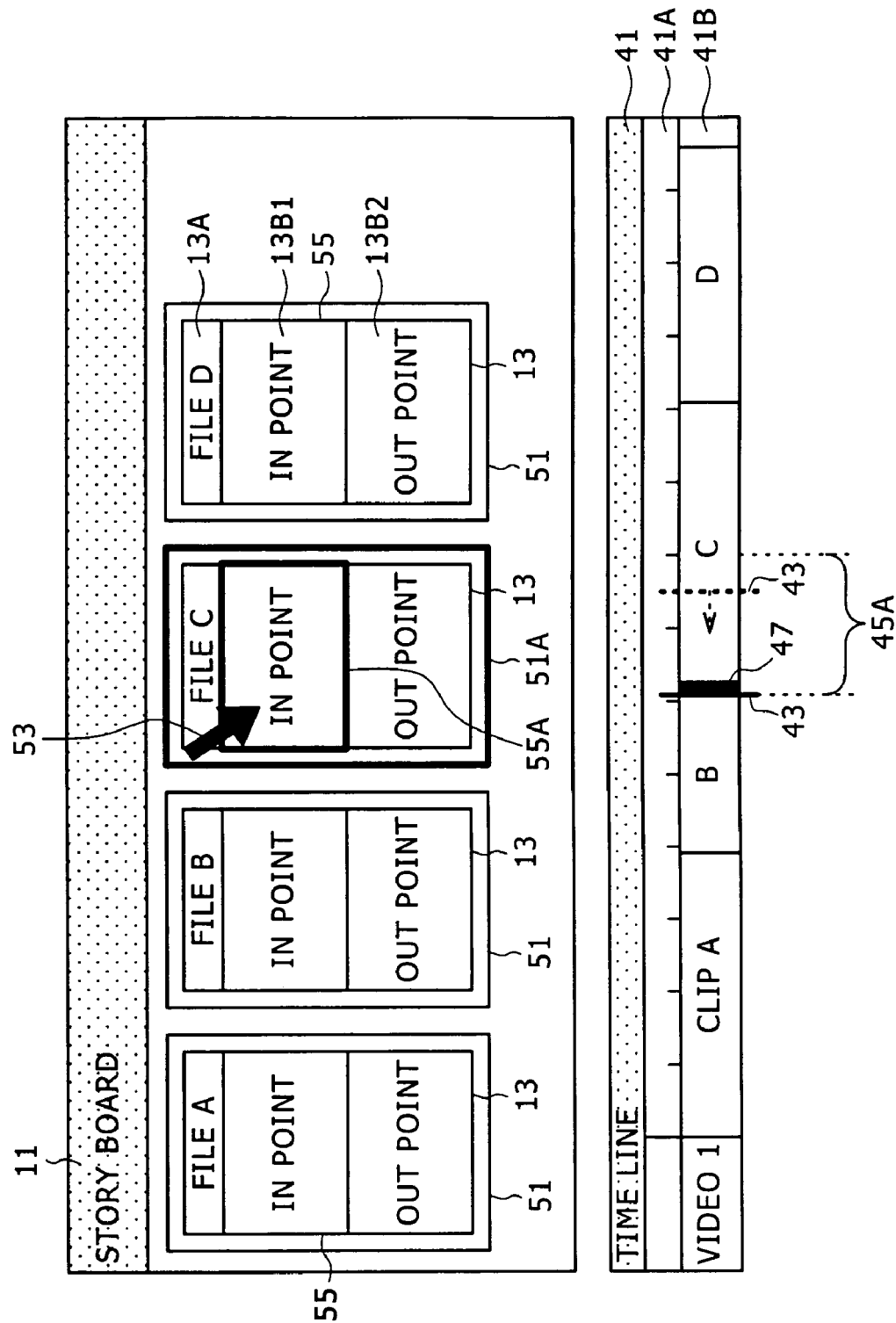
FIG. 29 is a diagram showing an example of a screen after a transition is made to a trimming mode.

FIG. 29 shows an example of the screen after a transition is made to the trimming mode. The transition to the trimming mode is made by operating a trimming button.

In this case, an object to be trimmed is determined according to the position of the pointer 53 or the position of the play line 43 immediately before the operation of the trimming button.

Incidentally, as shown in FIG. 29, when the play line 43 is situated somewhere in a first half area 45A of the clip C (when the play line 43 is situated as indicated by a dotted line, for example), the in point of the clip C is determined as an object to be trimmed.

At this time, an outer frame 55 of the thumbnail image 13B1 corresponding to the object to be trimmed is highlighted in the story board window 11.

In this embodiment, a selection frame 55A is displayed on outer edges of the outer frame 55. Incidentally, red is used as a display color of the selection frame 55A.

In the meantime, a trim mark 47 indicating the object to be trimmed is displayed in the time line window 41. Incidentally, since the in point of the clip C is the object to be trimmed, the trim mark 47 in FIG. 29 is displayed at the in point position of the clip C.

(b) Second Operation Example

Description will next be made of another operation example when a transition is made from the non-trimming mode to the trimming mode. Description in the following will be made of a case where the out point of the clip C is specified as an object to be trimmed.

(b1) Initial Screen

An initial screen is the same as in the first operation example. That is, the initial screen is the same as the example of the screen of FIG. 27.

(b2) Clip Selection Screen

Figure 30:
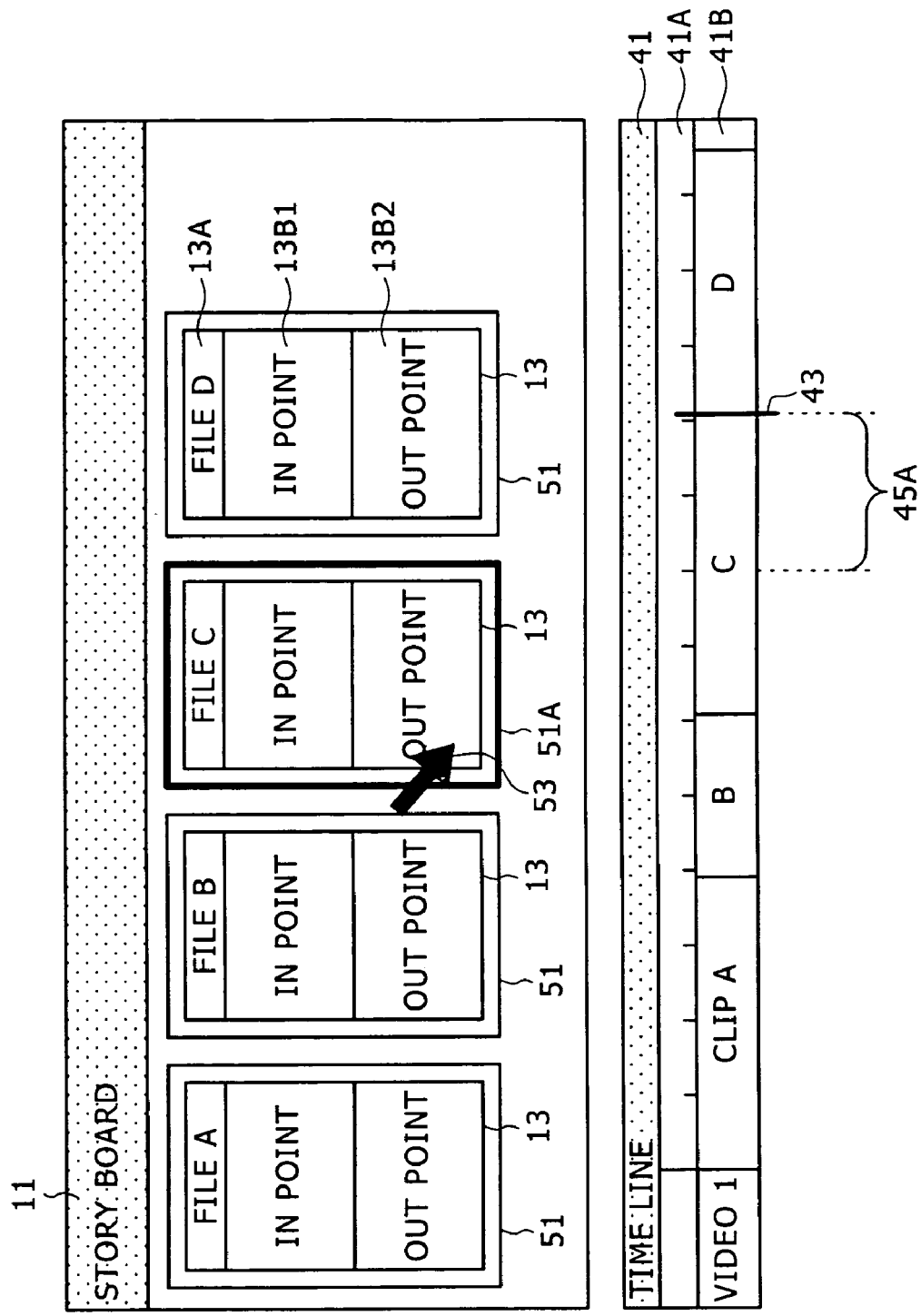
FIG. 30 is a diagram showing an example of a screen where an object clip is selected.

FIG. 30 shows an example of the screen after selection of the clip C. Methods for selecting the clip C are basically the same as in the first operation example. Specifically, there are mainly two methods: a method of selecting the clip C on the story board window 11, and a method of selecting the clip C on the time line window 41.

A characteristic part of the example of the screen of FIG. 30 will be described. FIG. 30 shows the pointer 53 on the story board window 11 specifying the thumbnail image 13B2 corresponding to the out point of the clip C. Thus, the play line 43 on the time line window 41 is displayed at the out point of the clip C.

Of course, a similar display appears when a jump is made to the out point of the clip C by operating the jump button for the story board window 11. Also, a similar display appears when a jump is made to the out point of the clip C by operating the jump button for the time line window 41. Of course, a similar display appears when the play line 43 is positioned at the out point of the clip C by directly operating the play line 43 on the time line window 41.

(b3) Trimming Position Specifying Screen

Figure 31:
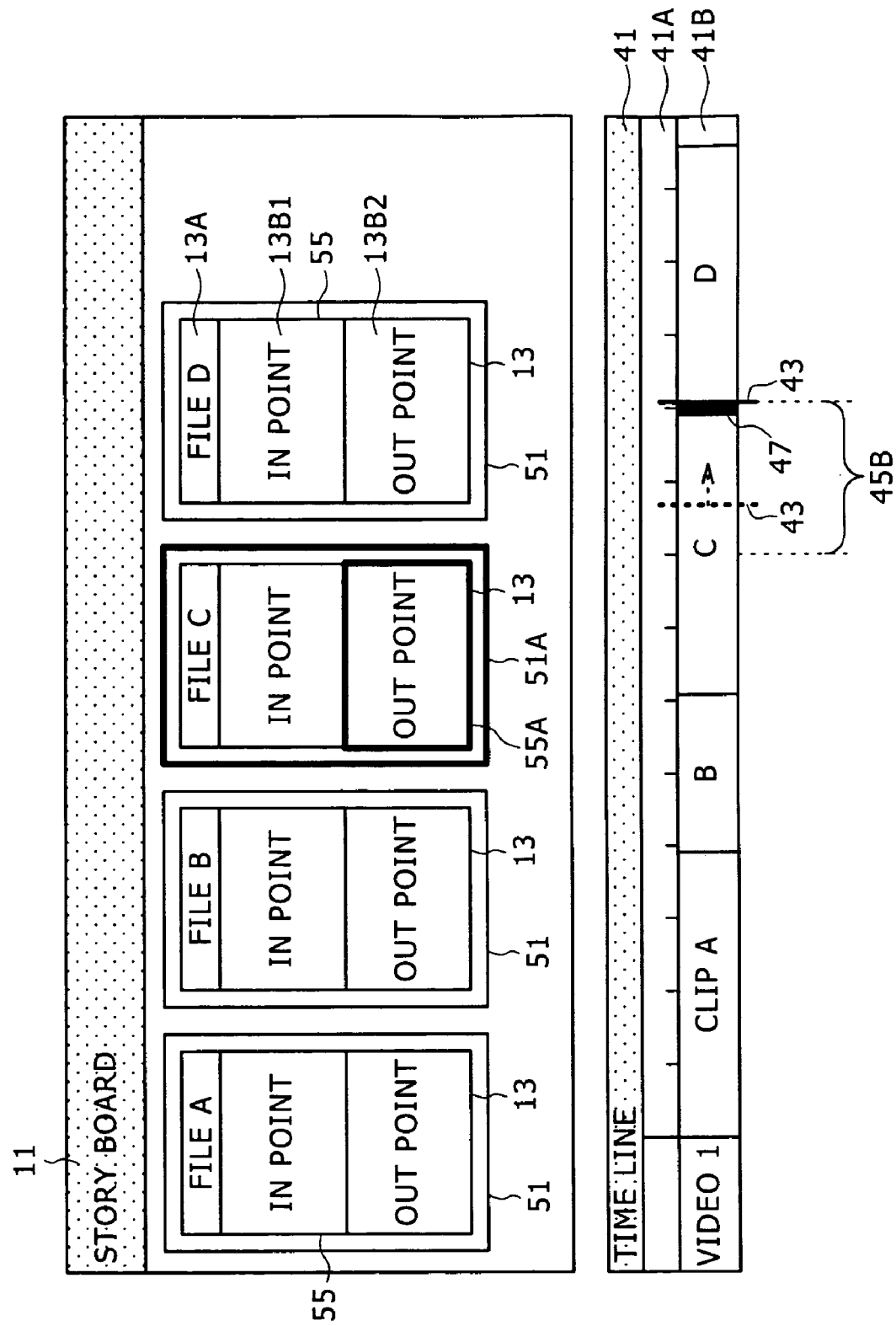
FIG. 31 is a diagram showing an example of a screen after a transition is made to the trimming mode.

FIG. 31 shows an example of the screen after a transition is made to the trimming mode. Also in this case, the transition to the trimming mode is made by operating a trimming button.

An object to be trimmed is determined according to the position of the pointer 53 or the position of the play line 43 immediately before the operation of the trimming button.

For example, as shown in FIG. 31, when the play line 43 is situated somewhere in a second half area 45B of the clip C (when the play line 43 is situated as indicated by a dotted line, for example), the out point of the clip C is determined as an object to be trimmed.

At this time, an outer frame 55 of the thumbnail image corresponding to the object to be trimmed is highlighted in the story board window 11. Also in this embodiment, a red selection frame 55A is displayed on outer edges of the outer frame 55.

In the meantime, the trim mark 47 indicating the object to be trimmed is displayed in the time line window 41. Incidentally, since the out point of the clip C is the object to be trimmed, the trim mark 47 in FIG. 31 is displayed at the, out point position of the clip C.

(c) Third Operation Example

Description will next be made of a case where an object to be trimmed is changed in the trimming mode. Description in the following will be made of a case where the object to be trimmed is changed from the in point of the clip A to the in point of a clip D.

(c1) Initial Screen

Figure 32:
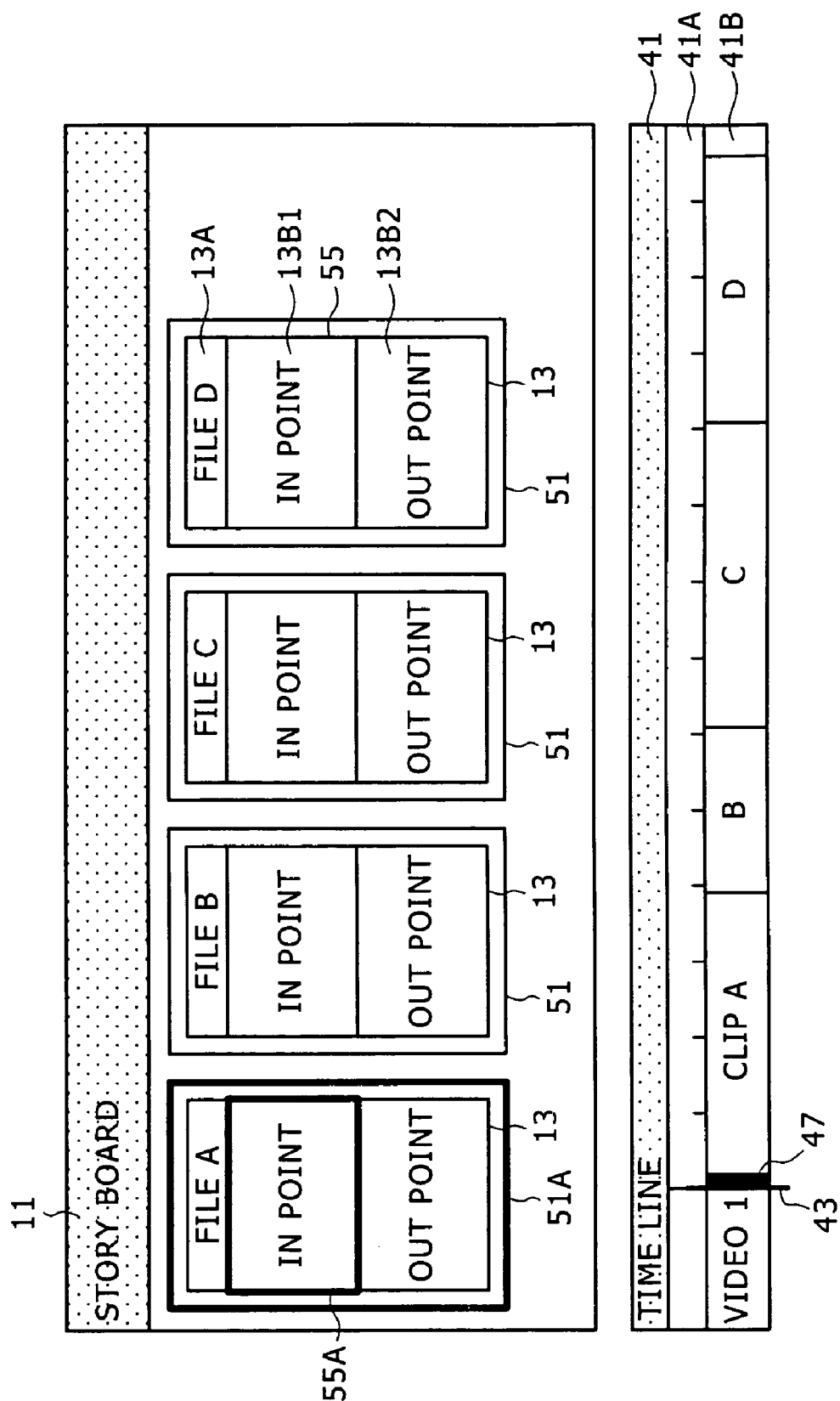
FIG. 32 is a diagram showing an example of an initial screen in the trimming mode.

FIG. 32 shows an example of the screen when the in point of the clip A is specified as the object to be trimmed. FIG. 32 shows an example of display of the story board window 11 and the time line window 41.

At this time, in the story board window 11, a state of the clip A being selected is indicated by a selection frame 51A and also a state of the in point of the clip A being selected is indicated by a selection frame 55A.

In this case, the selection frame 51A is a yellow frame displayed on outer edges of the outer frame 51 of the display area 13 corresponding to the clip A. On the other hand, the selection frame 55A is a red frame displayed on outer edges of the outer frame 55 of the thumbnail image 13B1 corresponding to the in point of the clip A.

On the other hand, the play line 43 and the trim mark 47 are displayed at the in point of the clip A in the time line window 41.

(c2) Trimming Position Changing Screen

Figure 33:
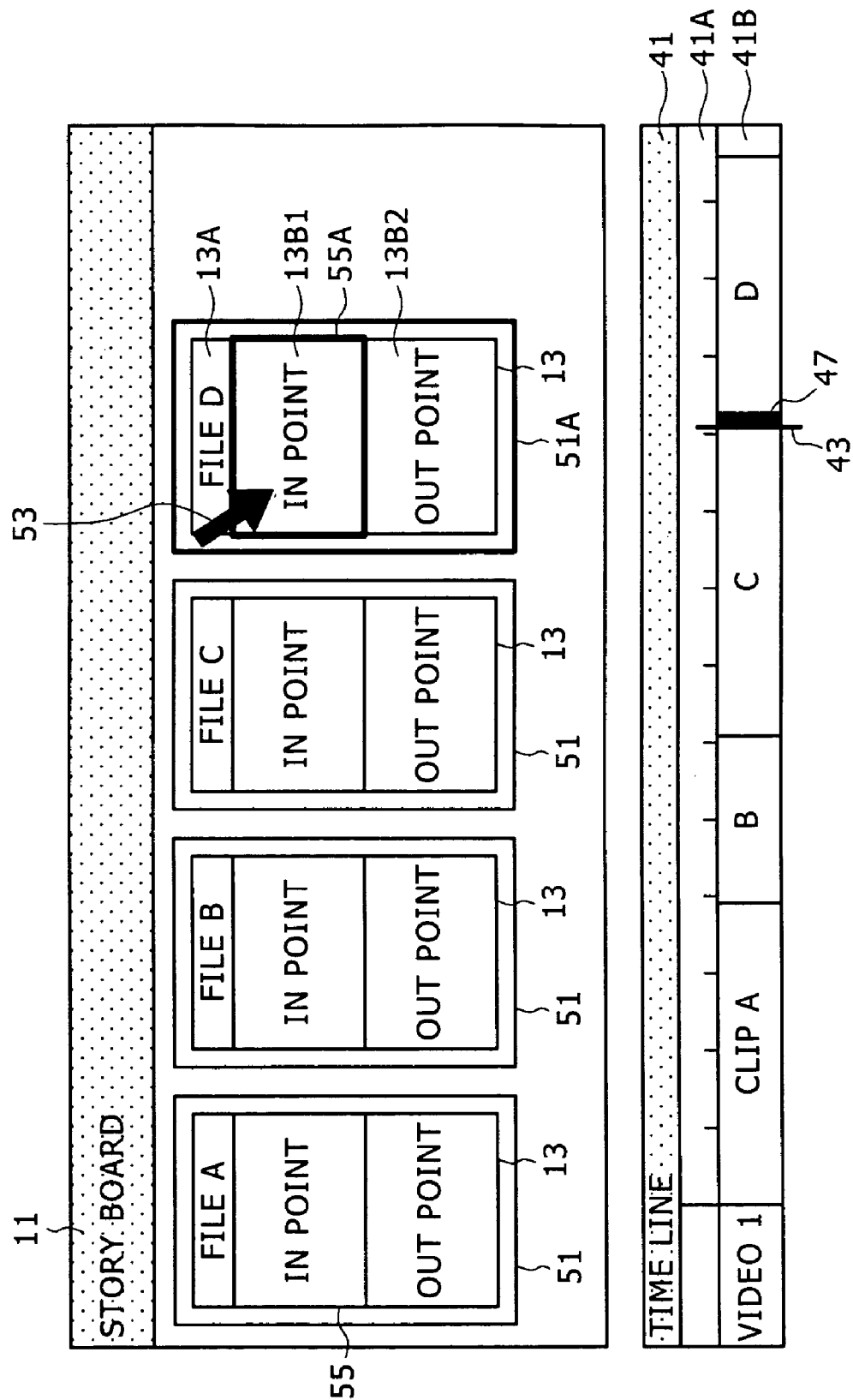
FIG. 33 is a diagram showing an example of a screen after an object to be trimmed is changed.

FIG. 33 shows an example of the screen after the trimming position is changed. There are several methods for changing the object to be trimmed.

For example, there is a method of directly moving the selection frame 55A by the pointer 53 on the monitor screen. In this case, the selection frame 55A is moved by moving the pointer 53 onto the thumbnail image 13B1 corresponding to the in point of the clip D and confirming the selection.

An operating button, a keyboard, a mouse, or another pointing device is used to move the pointer 53. The selection is confirmed by an operation of clicking the mouse, for example.

Incidentally, the play line 43 and the trim mark 47 are also moved in such a manner as to be interlocked with the movement of the selection frame 55A on the story board window 11.

In addition, there is a method of moving the selection frame 55A by operating the jump button for the story board window 11. That is, the selection frame 55A is moved by the "FS button" or the "BS button." In this embodiment, since the initial position is the clip A, the selected position is changed by operating the "FS button."

Of course, the play line 43 and the trim mark 47 are also moved in such a manner as to be interlocked with the movement of the selection frame 55A on the story board window 11.

In addition, there is a method of indirectly moving the selection frame 55A by operating the jump button for the time line window 41. That is, the selection frame 55A is moved by the "Next button" or the "Previous button." In this embodiment, since the initial position is the clip A, the selected position is changed by operating the "Next button."

In this case, the selection frame 55A on the story board window 11 is moved in such a manner as to be interlocked with the movement of the play line 43 and the trim mark 47.

(d) Fourth Operation Example

Description will next be made of another operation example in a case where an object to be trimmed is changed in the trimming mode. Description in the following will be made of a case where the object to be trimmed is changed from the in point of the clip A to the out point of the clip D.

(d1) Initial Screen

The initial screen is the same as in the third operation example. That is, the initial screen is the same as the example of the screen of FIG. 32.

(d2) Trimming Position Changing Screen

FIG. 34 shows an example of the screen after the trimming position is changed. Methods for changing the object to be trimmed are basically the same as in the third operation example. Specifically, there are three methods: the method of direct specification on the story board window 11 by the pointer 53, the method of using the jump button for the story board window 11, and the method of using the jump button for the time line window 41.

Incidentally, since the selection frame 55A is moved from the in point to the out point, the setting of the jump buttons is changed to a jump from an in point to an out point or from an out point to an in point.

(e) Operation after Selection of Object to be Trimmed

After the object to be trimmed is determined by the four operation examples described above, a trimming operation using a mouse, a jog dial, a cursor key and the like is performed. That is, an in point or an out point is changed.

Incidentally, when the trimming button is operated again, the changing of the in point or the out point is confirmed, then exiting the trimming mode. Incidentally, when one or both of the in point and the out point are changed, contents of thumbnail images displayed on the story board window 11 are also changed to contents after the update.

(f) Effect

By thus using the story board window 11 displaying thumbnail images corresponding to in points and out points, respectively, to select and check an object to be trimmed, it is possible to improve operability for the user.

For example, an object to be trimmed can be directly specified by selecting a thumbnail image. Therefore the object to be trimmed can be readily specified.

Also, even when an object to be trimmed is specified on the time line window 41, the position and content of the object to be trimmed can be readily checked regardless of clip size.

In addition, the object to be trimmed and the entire story can be checked simultaneously in the story board window 11. It is therefore possible to effectively perform a trimming operation with a relation between a specific clip and the entire story in mind.

Thus, when the story board window 11 can be used also for editing operation, it is possible to realize more intuitive specifying operation and checking of the position of the object than when proceeding with editing operation using only the time line window 41.

(3) Another Example of Editing Screen

The foregoing screen examples can be used for other editing operations having an in point or an out point as an object to be edited or including an in point or an out point as an object to be edited. For example, the foregoing screen examples can be used to specify an edit position in setting an effect or a transition effect.

FIG. 35 shows an example of the screen when a transition effect is set between the clip B and the clip C. Also in this case, there are a method of specifying the edit position on the story board window 11 and a method of specifying the edit position on the time line window 41.

FIG. 35 shows an example of the screen when the out point of the clip B and the in point of the clip C are specified as an object for a transition effect. Of course, it is possible to specify only the out point of the clip B or the in point of the clip C. A screen example in this case is the same as a screen example at the time of the trimming editing described above.

Incidentally, transition effects include a wipe, a fade, a mix, a page turn, a slide, a split, a dissolve and the like. In addition, it is needless to say that the foregoing screen examples can be applied to mosaic processing, color correction, Picture in Picture and the like in addition to the transition effects.

Also, editing using a transition effect includes not only single track editing but also A/B track editing.

Further, the foregoing screen examples can be used to check the edit position and check edited contents (including the checking of an edited state). The "check" in this case includes not only a check in an editing mode but also a check on edited contents regardless of the editing mode.

Figure 37A:
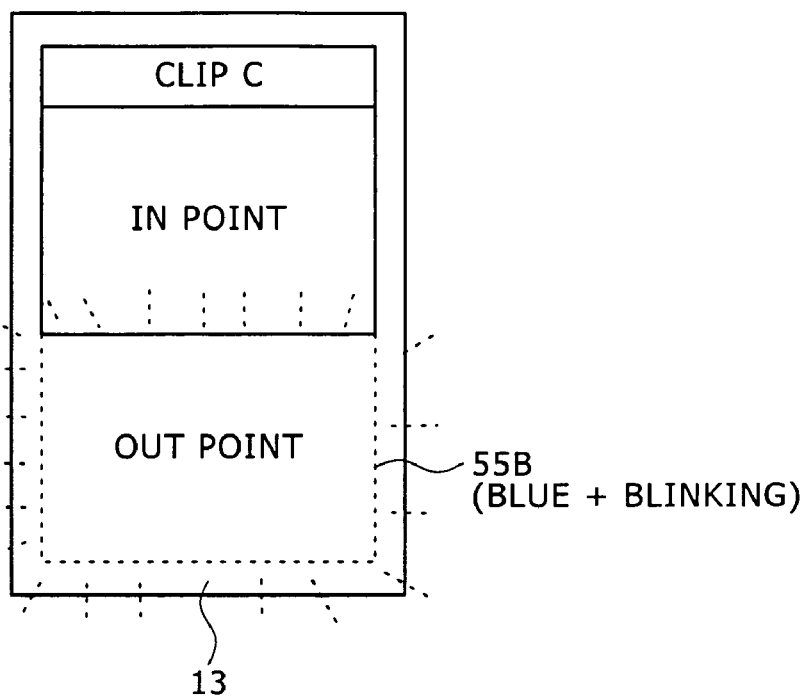
FIGS. 37A and 37B are diagrams showing examples of display when display forms before and after confirmation of an edit are different from each other.

FIG. 36 and FIGS. 37A and B show examples of the screen for checking.

FIG. 36 is an example of the screen when a fade-in is set at the in point of the clip B. In FIG. 36, an edit frame 55B is displayed on outer edges of the outer frame 55 of the thumbnail image 13B1 corresponding to the in point of the clip B. Green, for example, is used as a display color of the edit frame 55B.

Incidentally, a similar screen example is shown when a fade-out is set at an out point. In this case, the edit frame 55B is displayed on outer edges of the outer frame 55 of the thumbnail image 13B2 corresponding to the out point.

Incidentally, it is desirable to use different colors as the display colors of the edit frame for fade-in and fade-out. On the basis of the different display colors, a difference between and types of edited contents can be checked.

Figure 37B:
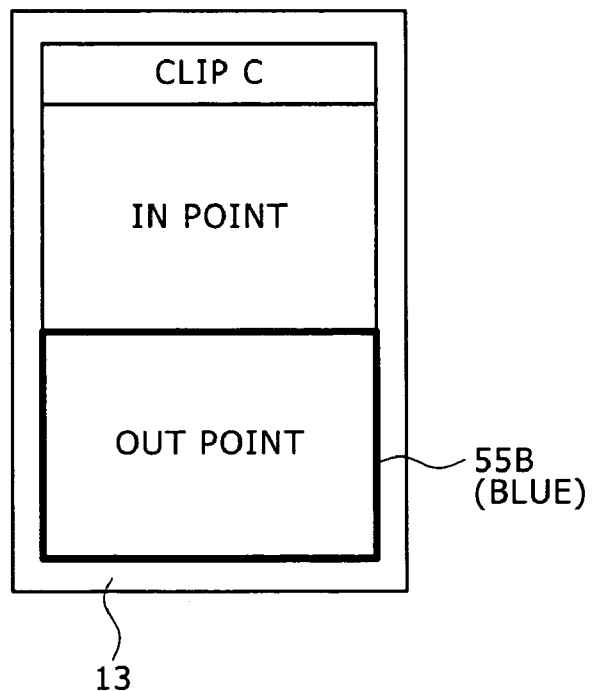

FIGS. 37A and 37B are examples of display when a display form during an edit and a display form after confirmation of the edit are different from each other. In FIGS. 37A and 37B, the out point of the clip C is the edit position. FIG. 37A corresponds to a display during an editing operation. For example, a blue blinking display is used for display of the edit frame 55B. FIG. 37B corresponds to a display after confirmation of the edit position or after confirmation of the editing process. For example, a blue illuminating display is used for display of the edit frame 55B.

By thus combining display of thumbnail images corresponding to an in point and an out point with display of the edit frame 55B according to an edit position or type, an object to be edited and an edit type can be checked using the story board window 11.

In addition, the following editing operations can be realized on the story board window.

The story board window can also be used when an in point thumbnail image, an out point thumbnail image, and one representative thumbnail image or more are displayed in a display area 13 corresponding to each clip, for example. For example, a scene change point or the like is applied to the representative image in this case.

When a scene from an in point to a representative image is desired to be cut out, for example, it suffices to position a cursor to the representative image and then operate a "Cut-Previous button." In this case, a clip having the representative image as a new in point is obtained.

When a scene from a representative image to an out point is desired to be cut out, for example, it suffices to position the cursor to the representative image and then operate a "Cut-Next button." In this case, a clip having a point immediately before the representative image as a new out point is obtained.

Of course, in this case, the play line on the time line window is moved in such a manner as to be interlocked with the selection of a clip on the story board window. Also, the selection frame (highlighted) on the story board window is moved in such a manner as to be interlocked with the movement of the play line on the time line window.

(C) Example of Configuration of Editing Apparatus (C-1) Hardware Configuration

Figure 38:
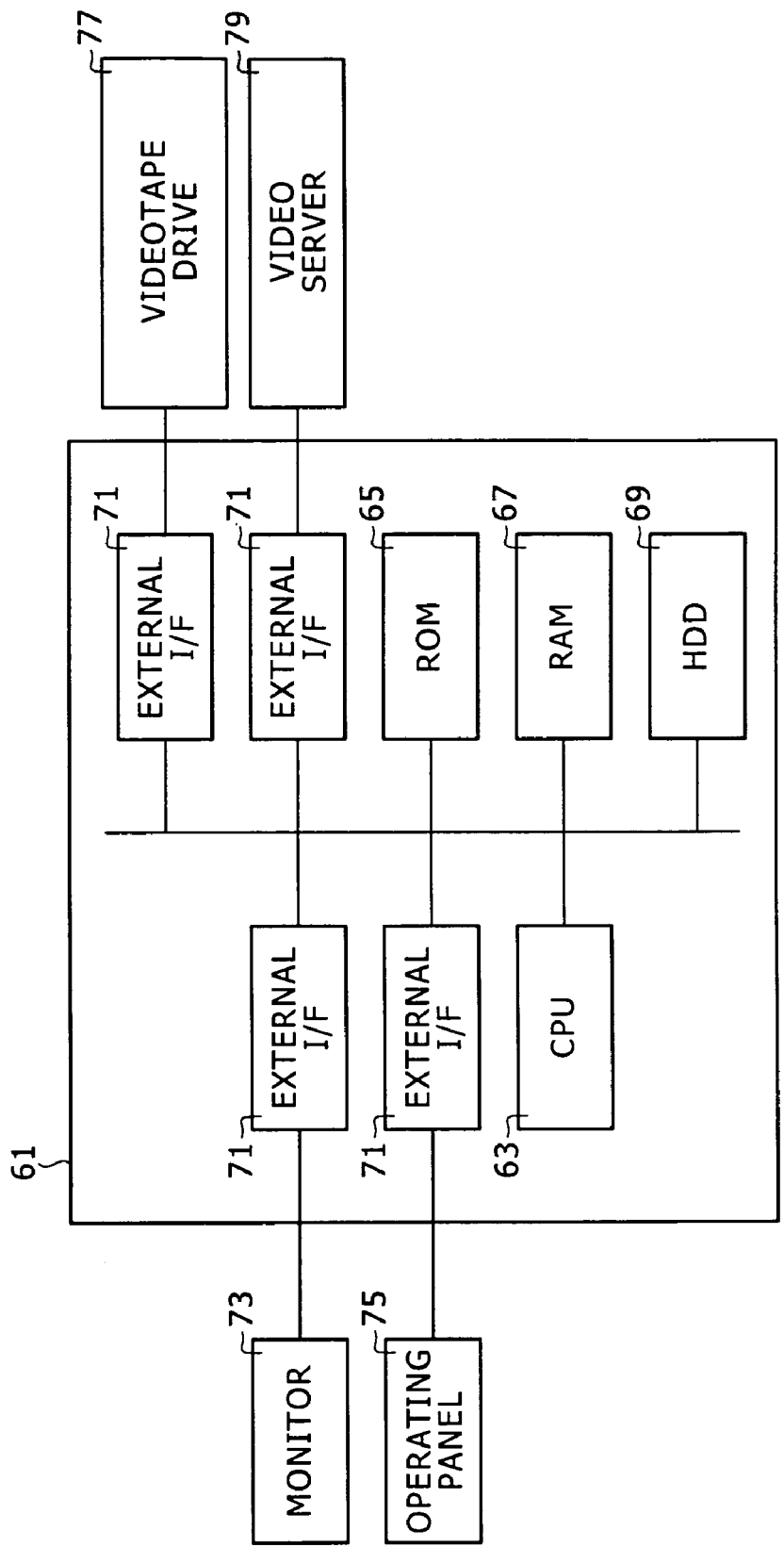
FIG. 38 is a diagram showing an embodiment of an editing apparatus.
Figure 39:
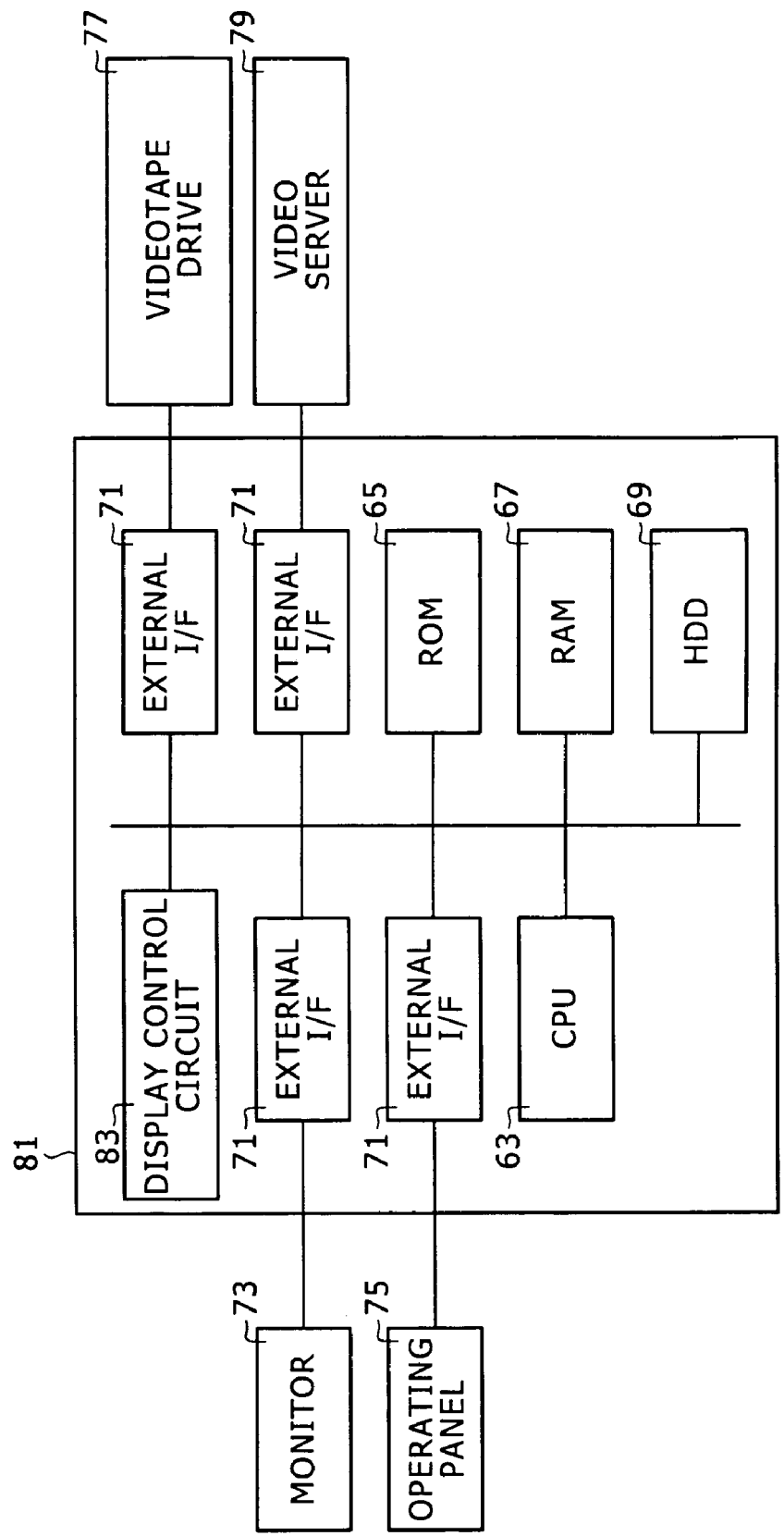
FIG. 39 is a diagram showing an embodiment of an editing apparatus including a display control circuit.

FIG. 38 shows an example of configuration of an editing apparatus when the above-described display functions are realized by a program. FIG. 39 shows an example of configuration of an editing apparatus when the above-described display functions are realized by a special processing board (a display control circuit).

Incidentally, the editing apparatus includes not only for example program producing systems, movie producing systems and other systems for business but also systems for home users.

The editing apparatus 61 shown in FIG. 38 is used to implement video editing functions by application software. Thus, a computer is used for a basic configuration of the editing apparatus 61. Hence the hardware configuration of the editing apparatus 61 is a well known computer configuration.

Specifically, the editing apparatus 61 includes a central processing unit 63, a ROM (Read Only Memory) 65, a RAM (Random Access Memory) 67, a hard disk drive 69, and external interfaces 71.

An editing system is constructed by the editing apparatus 61 in conjunction with a monitor 73, an operating panel 75, a videotape drive 77, a video server 79, and other peripheral devices.

The central processing unit 63 is a key device that executes various programs using the RAM 67 as a work area and thereby implements various functions.

The ROM 65 is a storage device that stores a basic program for controlling input and output from and to peripheral devices.

The RAM 67 is a storage device used as an area for executing an operation system and application programs (for example an editing program having a function of displaying the story board window as described above).

The hard disk drive 69 is a storage device for storing the operation system and the application programs.

The hard disk drive 69, as a computer readable storage medium, is a storage device for storing the operation system and the application programs. The hard disk drive 69 is referred to as an auxiliary storage device as opposed to the ROM 65 and the RAM 67 as a main storage device. Generally a program according to embodiments of the invention is stored in the hard disk drive 69. The hard disk drive 69 is also used to store material data used in video editing.

The external interfaces 71 are devices for connecting the editing apparatus 61 with peripheral devices. As the external interfaces 71, a device corresponding to a peripheral device to be connected to the editing apparatus 61 is used.

For example, a serial data interface or a parallel data interface is used. In addition, a LAN (Local Area Network) interface, for example, is used. Further, an interface for radio communication, for example, is used.

Description will next be made of the monitor 73, the operating panel 75, the videotape drive 77, and the video server 79 as examples of peripheral devices forming the editing system.

The monitor 73 is an output device for displaying a user interface screen designed with graphics such as buttons, menus and the like. Incidentally, the monitor 73 may be integral with a casing of the editing apparatus 61, or may be external to the casing of the editing apparatus 61.

The operating panel 75 is an input device used by the user to input instructions and information to the computer. In addition to the operating panel 75, input devices such for example as operating buttons, a keyboard, a mouse, and a slider pen are used as the input device.

The videotape drive 77 is a device used to reproduce and record video images as editing material. Suppose in this example that editing material is recorded on videotape. However, when editing material is recorded on an optical disk or in a semiconductor memory, a drive corresponding to the recording medium is used.

The video server 79 is a high-capacity storage device for storing edited programs. Generally a hard disk drive is used as the video server 79. Incidentally, when a main purpose of the video server 79 is to store programs, a high-capacity magnetic tape drive or an optical disk drive can also be used as the video server 79. In any case, it suffices to use a storage device meeting a purpose or a need.

On the other hand, the editing apparatus 81 shown in FIG. 39 is used when a video editing function is realized by a special processing board (a display control circuit) 83. The display control circuit 83 includes hardware for video editing.

For example, the display control circuit 83 includes an integrated circuit or a semiconductor memory used exclusively for video editing. Such a device configuration is suitable when there is a need to process high quality (that is, high data volume) video images in large quantities and in a short time.

Description of other devices as parts corresponding to those of FIG. 38 which parts are identified by the same reference numerals will be omitted.

Incidentally, though not specifically shown in FIG. 38 and FIG. 39, it is desirable to incorporate an encoding device (encoder) and a decoding device (decoder) for video data as required.

(C-2) Functional Configuration

An example of functional configuration of an editing apparatus will next be described.

(a) First Example of GUI Screen

Figure 40:
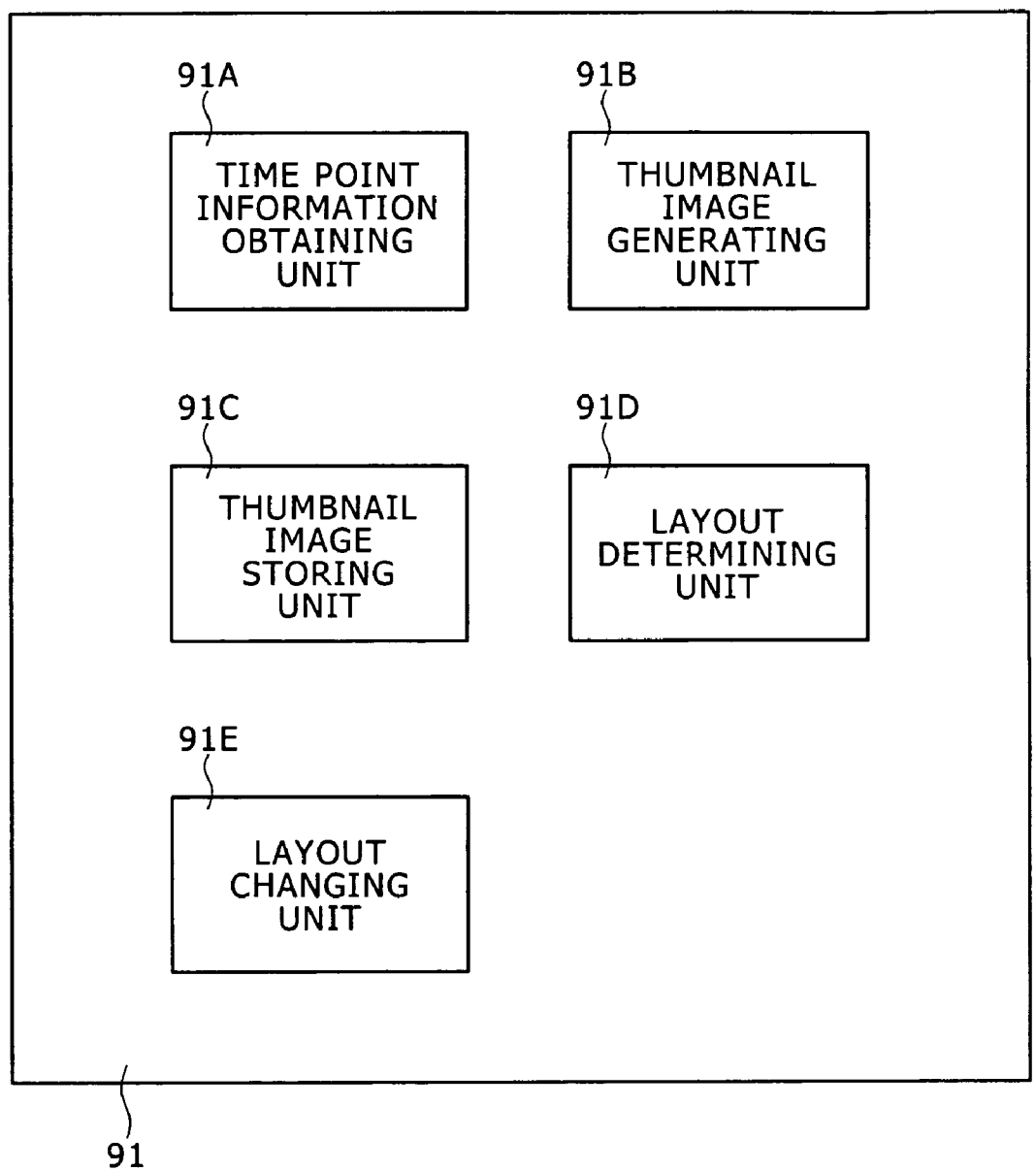
FIG. 40 is a diagram showing an example of functional configuration of an editing apparatus.

FIG. 40 shows a functional configuration of an editing apparatus when a story board window capable of displaying a plurality of thumbnail images for one clip is displayed. This functional configuration is implemented by program processing by the CPU 63 or signal processing by the display control circuit 83 (FIG. 39).

The editing apparatus 91 has, as main components, a time point information obtaining unit 91A, a thumbnail image generating unit 91B, a thumbnail image storing unit 91C, a layout determining unit 91D, and a layout changing unit 91E.

The time point information obtaining unit 91A corresponds to a processing function of obtaining thumbnail image generating positions (time point information) for each clip. The thumbnail image generating positions are varied according to the display form of each clip within the story board window 11 (FIGS. 4A to 13B). When the display form within the story board window 11 can be selected, the time point information obtaining unit 91A obtains time point information corresponding to the display form selected by an editing operator for each clip.

The thumbnail image generating unit 91B is a processing function of generating thumbnail images for each clip on the basis of the obtained time point information. The thumbnail image generating unit 91B reads image data at corresponding time points from the RAM 67 or the hard disk drive 69, and then generates thumbnail images (low-resolution images) according to display size.

The thumbnail image storing unit 91C is a storage device for retaining thumbnail images at a plurality of time points forming each clip in the story board window. The RAM 67 and the hard disk drive 69, for example, correspond to the thumbnail image storing unit 91C. The thumbnail image storing unit 91C retains the thumbnail images generated by the thumbnail image generating unit 91B for display. Of course, when thumbnail images are prepared in advance as data (metadata) attached to each clip, the thumbnail image storing unit 91C reads thumbnail images at a plurality of time points forming each clip in the story board window from an area storing material data corresponding to each clip, and retains the thumbnail images.

The layout determining unit 91D is a processing function of determining a display layout of the story board window 11. For example, the layout determining unit 91D determines a display layout in which thumbnail images at a plurality of time points forming each clip are arranged as one set. The monitor 73 displays the story board window 11 according to the display layout.

The layout changing unit 91E is a processing function of performing a process of changing the display layout. For example, the layout changing unit 91E performs switching between a first interface screen where each clip is formed by thumbnail images at a plurality of time points and a second interface screen where each clip is formed by one representative thumbnail image. In addition, for example, the layout changing unit 91E changes the layout according to a change in the number of thumbnail images forming each clip, a change in time point information, switching between one-row display and two-row display, a change in size of the thumbnail images, display position scrolling and the like.

Figure 41:
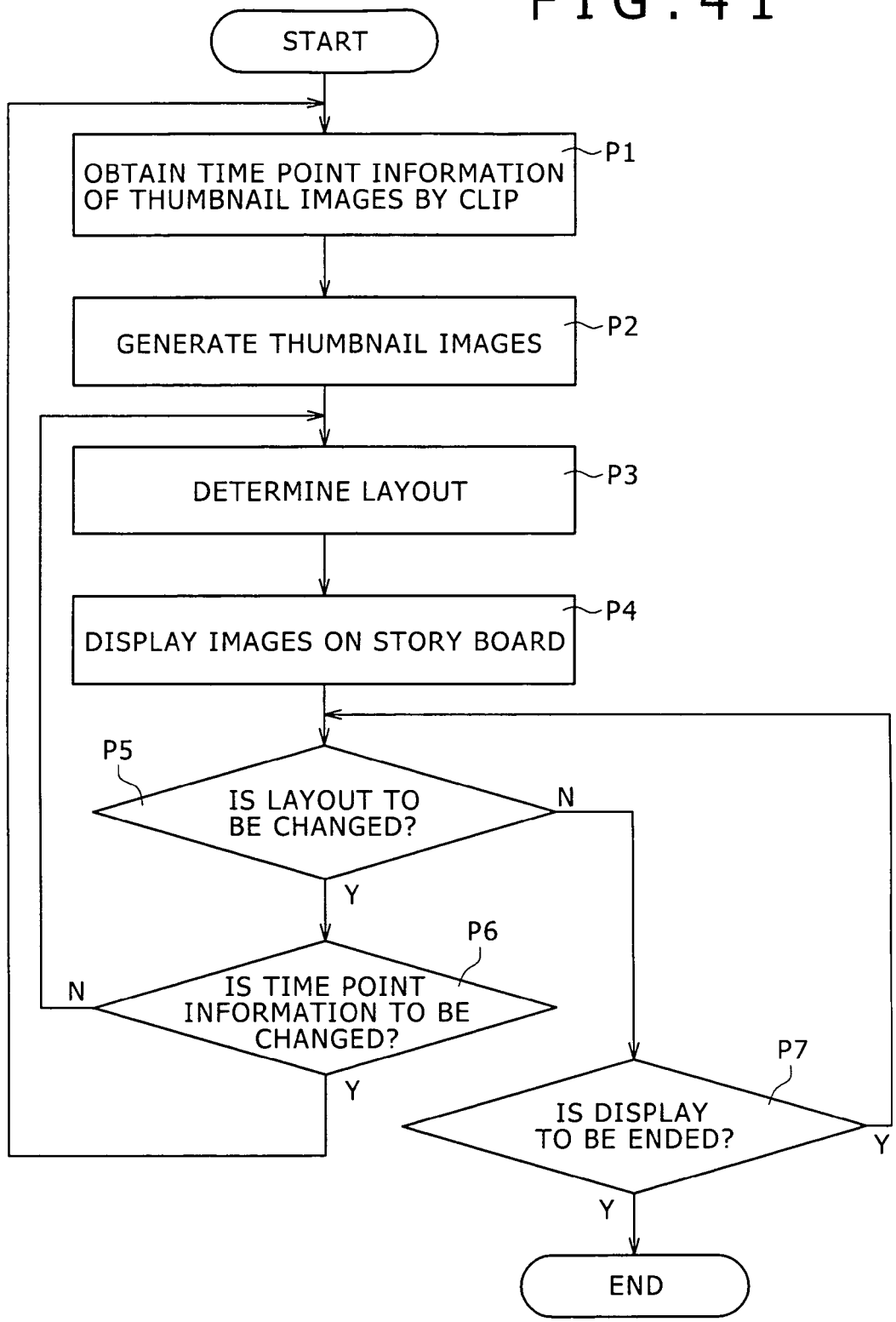
FIG. 41 is a diagram representing an example of a process procedure on the functional configuration.

FIG. 41 represents an example of a procedure for displaying the story board window 11 by the editing apparatus having this functional configuration. Incidentally, FIG. 41 represents an example employing a process procedure for generating thumbnail images forming each clip each time display is made. Hence, when thumbnail images prepared in advance are used, a thumbnail image generating process is replaced by a thumbnail image reading process.

First, the time point information obtaining unit 91A obtains time point information for displaying thumbnail images for each clip to be displayed in the story board window 11 (P1). This time point information is given to the thumbnail image generating unit 91B.

The thumbnail image generating unit 91B generates thumbnail images forming each clip on the basis of the given time point information (P2). The generated thumbnail images are retained in the thumbnail image storing unit 91C.

After the thumbnail images to be displayed in the story board window 11 are obtained, the layout determining unit 91D determines a display layout (P3). The images for the story board window 11 corresponding to the determined display layout are expanded in the RAM (video RAM) 67. The images for the story board window 11 are displayed on the screen of the monitor 73 together with other editing windows (P4). For example, the images are displayed in the form of the editing screen shown in FIG. 1.

Thereafter the layout changing unit 91E determines whether an instruction to change the display layout is given by the editing operator (P5).

When an instruction to change the display layout is given by the editing operator (when a positive result is obtained), the layout changing unit 91E determines whether the instruction involves a change in the time point information of the thumbnail images forming each clip (P6).

Incidentally, the instruction to change the display layout is detected through an operating input via the operating panel 75 or an operating input on the screen.

When the instruction does not involve a change in the time point information (when a negative result is obtained), the layout changing unit 91E instructs the layout determining unit 91D to change the display layout. On the other hand, when the instruction involves a change in the time point information (when a positive result is obtained), the layout changing unit 91E instructs the time point information obtaining unit 91A to change the time point information.

When no instruction to change the display layout is given by the editing operator (when a negative result is obtained), the layout changing unit 91E determines whether an instruction to end the display of the story board window 11 is given (P7). Unless an instruction to end the display of the story board window 11 is given, the layout changing unit 91E repeatedly determines whether an instruction to change the display layout is given by the editing operator.

By repeating the above process procedure, contents displayed in the story board window 11 continue to be updated.

(b) Second Example of GUI Screen

Figure 42:
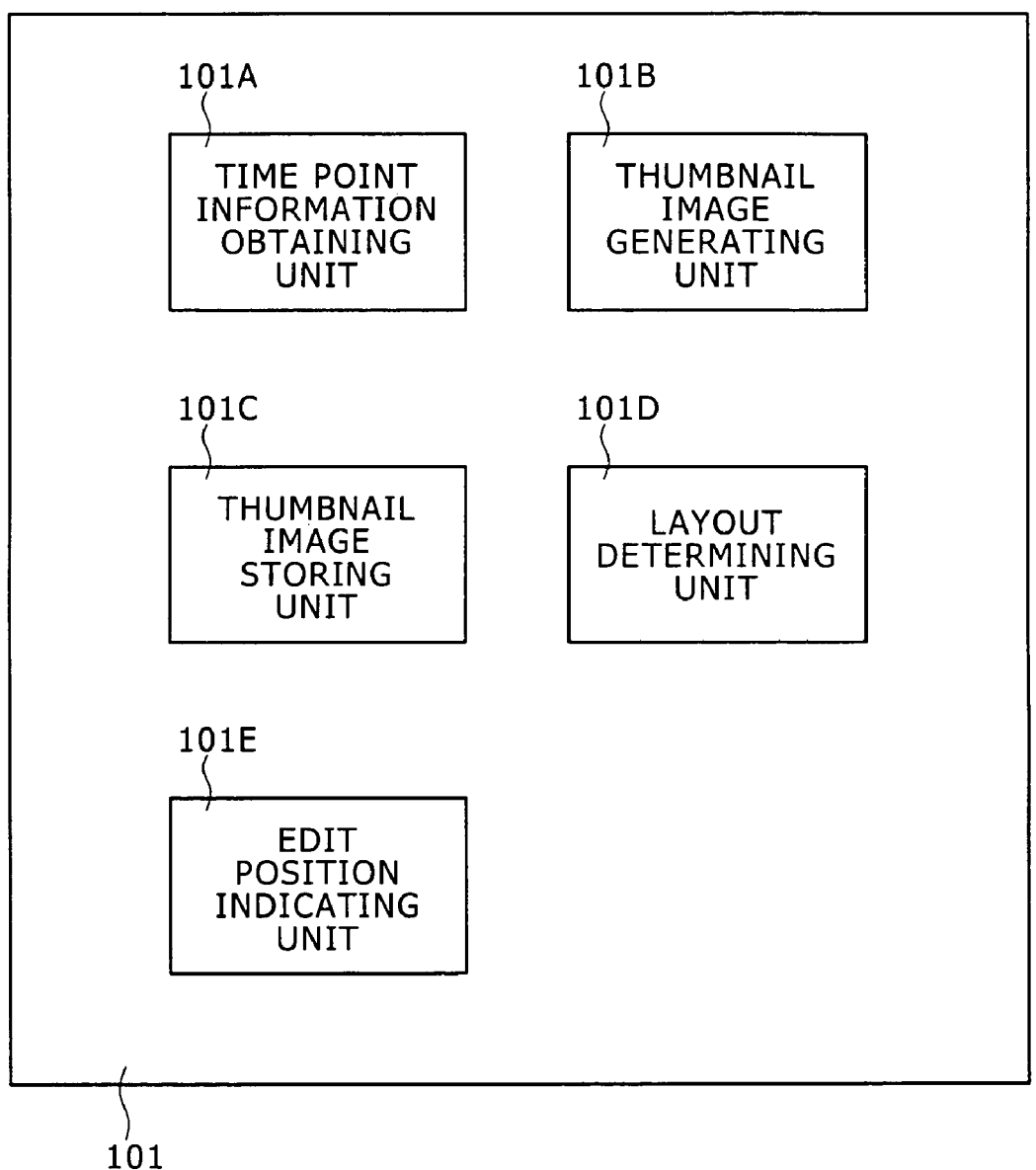
FIG. 42 is a diagram showing an example of functional configuration of an editing apparatus.

FIG. 42 shows a functional configuration of an editing apparatus when editing operation is performed on a story board window capable of displaying a plurality of thumbnail images for one clip. This functional configuration is also implemented by program processing by the CPU 63 or signal processing by the display control circuit 83 (FIG. 39).

The editing apparatus 101 has, as main components, a time point information obtaining unit 101A, a thumbnail image generating unit 101B, a thumbnail image storing unit 101C, a layout determining unit 101D, and an edit position indicating unit 110E. Incidentally, when a change in the display layout of thumbnail images is involved, a process of the functional configuration shown in FIG. 40 is necessary. FIG. 42 mainly shows functions related to indication of an edit position.

Incidentally, the time point information obtaining unit 101A, the thumbnail image generating unit 101B, the thumbnail image storing unit 101C, and the layout determining unit 101D are the same as the time point information obtaining unit 91A, the thumbnail image generating unit 91B, the thumbnail image storing unit 91C, and the layout determining unit 91D shown in FIG. 40. Therefore description of the time point information obtaining unit 101A, the thumbnail image generating unit 101B, the thumbnail image storing unit 101C, and the layout determining unit 101D will be omitted.

The edit position indicating unit 101E corresponds to a processing function of changing the display form of a clip and a thumbnail image corresponding to an edit position such that the clip and the thumbnail image can be distinguished from other areas. For example, the edit position indicating unit 101E changes the thickness of the outer frame or the display color of the clip and the thumbnail image.

FIG. 43 represents an example of a procedure for displaying the story board window 11 by the editing apparatus having this functional configuration. Also in this case, a technique using a process procedure for generating thumbnail images forming each clip each time display is made is employed. Hence, when thumbnail images prepared in advance are used, a thumbnail image generating process is replaced by a thumbnail image reading process. FIG. 43 represents the example supposing that the display layout of thumbnail images forming each clip is not changed during editing operation. When the display layout of thumbnail images forming each clip is changed, the process procedure represented in FIG. 41 is performed.

First, the time point information obtaining unit 101A obtains time point information for displaying thumbnail images for each clip to be displayed in the story board window 11 (P11). This time point information is given to the thumbnail image generating unit 101B.

The thumbnail image generating unit 101B generates thumbnail images forming each clip on the basis of the given time point information (P12). The generated thumbnail images are retained in the thumbnail image storing unit 101C.

After the thumbnail images to be displayed in the story board window 11 are obtained, the layout determining unit 101D determines a display layout (P13). The images for the story board window 11 corresponding to the determined display layout are expanded in the RAM (video RAM) 67. The images for the story board window 11 are displayed on the screen of the monitor 73 together with other editing windows (P14). For example, the images are displayed in the form of the editing screen shown in FIG. 1.

Thereafter the edit position indicating unit 101E determines whether an editing operation on the story board window 11 is selected (P15).

When no editing operation is selected by the editing operator (when a negative result is obtained), the edit position indicating unit 101E repeats this determination process.

When an editing operation is selected by the editing operator (when a positive result is obtained), the edit position indicating unit 101E obtains edit position information, and changes the outer frame of a clip or a thumbnail image to be edited into a display form that makes the clip or the thumbnail image to be edited distinguishable from other areas (P16). The edit position is indicated on the story board window 11 as shown in FIGS. 27 to 37B, for example.

At this time, the edit position indicating unit 101E displays the edit position on the story board window 11 in such a manner as to be interlocked with the time line window 41.

(D) Other Embodiments (a) In the foregoing embodiments, description has been made of a case where thumbnail images at a plurality of time points forming each clip are displayed on the story board window 11.

Incidentally, when a specific operation for a preview or the like is performed with a specific thumbnail image specified, a moving image for a certain period before the thumbnail image, a certain period after the thumbnail image, or a certain period before and after the thumbnail image may be reproduced and displayed in a display area of the thumbnail image (the display area of the specific thumbnail image specified on the story board window 11).

This display method enables a content check and editing operation to be performed on only the story board window 11 without eyes being moved.

(b) While examples of configuration of the editing apparatus have been described in the foregoing embodiments, the editing apparatus may take any product form as long as the editing apparatus is an image processing apparatus capable of providing functions of the editing apparatus.

Such image processing apparatuses include for example a computer, a video camera, a digital camera, a game machine, a portable information terminal (a portable type computer, a portable telephone, or a portable type game machine), a storage device (for example an optical disk device or a home server), and a processing board or a processing card incorporating functions according to the invention.

Incidentally, any of the image processing apparatuses is formed by combining a common configuration of a casing, a signal processing unit, and external interfaces with peripheral devices according to the form of the product.

A video camera or a digital camera, for example, has, in addition to the above-described configuration, a camera unit and a writing circuit for storing picked-up image data on a storage medium.

A portable telephone or another electronic device having a communication function, for example, has a transmitting and receiving circuit and an antenna in addition to the above-described configuration.

(c) Various modifications of the foregoing embodiments are conceivable without departing from the spirit of the invention. In addition, various modifications and applications created on the basis of the description of the present specification are conceivable.

It should be understood by those skilled in the art that various modifications, combinations, sub-combinations and alterations may occur depending on design requirements and other factors insofar as they are within the scope of the appended claims or the equivalents thereof.

What is claimed is

1. An image data processing method for processing image data forming a video material on an image data processing device, said image data processing method comprising:
   obtaining image data at a plurality of points in time from said video material;
   generating image data for display, on a display device, from the obtained image data in a grouped state in a story board display area corresponding to said video material, said generated image data including a plurality of clip image data corresponding to a video clip which is a portion of the video material, said plurality of clip image data including a first image from the video material corresponding to a start time of the video clip and a second image from the video material corresponding to an end time of the video clip, and said generating includes generating said first and second image for being simultaneously displayed in the story board display area; and
   generating a time line window for display on the display device that indicates a duration time of the video clip outside the story board display area, the time line window being interlocked with an operation of editing said video material such that the plurality of clip image data can be edited by editing the time line window, wherein the length of the video clip can be varied by shifting the beginning or end of the video clip in the time line window and the number of the plurality of clip image data can be varied by changing the length of the video clip in the time line window.

2. The image data processing method as claimed in claim 1, further comprising outputting said generated image data for display generated in said generating.

3. The image data processing method as claimed in claim 1, wherein in said generating, at least one piece of the generated image data is image data at an arbitrary point in time selected by a user.

4. The image data processing method as claimed in claim 1, wherein in said generating, at least one piece of the generated image data is a scene change point.

5. The image data processing method as claimed in claim 1, wherein in said generating, the generated image data is generated at equal intervals in time code of said video material.

6. The image data processing method as claimed in claim 1, wherein in said generating, said generated image data for display is generated such that at a time of display, a plurality of pieces of image data temporally adjacent to each other are separated from each other at a distance corresponding to a time difference between the plurality of pieces of image data.

7. The image data processing method as claimed in claim 1, wherein in said generating, said generated image data for display is generated such that a display interval between a plurality of pieces of image data temporally adjacent to each other is displayed as a color corresponding to a time difference between the plurality of pieces of image data.

8. The image data processing method as claimed in claim 1, wherein in said generating, said generated image data for display is generated such that a display area of image data corresponding to an edit position is highlighted.

9. The image data processing method as claimed in claim 1, wherein in said generating, said generated image data for display is generated such that a display area of image data corresponding to an edit position is displayed with a color corresponding to the edit position.

10. The image data processing method as claimed in claim 1, wherein said generating further includes selectively generating the plurality of clip image data or only one of the plurality of clip image data.

11. The image data processing method as claimed in claim 10, wherein said generating further includes generating an operating button area for display for giving an instruction to change from displaying said plurality of clip image data to displaying said only one of the plurality of clip image data.

12. The image data processing method as claimed in claim 10, wherein said generating further includes generating an operating button area for display for giving an instruction to change from displaying said only one of the plurality of clip image data to displaying said plurality of clip image data.

13. A computer readable storage medium encoded with computer executable instructions for processing image data forming a video material, which when executed by a computer, cause the computer to perform a method comprising
   obtaining image data at a plurality of points in time from said video material;

generating image data for display from the obtained image data in a grouped state in a story board display area corresponding to said video material, said generated image data including a plurality of clip image data corresponding to a video clip which is a portion of the video material, said plurality of clip image data including a first image from the video material corresponding to a start time of the video clip and a second image from the video material corresponding to an end time of the video clip, and said generating includes generating said first and second image for being simultaneously displayed in the story board display area; and generating a time line window that indicates a duration time of the video clip outside the story board display area, the time line window being interlocked with an operation of editing said video material such that the plurality of clip image data can be edited by editing the time line window, wherein the length of the video clip can be varied by shifting the beginning or end of the video clip in the time line window and the number of the plurality of clip image data can be varied by changing the length of the video clip in the time line window.

14. An image data processing method for processing image data forming a video material on an image data processing device, said image data processing method comprising:

obtaining thumbnail image data at a plurality of points from said video material;

displaying, on a display device, the thumbnail image data in a grouped state in a story board display area corresponding to said video material, said thumbnail image data including a plurality of clip image data corresponding to a video clip which is a portion of the video material, said plurality of clip image data including a first thumbnail image from the video material corresponding to a start time of the video clip and a second thumbnail image from the video material corresponding to an end time of the video clip, and said displaying includes displaying said first and second image simultaneously in the story board display area; and generating a time line window for display on the display device that indicates a duration time of the video clip outside the story board display area, the time line window being interlocked with an operation of editing said video material such that the plurality of clip image data can be edited by editing the time line window, wherein the length of the video clip can be varied by shifting the beginning or end of the video clip in the time line window and the number of the plurality of clip image data can be varied by changing the length of the video clip in the time line window.

15. An image data processing apparatus for processing image data forming a video material, said image data processing apparatus comprising:

a processor which provides an obtaining section configured to obtain image data at a plurality of points in time from said video material; and a generator configured to generate image data for display from the obtained image data in a grouped state in a story board display area corresponding to said video material, said generated image data including a plurality of clip image data corresponding to a video clip which is a portion of the video material, said plurality of clip image data including a first image from the video material corresponding to a start time of the video clip and a second image from the video material corresponding to an end time of the video clip and said generator is configured to generate said first and second image for being simultaneously displayed in the story board display area, wherein said generator generates a time line window that indicates a duration time of the video clip outside the story board display area, the time line window being interlocked with an operation of editing said video material such that the plurality of clip image data can be edited by editing the time line window, wherein the length of the video clip can be varied by shifting the beginning or end of the video clip in the time line window and the number of the plurality of clip image data can be varied by changing the length of the video clip in the time line window.

* * * * *